(12) United States Patent
Nakagami et al.

(10) Patent No.: US 8,483,495 B2
(45) Date of Patent: Jul. 9, 2013

(54) IMAGE PROCESSING DEVICE AND METHOD

(75) Inventors: Ohji Nakagami, Tokyo (JP); Junichi Tanaka, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 13/054,690

(22) PCT Filed: Jul. 24, 2009

(86) PCT No.: PCT/JP2009/063250
§ 371 (c)(1),
(2), (4) Date: Jan. 18, 2011

(87) PCT Pub. No.: WO2010/010943
PCT Pub. Date: Jan. 28, 2010

(65) Prior Publication Data
US 2011/0123131 A1    May 26, 2011

(30) Foreign Application Priority Data
Jul. 25, 2008   (JP) .................................. 2008-192094

(51) Int. Cl.
*H04N 7/50* (2006.01)
(52) U.S. Cl.
USPC ............ 382/238; 382/232; 382/233; 382/236
(58) Field of Classification Search
USPC .......... 382/232, 233, 236, 238, 260; 345/619;
348/699, 392.1, E5.066; 375/240.16, 240.07
See application file for complete search history.

(56) References Cited

U.S. PATENT DOCUMENTS

| | | | |
|---|---|---|---|
| 5,920,359 A | * | 7/1999 | Curley et al. .................. 348/699 |
| 7,292,634 B2 | * | 11/2007 | Yamamoto et al. ....... 375/240.16 |
| 8,135,064 B2 | * | 3/2012 | Tasaka et al. ............. 375/240.16 |
| 2007/0064808 A1 | | 3/2007 | Ishii et al. ................. 375/240.16 |
| 2007/0083579 A1 | | 4/2007 | Kawano ........................ 345/564 |
| 2009/0010568 A1 | | 1/2009 | Nakagami et al. ............. 382/299 |
| 2010/0118963 A1 | | 5/2010 | Nakagami et al. ............. 184/1.5 |
| 2010/0183072 A1 | | 7/2010 | Nakagami et al. ........ 375/240.16 |

FOREIGN PATENT DOCUMENTS

| | | |
|---|---|---|
| JP | 08 154250 | 6/1996 |
| JP | 2007 88922 | 4/2007 |
| JP | 2007 94846 | 4/2007 |
| JP | 2007 258882 | 10/2007 |

OTHER PUBLICATIONS

Irani, M., et al., "Improving Resolution by Image Registration," CVGIP: Graphical Models and Image Processing, vol. 53, No. 3, pp. 231-239, (May 1991).

(Continued)

*Primary Examiner* — Anh Do
(74) *Attorney, Agent, or Firm* — Oblon, Spivak, McClelland, Maier & Neustadt, L.L.P.

(57) ABSTRACT

An image formed in units of macroblocks of 16×16 pixels attached with a band area having a width of "a" pixels serving as a margin area is extracted as a motion compensation image from a reference frame and is regarded as an input image of a filtering process. "a" is a value that is determined in accordance with the number of taps of an FIR filter. A filtering process is performed using such a motion compensation image as an input image, and a prediction image of 16×16 pixels is output as an output image of the filtering process. The prediction image is added to an output image of an inverse orthogonal transformation circuit in an adder circuit, and an image as a result of the addition is used as a macroblock constituting a decoded frame.

9 Claims, 36 Drawing Sheets

OTHER PUBLICATIONS

International Search Report issued Oct. 20, 2009 in PCT/JP09/063250 filed Jul. 24, 2009.
U.S. Appl. No. 13/054,648, filed Jan. 18, 2011, Nakagami, et al.
U.S. Appl. No. 13/147,291, filed Aug. 1, 2011, Nakagami, et al.
U.S. Appl. No. 13/201,351, filed Aug. 12, 2011, Nakagami, et al.
U.S. Appl. No. 13/147,981, filed Aug. 4, 2011, Nakagami, et al.

* cited by examiner

BACKGROUND ART

IMAGE PROCESSING DEVICE AND METHOD

TECHNICAL FIELD

The present invention relates to an image processing device and method, and particularly relates to an image processing device and method that enable generation of a highly precise prediction image without increasing a processing load.

BACKGROUND ART

Conventionally, encoding methods using motion compensation, such as MPEG (Moving Picture Experts Group) or H.26x, and orthogonal transformation, such as discrete cosine transformation, Karhunen-Loeve transformation, or wavelet transformation, have been generally used as encoding methods in the case of handling a moving image. In these moving image encoding methods, the amount of code is reduced by using a correlation in a space direction and a time direction among the characteristics of an input image signal on which encoding is to be performed.

For example, in H.264, unidirectional prediction or bidirectional prediction is used for generating an inter-frame, which is a frame as a target of inter-frame prediction (inter-prediction), using a correlation in a time direction. The inter-frame prediction generates a prediction image on the basis of frames of different times.

FIG. 1 is a diagram illustrating an example of unidirectional prediction.

As illustrated in FIG. 1, in the case of generating a frame to be encoded $P_0$, which is a current-time frame to be encoded, through unidirectional prediction, motion compensation is performed using an encoded frame at a temporally past or future time with respect to the current time as a reference frame. The residual between a prediction image and an actual image is encoded using a correlation in a time direction, whereby the amount of code can be reduced. Reference frame information and a motion vector are used as information specifying a reference frame and information specifying the position to be referred to of the reference frame, respectively, and these pieces of information are transmitted from an encoding side to a decoding side.

Here, the number of reference frames is not necessarily one. For example, in H.264, a plurality of frames can be used as reference frames. When two frames that are temporally close to the frame to be encoded $P_0$ are used as reference frames $R_0$ and $R_1$, as illustrated in FIG. 1, the pixel values of an arbitrary macroblock in the frame to be encoded $P_0$ can be predicted from the pixel values of arbitrary pixels in the reference frame $R_0$ or $R_1$.

The boxes illustrated inside the respective frames in FIG. 1 represent macroblocks. When it is assumed that the macroblock in the frame to be encoded $P_0$, which is a prediction target, is a macroblock $MB_{P0}$, the macroblock in the reference frame $R_0$ corresponding to the macroblock $MB_{P0}$ is a macroblock $MB_{R0}$ that is specified by a motion vector $MV_0$. Also, the macroblock in the reference frame $R_1$ is a macroblock $MB_{R1}$ that is specified by a motion vector $MV_1$.

When it is assumed that the pixel values of the macroblocks $MB_{R0}$ and $MB_{R1}$ (pixel values of motion compensation images) are $MC_0(i, j)$ and $MC_1(i, j)$, since the pixel values of any of the motion compensation images are used as the pixel values of a prediction image in unidirectional prediction, a prediction image Pred(i, j) is expressed by the following equation (1). (i, j) represents the relative position of a pixel in the macroblock, and $0 \leq i \leq 16$ and $0 \leq j \leq 16$ are satisfied. In equation (1), "||" represents that the value of any of $MC_0(i, j)$ and $MC_1(i, j)$ is taken.

[Math. 1]

$$\mathrm{Pred}(i,j) = MC_0(i,j) \| MC_1(i,j) \qquad (1)$$

Also, it is possible to divide a single macroblock of 16×16 pixels into smaller blocks having a size of 16×8 pixels, for example, and to perform motion compensation on the individual blocks formed through the division by referring to different reference frames. By transmitting a motion vector of decimal precision, not a motion vector of integer precision, and by performing interpolation using an FIR filter defined according to a standard, the pixel values of pixels around the corresponding position that is referred to can be used for motion compensation.

FIG. 2 is a diagram illustrating an example of bidirectional prediction.

As illustrated in FIG. 2, in the case of generating a frame to be encoded $B_0$, which is a current-time frame to be encoded, through bidirectional prediction, motion compensation is performed using encoded frames at temporally past and future times with respect to the current time as reference frames. A plurality of encoded frames are used as reference frames, and the residual between a prediction image and an actual image is encoded using the correlation with those frames, whereby the amount of code can be reduced. In H.264, it is also possible to use a plurality of past frames and a plurality of future frames as reference frames.

As illustrated in FIG. 2, when one past frame and one future frame are used as reference frames $L_0$ and $L_1$, with the frame to be encoded $B_0$ serving as a basis, the pixel values of an arbitrary macroblock in the frame to be encoded $B_0$ can be predicted on the basis of the pixel values of arbitrary pixels of the reference frames $L_0$ and $L_1$.

In the example in FIG. 2, the macroblock in the reference frame $L_0$ corresponding to the macroblock $MB_{B0}$ in the frame to be encoded $B_0$ is a macroblock $MB_{L0}$ that is specified by a motion vector $MV_0$. Also, the macroblock in the reference frame $L_1$ corresponding to the macroblock $MB_{so}$ in the frame to be encoded $B_0$ is a macroblock $MB_{L1}$ that is specified by a motion vector $MV_1$.

When it is assumed that the pixel values of the macroblocks $MB_{L0}$ and $MB_{L1}$ are $MC_0(i, j)$ and $MC_1(i, j)$, respectively, the pixel value Pred(i, j) of a prediction image Pred(i, j) can be obtained as the average value of those pixel values, as expressed by the following equation (2).

[Math. 2]

$$\mathrm{Pred}(i,j) = (MC_0(i,j) + MC_1(i,j))/2 \qquad (2)$$

In the foregoing motion compensation using unidirectional prediction, the precision of a prediction image is increased by increasing the precision of a motion vector and reducing the size of a macroblock to reduce the residual with respect to an actual image, thereby increasing the encoding efficiency.

Also, in the motion compensation using bidirectional prediction, the averages of the pixel values of pixels of temporally close reference frames are used as the pixel values of pixels of a prediction image, thereby realizing a stable reduction in prediction residual from the viewpoint of probability.

CITATION LIST

Non Patent Literature

NPL 1: "Improving Resolution by Image Registration", MICHAL IRANI AND SHMUEL PELEG, Department of Computer Science, The Hebrew University of Jerusalem, 91904 Jerusalem, Israel, Communicated by Rama Chellapa, Received Jun. 16, 1989; accepted May 25, 1990

SUMMARY OF INVENTION

Technical Problem

In the case of conventional unidirectional prediction, even when a plurality of reference frames can be selected, it is necessary to selectively use the pixel values of any one of the reference frames as the pixel values of a frame to be encoded. Thus, since a reference frame that is not selected is not used for motion compensation, a temporal correlation between the reference frame and the frame to be encoded is not sufficiently used, and there is much to be improved from the viewpoint of increasing the encoding efficiency.

Also, in the case of conventional bidirectional prediction, the average values of the pixel values of two reference frames are used as the pixel values of a frame to be encoded, so that a temporal low-pass filter process is performed and that a high-frequency component is lost from a prediction image. As a result, since a residual signal including a high-frequency component cannot be encoded, an image obtained through decoding does not include a high-frequency component, and the resolution degrades.

The present invention has been made in view of these circumstances, and is directed to enabling generation of a highly precise prediction image without increasing a processing load.

Solution to Problem

An image processing device according to an aspect of the present invention includes determining means for determining, in accordance with the number of taps of a filter used for a filtering process, the number of pixels in a width direction of a band area that is positioned outside a macroblock including a reference block, which is a block of a decoded reference frame, and that is in contact with the reference block, obtaining means for obtaining, from the reference frame, the reference block and the band area corresponding to the number of pixels determined by the determining means if the reference block, which is a block of the reference frame corresponding to a block constituting an image subjected to a filtering process, is in contact with a periphery of the macroblock including the reference block, and filtering means for performing a filtering process on an image of the reference block and the band area obtained by the obtaining means.

The obtaining means may obtain the reference block from the reference frame if the reference block is not in contact with the periphery of the macroblock including the reference block.

The determining means may determine the number of pixels that is equal to a maximum integer equal to or smaller than a value that is obtained by dividing the number of taps of the filter used for the filtering process by two to be the number of pixels in the width direction of the band area.

The filtering means may have first filter means for performing low-pass filtering on a difference image of a plurality of images, second filter means for performing high-pass filtering on an image obtained through the low-pass filtering performed by the first filter means, and adding means for adding the image obtained through the low-pass filtering performed by the first filter means and an image obtained through the high-pass filtering performed by the second filter means to any of the plurality of images, thereby generating a prediction image in units of macroblocks.

The image processing device may further include storage means for storing, as the reference frame, a decoded frame that is obtained through a decoding process performed in units of macroblocks constituting a frame. The obtaining means may obtain the reference block and the band area from the reference frame stored in the storage means.

The image processing device may further include specifying means for specifying the reference block on the basis of a motion vector.

The filter may be an FIR filter.

An image processing method according to an aspect of the present invention includes a determining step of determining, in accordance with the number of taps of a filter used for a filtering process, the number of pixels in a width direction of a band area that is positioned outside a macroblock including a reference block, which is a block of a decoded reference frame, and that is in contact with the reference block, an obtaining step of obtaining, from the reference frame, the reference block and the band area corresponding to the number of pixels determined in the determining step if the reference block, which is a block of the reference frame corresponding to a block constituting an image subjected to a filtering process, is in contact with a periphery of the macroblock including the reference block, and a filtering step of performing a filtering process on an image of the reference block and the band area obtained in the obtaining step.

In an aspect of the present invention, the number of pixels in a width direction of a band area that is positioned outside a macroblock including a reference block, which is a block of a decoded reference frame, and that is in contact with the reference block is determined in accordance with the number of taps of a filter used for a filtering process, the reference block and the band area corresponding to the determined number of pixels are obtained from the reference frame if the reference block, which is a block of the reference frame corresponding to a block constituting an image subjected to a filtering process, is in contact with a periphery of the macroblock including the reference block, and a filtering process is performed on an image of the obtained reference block and band area.

Advantageous Effects of Invention

According to an aspect of the present invention, a highly precise prediction image can be generated without increasing a processing load.

DESCRIPTION OF EMBODIMENTS

Figure 3:
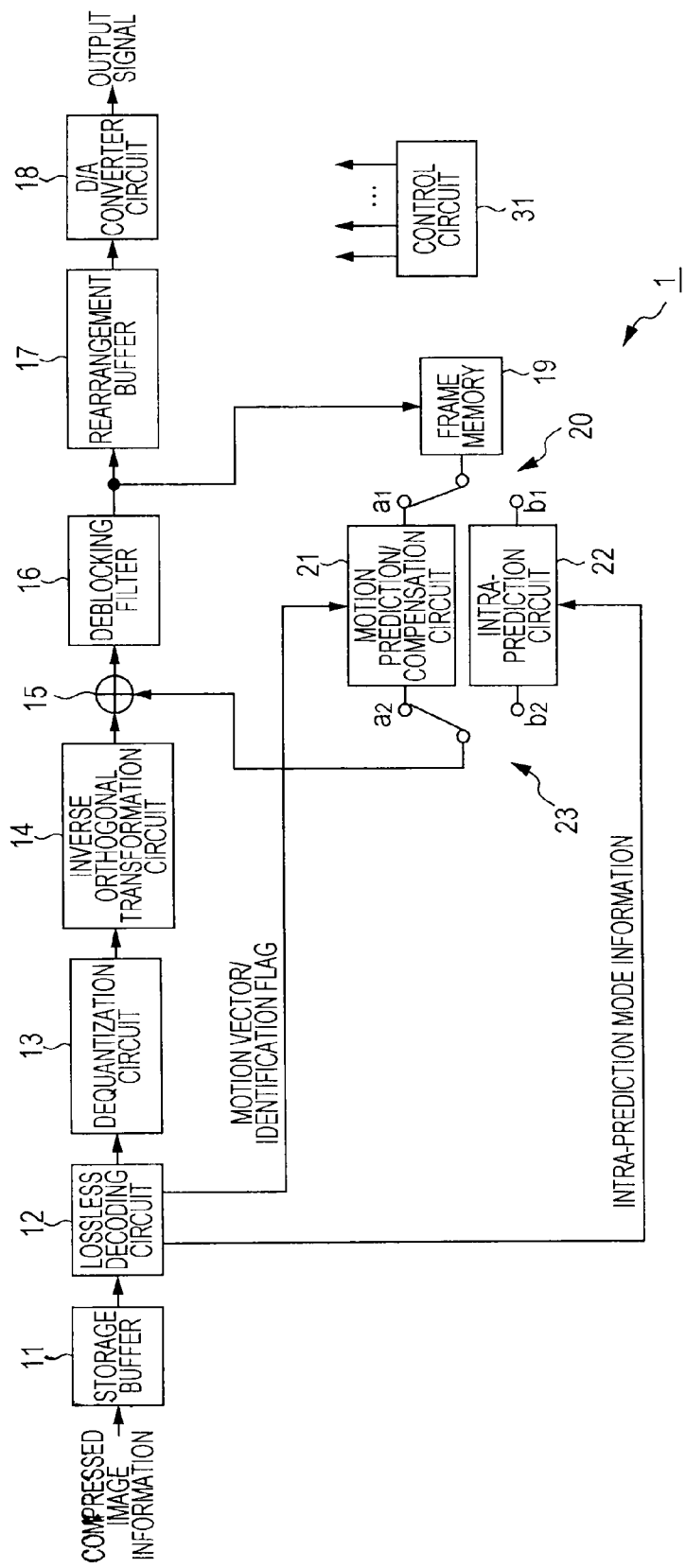
FIG. 3 is a block diagram illustrating a configuration example of a decoding device according to an embodiment of the present invention.

FIG. 3 is a block diagram illustrating a configuration example of a decoding device 1 according to an embodiment of the present invention.

Image information that is compressed and encoded by an encoding device, which will be described below, is input to the decoding device 1 via a cable, network, or removable medium. The compressed image information is image information that is compressed and encoded in accordance with an H.264 standard, for example.

A storage buffer 11 sequentially stores bit streams input as compressed image information. The information stored in the storage buffer 11 is read as necessary by a lossless decoding circuit 12 in units of images of certain units, such as macroblocks constituting a frame. In the H.264 standard, a process can be performed not only in units of macroblocks of 16×16 pixels, but also in units of blocks of 8×8 pixels or 4×4 pixels, obtained by further dividing the macroblocks.

The lossless decoding circuit 12 performs a decoding process corresponding to an encoding method, such as a variable-length decoding process or an arithmetic decoding process, on an image read from the storage buffer 11. The lossless decoding circuit 12 outputs a quantized transformation coefficient obtained through the decoding process to a dequantization circuit 13.

Also, the lossless decoding circuit 12 identifies, on the basis of an identification flag included in the header of the image to be decoded, whether the image is an intra-coded image or an inter-coded image. If the lossless decoding circuit 12 judges that the image to be decoded is an intra-coded image, the lossless decoding circuit 12 outputs intra-prediction mode information stored in the header of the image to an intra-prediction circuit 22. The intra-prediction mode information includes information about intra-prediction, such as the size of a block serving as the unit of a process.

If the lossless decoding circuit 12 judges that the image to be decoded is inter-coded image information, the lossless decoding circuit 12 outputs a motion vector and an identification flag stored in the header of the image to a motion prediction/compensation circuit 21. With the identification flag, the mode of prediction for generating a prediction image through inter-prediction can be identified. The identification flag is set in units of macroblocks or frames, for example.

Figure 1:
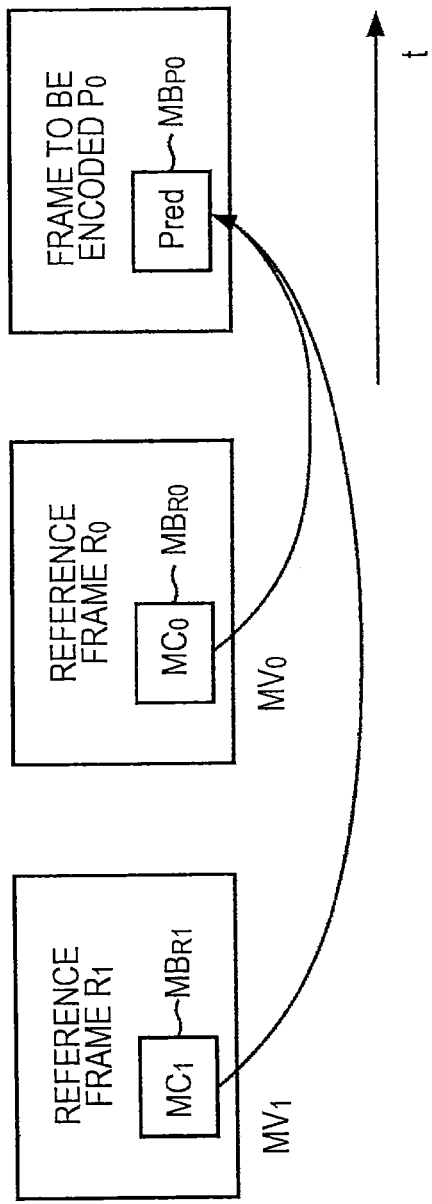
FIG. 1 is a diagram illustrating an example of unidirectional prediction.
Figure 2:
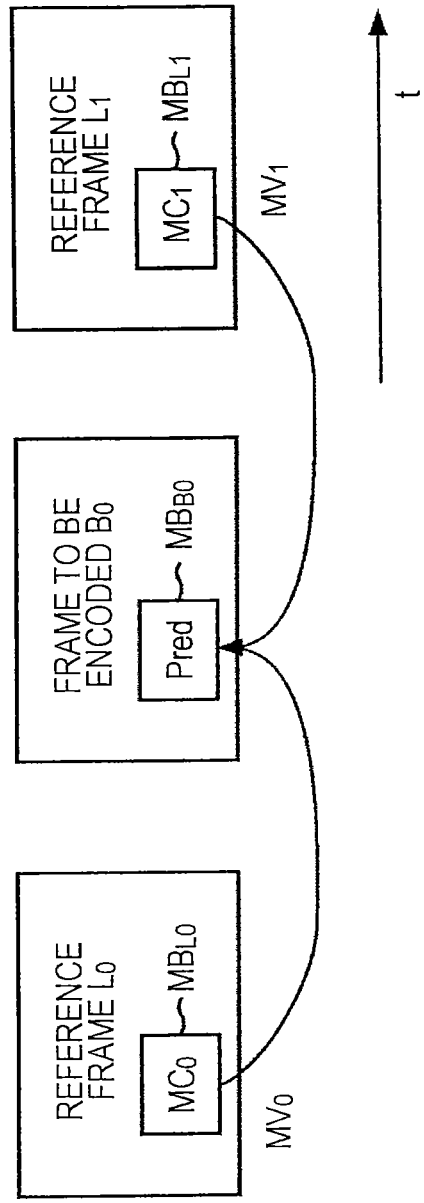
FIG. 2 is a diagram illustrating an example of bidirectional prediction.

As the mode of prediction, there is prepared a third prediction mode for generating a prediction image by performing filtering on motion compensation images that are extracted from a plurality of reference frames arranged in one or two temporal directions, in addition to the mode of unidirectional prediction in FIG. 1 and the mode of bidirectional prediction in FIG. 2.

Figure 4:
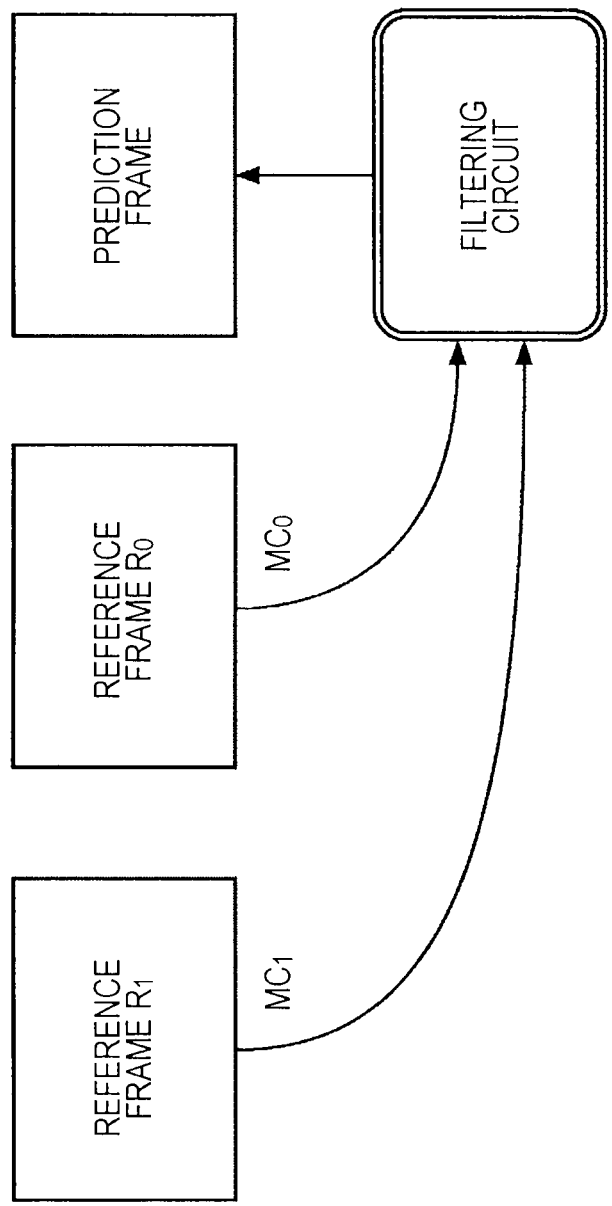
FIG. 4 is a diagram illustrating a concept of a third prediction mode.

FIG. 4 is a diagram illustrating a concept of the third prediction mode.

In the example in FIG. 4, with the time of a current frame (prediction frame) serving as a basis, the frame that is temporally one unit of time before is regarded as a reference frame $R_0$, and the frame that is one unit of time before the reference frame $R_0$ is regarded as a reference frame $R_1$. In this case, according to the third prediction mode, motion compensation images $MC_0$ and $MC_1$ extracted from the reference frames $R_0$ and $R_1$ are input to a filtering circuit, and the pixel values of the image output from the filtering circuit are regarded as the pixel values of a prediction image, which is a target macroblock.

Hereinafter, the mode of prediction in which the pixel values of any of motion compensation images extracted from a plurality of reference frames arranged in one direction are regarded as the pixel values of a prediction image, as described above with reference to FIG. 1, is simply referred to as a unidirectional prediction mode. Also, the mode of prediction in which the average values of the pixel values of the motion compensation images extracted from a plurality of reference frames arranged in two directions are regarded as the pixel values of a prediction image, as described above with reference to FIG. 2, is simply referred to as a bidirectional prediction mode.

The third prediction mode illustrated in FIG. 4, in which the pixel values of a prediction image are obtained by performing filtering on individual motion compensation images extracted from a plurality of reference frames arranged in one direction or two directions, is referred to as a filtering prediction mode. The filtering prediction mode will be described in detail below.

Referring back to FIG. 3, the dequantization circuit 13 performs dequantization in a method corresponding to the quantization method used on the encoding side on the quantized transformation coefficient supplied from the lossless decoding circuit 12. The dequantization circuit 13 outputs the transformation coefficient obtained by performing dequantization to an inverse orthogonal transformation circuit 14.

The inverse orthogonal transformation circuit 14 performs fourth-order inverse orthogonal transformation on the transformation coefficient supplied from the dequantization circuit 13 using a method corresponding to the orthogonal transformation method used on the encoding side, such as discrete cosine transformation or Karhunen-Loeve transformation, and outputs an obtained image to an adder circuit 15.

The adder circuit 15 combines the decoded image supplied from the inverse orthogonal transformation circuit 14 and a prediction image supplied from the motion prediction/compensation circuit 21 or the intra-prediction circuit 22 via a switch 23, and outputs a composite image to a deblocking filter 16.

The deblocking filter 16 removes block noise included in the image supplied from the adder circuit 15 and outputs an image from which the block noise has been removed. The image output from the deblocking filter 16 is supplied to a rearrangement buffer 17 and a frame memory 19.

The rearrangement buffer 17 temporarily stores the image supplied from the deblocking filter 16. The rearrangement buffer 17 generates individual frames from images in units of macroblocks stored therein, for example, rearranges the generated frames in certain order, such as display order, and outputs them to a D/A (Digital/Analog) converter circuit 18.

The D/A converter circuit 18 performs D/A conversion on the individual frames supplied from the rearrangement buffer 17 and outputs the signals of the individual frames to the outside.

The frame memory 19 temporarily stores the image supplied from the deblocking filter 16. The information stored in the frame memory 19 is supplied to the motion prediction/compensation circuit 21 or the intra-prediction circuit 22 via a switch 20.

The switch 20 connects to a terminal $a_1$ in the case of generating a prediction image using inter-prediction, and connects to a terminal $b_1$ in the case of generating it using intra-prediction. The switching of the switch 20 is controlled by a control circuit 31, for example.

The motion prediction/compensation circuit 21 determines a prediction mode in accordance with the identification flag supplied from the lossless decoding circuit 12, and selects a frame to be used as a reference frame from among the decoded frames stored in the frame memory 19 in accordance with the prediction mode. The motion prediction/compensation circuit 21 determines a macroblock corresponding to a target prediction image from among the macroblocks constituting the reference frame on the basis of the motion vector supplied from the lossless decoding circuit 12, and extracts the determined macroblock as a motion compensation image. The motion prediction/compensation circuit 21 obtains the pixel values of the prediction image from the pixel values of the motion compensation image in accordance with the prediction mode, and outputs the prediction image in which the pixel values have been obtained to the adder circuit 15 via the switch 23.

The intra-prediction circuit 22 performs intra-prediction in accordance with the intra-prediction mode information supplied from the lossless decoding circuit 12 to generate a prediction image. The intra-prediction circuit 22 outputs the generated prediction image to the adder circuit 15 via the switch 23.

The switch 23 connects to a terminal $a_2$ if a prediction image is generated by the motion prediction/compensation circuit 21, and connects to a terminal $b_2$ if a prediction image is generated by the intra-prediction circuit 22. The switching of the switch 23 is also controlled by the control circuit 31, for example.

The control circuit 31 switches the connection of the switches 20 and 23 and controls the entire operation of the decoding device 1. Whether an image to be processed is an intra-coded image or an inter-coded image may be identified by the control circuit 31.

Figure 5:
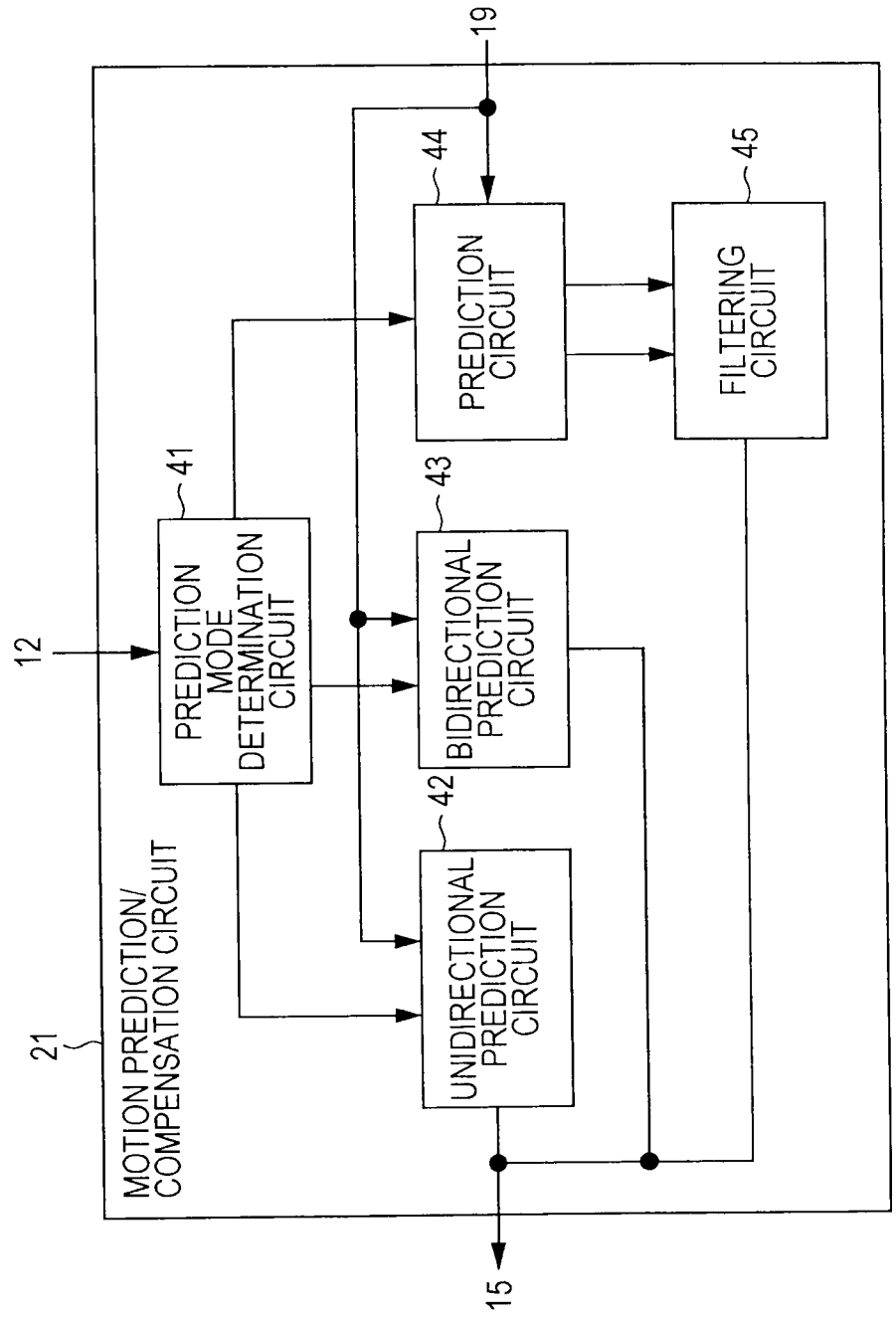
FIG. 5 is a block diagram illustrating a configuration example of the motion prediction/compensation circuit in FIG. 3.

FIG. 5 is a block diagram illustrating a configuration example of the motion prediction/compensation circuit 21 in FIG. 3.

As illustrated in FIG. 5, the motion prediction/compensation circuit 21 is constituted by a prediction mode determination circuit 41, a unidirectional prediction circuit 42, a bidirectional prediction circuit 43, a prediction circuit 44, and a filtering circuit 45. The motion vector and identification flag supplied from the lossless decoding circuit 12 are input to the prediction mode determination circuit 41.

The prediction mode determination circuit 41 determines a prediction mode in accordance with the identification flag supplied from the lossless decoding circuit 12. The prediction mode determination circuit 41 outputs the motion vector to the unidirectional prediction circuit 42 when determining to perform generation of a prediction image using unidirectional prediction, and outputs the motion vector to the bidirectional prediction circuit 43 when determining to perform generation of a prediction image using bidirectional prediction. Also, the prediction mode determination circuit 41 outputs the motion vector to the prediction circuit 44 when determining to perform generation of a prediction image using filtering prediction.

In this way, in order to enable identification of filtering prediction, a value different from the value representing unidirectional prediction and the value representing bidirectional prediction, which are defined in the conventional H.264 standard, can be set as the value of an identification flag. Alternatively, a prediction mode may be determined by a predetermined method, instead of being determined in accordance with an identification flag, in order to reduce the amount of information.

The unidirectional prediction circuit 42 regards a plurality of frames arranged in one temporal direction as reference frames, and determines macroblocks in the reference frames corresponding to a prediction image on the basis of motion vectors, as illustrated in FIG. 1. Also, the unidirectional prediction circuit 42 reads the determined macroblocks in the respective reference frames as motion compensation images from the frame memory 19, and generates a prediction image using the pixel values of any of the motion compensation images as the pixel values of the prediction image. The unidirectional prediction circuit 42 outputs the prediction image to the adder circuit 15. As the unidirectional prediction performed by the unidirectional prediction circuit 42, the unidirectional prediction defined in the H.264 standard is used, for example.

The bidirectional prediction circuit 43 regards a plurality of frames arranged in two temporal directions as reference frames, and determines macroblocks in the reference frames corresponding to a prediction image on the basis of motion vectors, as illustrated in FIG. 2. Also, the bidirectional prediction circuit 43 reads the determined macroblocks in the respective reference frames as motion compensation images from the frame memory 19, and generates a prediction image using the averages of the pixel values of the read motion compensation images as the pixel values of the prediction image. The bidirectional prediction circuit 43 outputs the prediction image to the adder circuit 15. As the bidirectional prediction performed by the bidirectional prediction circuit 43, the bidirectional prediction defined in the H.264 standard is used, for example.

The prediction circuit 44 determines a plurality of frames arranged in one or two temporal directions as reference frames. The frames to be used as reference frames may be predetermined, or may be specified by information transmitted from the encoding side together with an identification flag.

Figure 6:
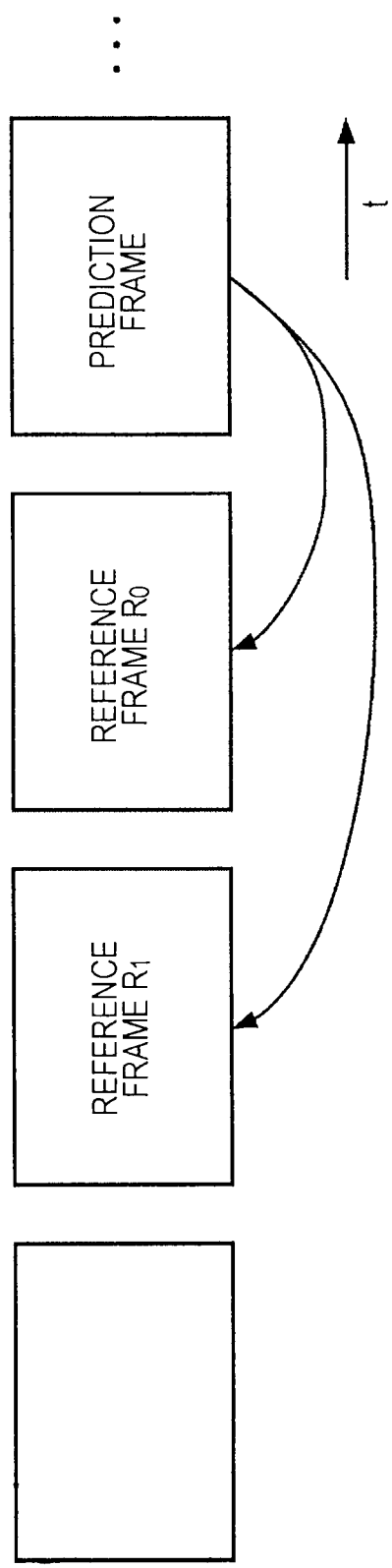
FIG. 6 is a diagram illustrating an example of reference frames.

FIG. 6 is a diagram illustrating an example of reference frames.

In the example in FIG. 6, with the time of a prediction frame serving as a basis, two frames that are temporally one unit of time before and two units of time before are regarded as reference frames, as in the example described above with reference to FIG. 4. Among the two reference frames, the frame that is closer to the prediction frame and that is one unit of time before the prediction frame is regarded as a reference frame $R_0$, and the frame that is one unit of time before the reference frame $R_0$ is regarded as a reference frame $R_1$.

Figure 7:
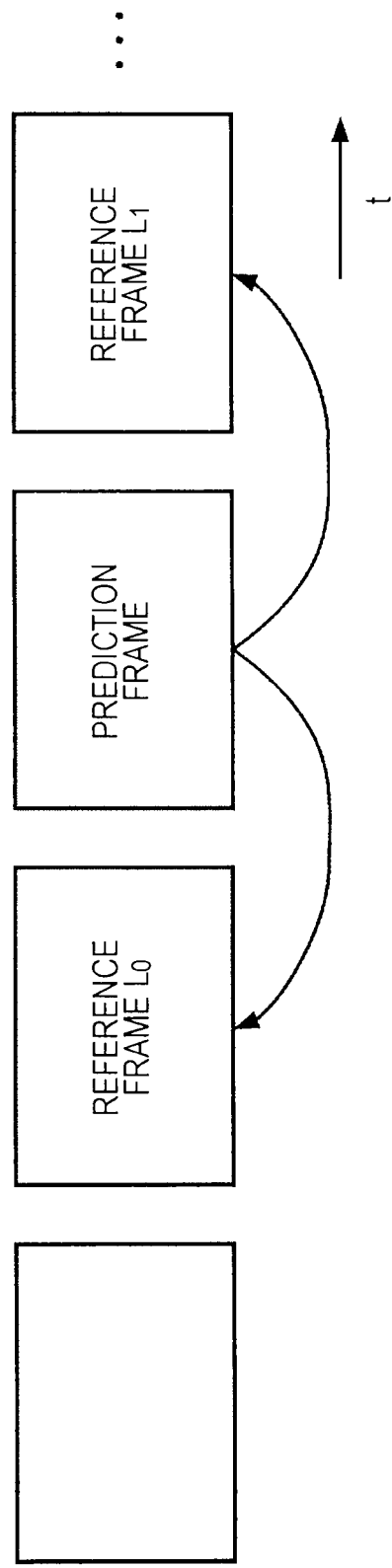
FIG. 7 is a diagram illustrating another example of reference frames.

FIG. 7 is a diagram illustrating another example of reference frames.

In the example in FIG. 7, with the time of a prediction frame serving as a basis, two frames that are temporally one unit of time before and one unit of time after are regarded as reference frames. Among the two reference frames, the frame that is one unit of time before the prediction frame is regarded as a reference frame $L_0$, and the frame that is one unit of time after the prediction frame is regarded as a reference frame $L_1$.

In this way, in the filtering prediction, a plurality of frames arranged in one temporal direction or a plurality of frames arranged in two directions are used as reference frames.

Also, the prediction circuit 44 determines, on the basis of the motion vectors supplied from the prediction mode determination circuit 41, the macroblocks corresponding to the prediction image among the decoded macroblocks in the reference frames determined in the manner illustrated in FIG. 6 or FIG. 7.

The prediction circuit 44 reads the determined macroblocks in the respective reference frames as motion compensation images from the frame memory 19, and outputs the read motion compensation images to the filtering circuit 45. The motion vector may be performed not in units of macroblocks of 16×16 pixels but in units of blocks obtained by further dividing the macroblocks. Images in units of macroblocks are input to the filtering circuit 45, for example. In FIG. 5, the illustration of two arrows extending from the prediction circuit 44 toward the filtering circuit 45 represents that two motion compensation images are supplied.

The filtering circuit 45 receives the motion compensation images supplied from the prediction circuit 44 and performs filtering thereon, and outputs a prediction image obtained by performing the filtering to the adder circuit 15.

Figure 8:
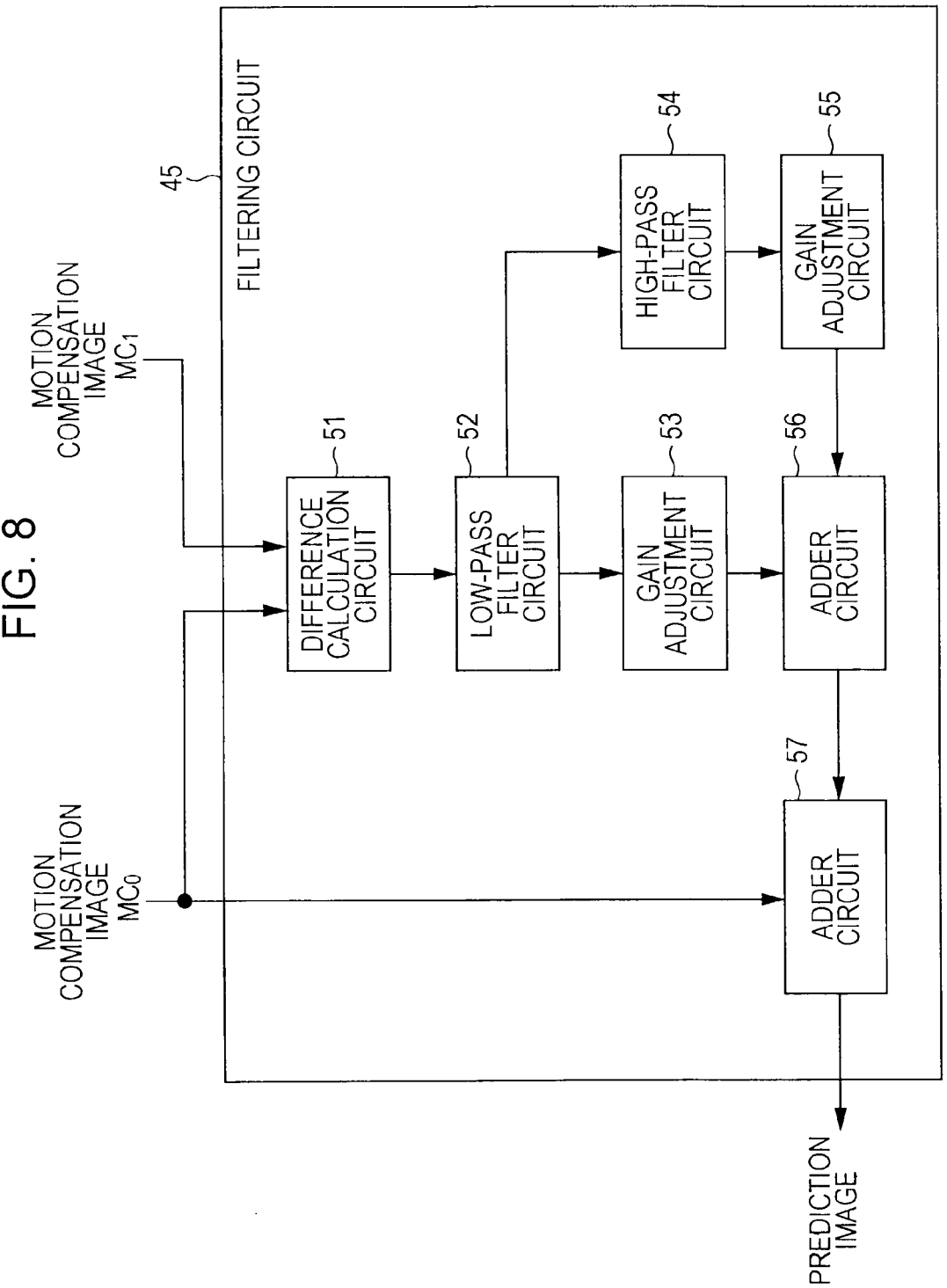
FIG. 8 is a block diagram illustrating a configuration example of the filtering circuit in FIG. 5.

FIG. 8 is a block diagram illustrating a configuration example of the filtering circuit 45. In the filtering circuit 45 having the configuration in FIG. 8, filtering is performed on a signal in a time domain.

As illustrated in FIG. 8, the filtering circuit 45 is constituted by a difference calculation circuit 51, a low-pass filter circuit 52, a gain adjustment circuit 53, a high-pass filter circuit 54, a gain adjustment circuit 55, an adder circuit 56, and an adder circuit 57. The motion compensation image $MC_0$ supplied from the prediction circuit 44 is input to the difference calculation circuit 51 and the adder circuit 57, and the motion compensation image $MC_1$ is input to the difference calculation circuit 51.

In the case of generating a prediction image using unidirectional prediction, as illustrated in FIG. 6, the image extracted from the reference frame $R_0$, which is considered to have a higher correlation with the prediction image, is regarded as the motion compensation image $MC_0$, and the image extracted from the reference frame $R_1$ is regarded as the motion compensation image $MC_1$, for example. The image extracted from the reference frame $R_0$ may be regarded as the motion compensation image $MC_1$, and the image extracted from the reference frame $R_1$ may be regarded as the motion compensation image $MC_0$.

On the other hand, in the case of generating a prediction image using bidirectional prediction, as illustrated in FIG. 7, the image extracted from the reference frame $L_0$, which is one unit of time before, is regarded as the motion compensation image $MC_0$, and the image extracted from the reference frame $L_1$, which is one unit of time after, is regarded as the motion compensation image $MC_1$, for example. The image extracted from the reference frame $L_0$ may be regarded as the motion compensation image $MC_1$, and the image extracted from the reference frame $L_1$ may be regarded as the motion compensation image $MC_0$.

The difference calculation circuit 51 calculates the difference between the motion compensation image $MC_0$ and the motion compensation image $MC_1$, and outputs a difference image to the low-pass filter circuit 52. A difference image D is expressed by the following equation (3).

[Math. 3]

$$D(i,j)=MC_0(i,j)MC_1(i,j) \quad (3)$$

In equation (3), (i, j) represents the relative position of a pixel in a motion compensation image. When a process is to be performed in units of macroblocks of 16×16 pixels, $0 \leq i \leq 16$ and $0 \leq j \leq 16$ are satisfied. This is the same in the following.

The low-pass filter circuit 52 has an FIR filter circuit. The low-pass filter circuit 52 performs low-pass filtering on the difference image D supplied from the difference calculation circuit 51, and outputs an obtained image to the gain adjustment circuit 53 and the high-pass filter circuit 54. A difference image D', which is an image obtained by performing low-pass filtering, is expressed by the following equation (4). In equation (4), LPF(X) represents that low-pass filtering is performed on an input image X using a two-dimensional FIR filter.

[Math. 4]

$$D'=LPF(D) \quad (4)$$

The gain adjustment circuit 53 adjusts the gain of the difference image D' supplied from the low-pass filter circuit 52, and outputs the image in which the gain has been adjusted to the adder circuit 56. The output image X(i, j) of the gain adjustment circuit 53 is expressed by the following equation (5).

[Math. 5]

$$X(i,j)=\alpha D'(i,j) \quad (5)$$

The high-pass filter circuit 54 has an FIR filter circuit. The high-pass filter circuit 54 performs high-pass filtering on the difference image D' supplied from the low-pass filter circuit 52 and outputs an obtained image to the gain adjustment circuit 55. A difference image D", which is an image obtained by performing high-pass filtering, is expressed by the following equation (6). In equation (6), HPF(X) represents that high-pass filtering is performed on an input image X using a two-dimensional FIR filter.

[Math. 6]

$$D''=HPF(D') \quad (6)$$

The gain adjustment circuit 55 adjusts the gain of the difference image D" supplied from the high-pass filter circuit 54, and outputs the image in which the gain has been adjusted to the adder circuit 56. The output image Y(i, j) of the gain adjustment circuit 55 is expressed by the following equation (7).

[Math. 7]

$$Y(i,j)=\beta D''(i,j) \quad (7)$$

As the values of $\alpha$ in equation (5) and $\beta$ in equation (7), the values $\alpha=0.8$ and $\beta=0.2$ are selected, for example, but other values may be used in order to increase the precision of a prediction image. Also, the values may be adaptively changed in accordance with the property of an input sequence.

The adder circuit 56 adds the image X(i, j) and the image Y(i, j) in which the gain has been adjusted, and outputs the image obtained through the addition. The output image Z(i, j) of the adder circuit 56 is expressed by the following equation (8).

[Math. 8]

$$Z(i,j)=X(i,j)+Y(i,j) \quad (8)$$

The output image Z(i, j) represents a high-frequency component of the image, which can be obtained from the difference between the motion compensation image $MC_0$ and the motion compensation image $MC_1$, that is, the correlation therebetween.

The adder circuit 57 adds the output image Z(i, j) supplied from the adder circuit 56 to the motion compensation image $MC_0$, and outputs an obtained image as a prediction image to the adder circuit 15. The prediction image S(i, j), which is the final output of the adder circuit 57, is expressed by the following equation (9).

[Math. 9]

$$S(i,j)=MC_0(i,j)+Z(i,j) \quad (9)$$

In this way, according to the filtering prediction mode, the image that is obtained by adding an image representing a high-frequency component to the motion compensation image $MC_0$ is generated as a prediction image. This prediction image includes a larger amount of high-frequency component than a prediction image that is obtained in the case of simply performing bidirectional prediction. As described above, since the averages of the pixel values of a plurality of motion compensation images are obtained as pixel values, a high-frequency component is lost in the prediction image that is generated by performing bidirectional prediction.

Also, since a prediction image including a large amount of high-frequency component is added to a decoded image in the adder circuit 15, the image that is finally output from the decoding device 1 is a high-resolution image including a large amount of high-frequency component.

Furthermore, a prediction image can be generated using a time correlation of images more efficiently, compared to the case of simply performing unidirectional prediction. A prediction image that is generated through unidirectional prediction is not regarded as an image generated by sufficiently using a time correlation of images because the pixel values of any of a plurality of motion compensation images are used, as described above.

Now, a process performed by the decoding device 1 having the foregoing configuration will be described.

First, a decoding process performed by the decoding device 1 will be described with reference to the flowchart in FIG. 9.

Figure 9:
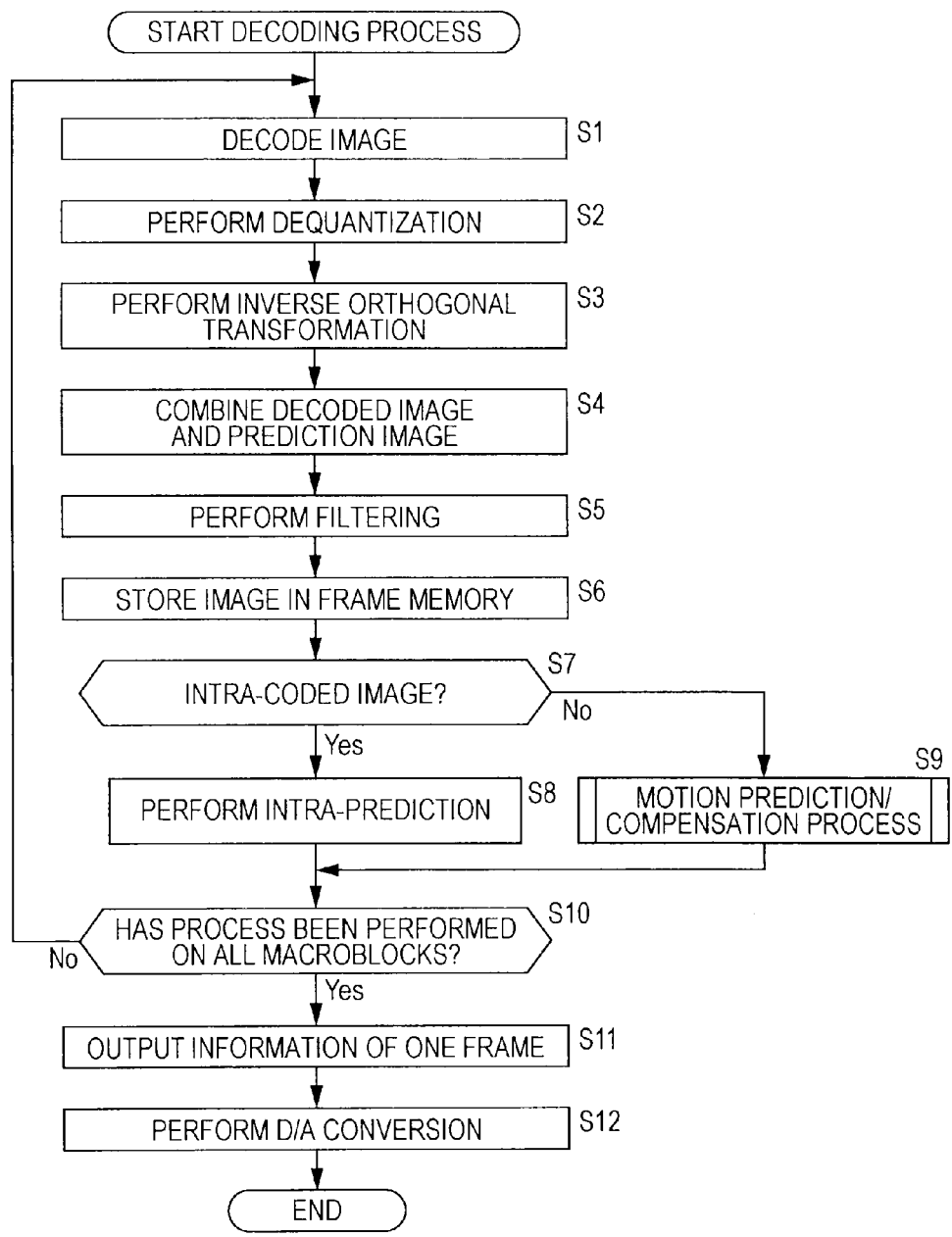
FIG. 9 is a flowchart for explaining a decoding process performed by the decoding device.

The process in FIG. 9 is started when an image of a certain size, such as a macroblock of 16×16 pixels, is read by the lossless decoding circuit 12 from the information stored in the storage buffer 11, for example. The processes in the respective steps in FIG. 9 are performed in parallel with a process in another step or by changing the order as necessary. This is the same in the processes in the respective steps in the individual flowcharts described below.

In step S1, the lossless decoding circuit 12 performs a decoding process on the image read from the storage buffer 11 and outputs a quantized transformation coefficient to the dequantization circuit 13. Also, the lossless decoding circuit 12 outputs intra-prediction mode information to the intra-prediction circuit 22 if the image to be decoded is an intra-coded image, and outputs a motion vector and an identification flag to the motion prediction/compensation circuit 21 if the image to be decoded is an inter-coded image.

In step S2, the dequantization circuit 13 performs dequantization in a method corresponding to the quantization method used on the encoding side, and outputs the transformation coefficient to the inverse orthogonal transformation circuit 14.

In step S3, the inverse orthogonal transformation circuit 14 performs inverse orthogonal transformation on the transformation coefficient supplied from the dequantization circuit 13, and outputs an obtained image to the adder circuit 15.

In step S4, the adder circuit 15 combines the decoded image supplied from the inverse orthogonal transformation circuit 14 and a prediction image supplied from the motion prediction/compensation circuit 21 or from the intra-prediction circuit 22, and outputs a composite image to the deblocking filter 16.

In step S5, the deblocking filter 16 performs filtering to remove block noise included in the composite image, and outputs an image from which the block noise has been removed.

In step S6, the frame memory 19 temporarily stores the image supplied from the deblocking filter 16.

In step S7, the control circuit 31 judges whether the target image is an intra-coded image or not.

If it is judged in step S7 that the target image is an intra-coded image, the intra-prediction circuit 22 performs intra-prediction to generate a prediction image in step S8, and outputs the generated prediction image to the adder circuit 15.

On the other hand, if it is judged in step S7 that the target image is not an intra-coded image, that is, an inter-coded image, a motion prediction/compensation process is performed by the motion prediction/compensation circuit 21 in step S9. The prediction image generated by performing the motion prediction/compensation process is output to the adder circuit 15. The motion prediction/compensation process will be described below with reference to the flowchart in FIG. 10.

In step S10, the control circuit 31 judges whether the foregoing process has been performed on the macroblocks in one entire frame or not. If the control circuit 31 judges that the process has not been performed on the macroblocks in one entire frame, the process is repeated on another macroblock from step S1.

On the other hand, if it is judged in step S10 that the process has been performed on the macroblocks in one entire frame, the rearrangement buffer 17 outputs the generated frame to the D/A converter circuit 18 in accordance with the control performed by the control circuit 31 in step S11.

In step S12, the D/A converter circuit 18 performs D/A conversion on the frame supplied from the rearrangement buffer 17, and outputs an analog signal to the outside. The foregoing process is performed on individual frames.

Figure 10:
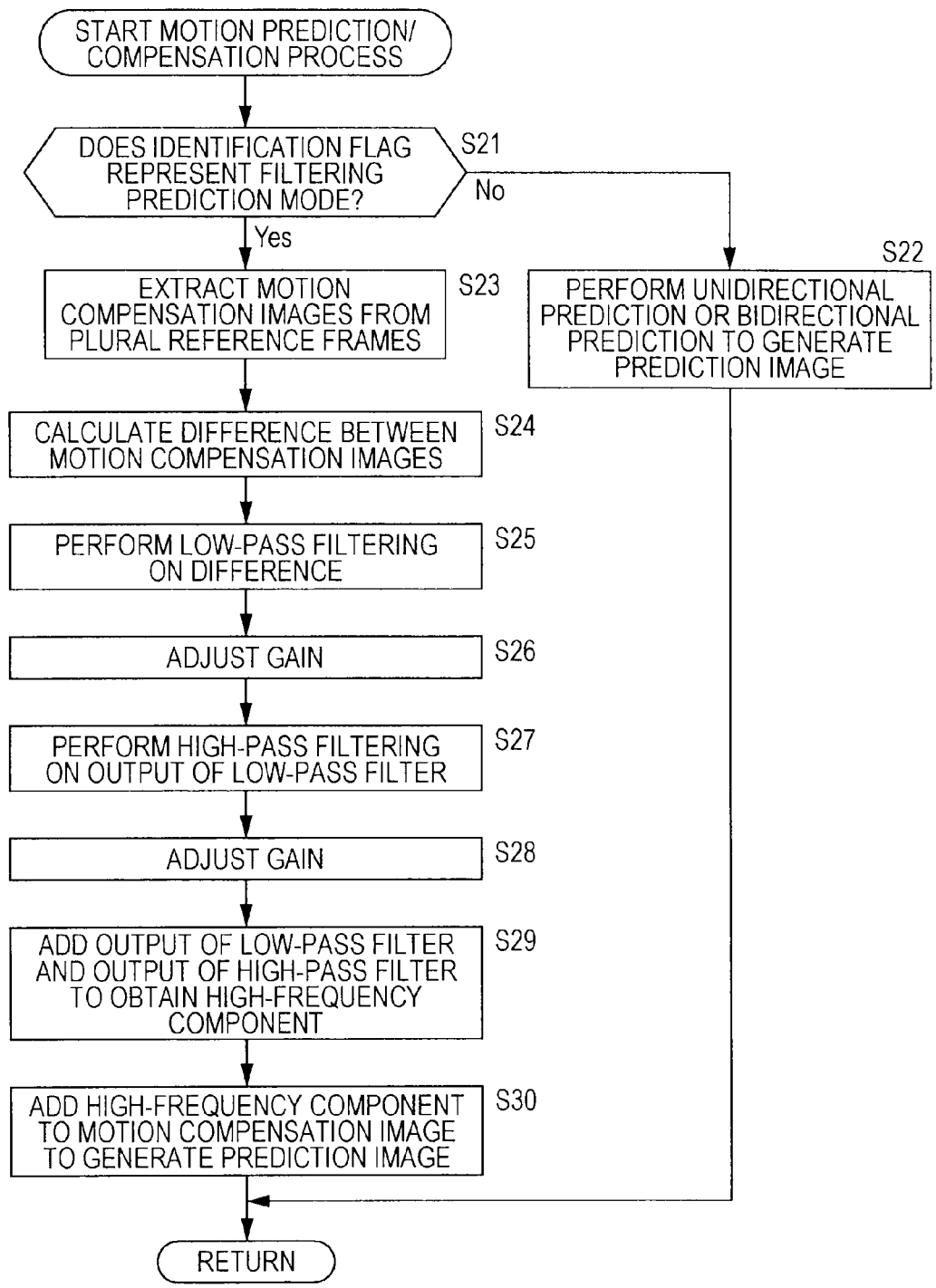
FIG. 10 is a flowchart for explaining a motion prediction/compensation process performed in step S9 in FIG. 9.

Next, the motion prediction/compensation process that is performed in step S9 in FIG. 9 will be described with reference to the flowchart in FIG. 10.

In step S21, the prediction mode determination circuit 41 of the motion prediction/compensation circuit 21 judges whether the identification flag supplied from the lossless decoding circuit 12 represents that a process is to be performed in the filtering prediction mode or not.

If it is judged in step S21 that the identification flag does not represent that a process is to be performed in the filtering prediction mode, unidirectional prediction or bidirectional prediction is performed to generate a prediction image in step S22.

That is, if the identification flag represents that a process is to be performed in the unidirectional prediction mode, motion vectors are supplied from the prediction mode determination circuit 41 to the unidirectional prediction circuit 42, and unidirectional prediction is performed in the unidirectional prediction circuit 42. Also, if the identification flag represents that a process is to be performed in the bidirectional prediction mode, motion vectors are supplied from the prediction mode determination circuit 41 to the bidirectional prediction circuit 43, and bidirectional prediction is performed in the bidirectional prediction circuit 43. After the prediction image has been output to the adder circuit 15, the process returns to step S9 in FIG. 9, and the subsequent process is performed.

On the other hand, if it is judged in step S21 that the identification flag represents that a process is to be performed in the filtering prediction mode, the prediction circuit 44 extracts motion compensation images from a plurality of respective reference frames and outputs them to the filtering circuit 45 in step S23. Motion vectors are supplied from the prediction mode determination circuit 41 to the prediction circuit 44, and the motion compensation images are extracted using them.

In step S24, the difference calculation circuit 51 of the filtering circuit 45 calculates the difference between the motion compensation image $MC_0$ and the motion compensation image $MC_1$ and outputs a difference image to the low-pass filter circuit 52.

In step S25, the low-pass filter circuit 52 performs low-pass filtering on the difference image supplied from the difference calculation circuit 51, and outputs an obtained image to the gain adjustment circuit 53 and the high-pass filter circuit 54.

In step S26, the gain adjustment circuit 53 adjusts the gain of the image supplied from the low-pass filter circuit 52, and outputs the image in which the gain has been adjusted to the adder circuit 56.

In step S27, the high-pass filter circuit 54 performs high-pass filtering on the difference image supplied from the low-pass filter circuit 52, and outputs an obtained image to the gain adjustment circuit 55.

In step S28, the gain adjustment circuit 55 adjusts the gain of the difference image supplied from the high-pass filter circuit 54, and outputs the image in which the gain has been adjusted to the adder circuit 56.

In step S29, the adder circuit 56 adds the image supplied from the gain adjustment circuit 53 and the image supplied from the gain adjustment circuit 55 to obtain a high-frequency component of the image. The obtained high-frequency component is supplied from the adder circuit 56 to the adder circuit 57.

In step S30, the adder circuit 57 adds the image supplied from the adder circuit 56 (high-frequency component) to the motion compensation image $MC_0$, and outputs an obtained image as a prediction image to the adder circuit 15. After that, the process returns to step S9 in FIG. 9, and the subsequent process is performed.

In this way, decoding is performed using a prediction image that is generated through filtering prediction, so that a high-resolution decoded image can be obtained.

Next, the configuration and operation of the device on the encoding side will be described.

Figure 11:
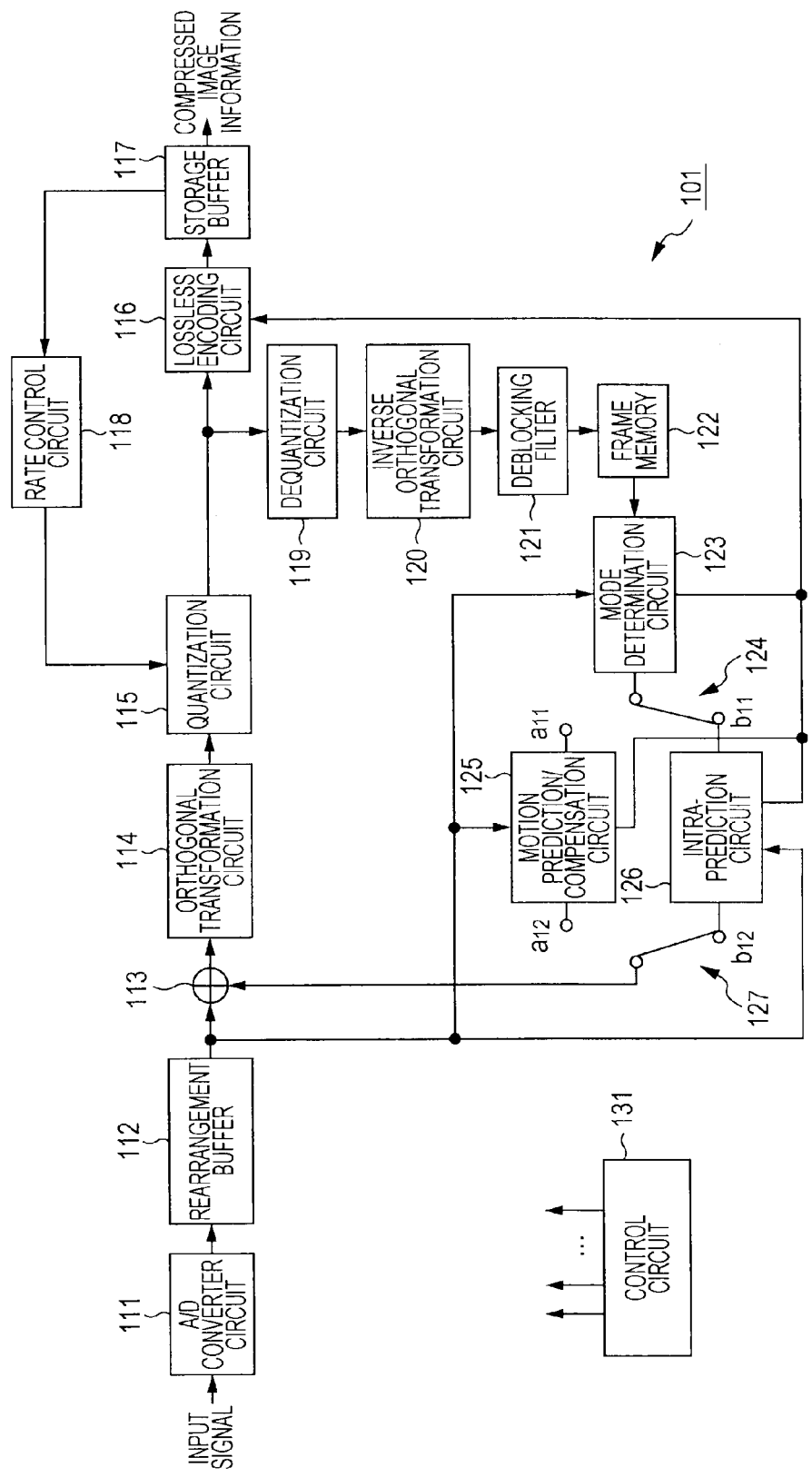
FIG. 11 is a block diagram illustrating a configuration example of an encoding device.

FIG. 11 is a block diagram illustrating a configuration example of an encoding device 101. Compressed image information that is obtained through encoding performed by the encoding device 101 is input to the decoding device 1 in FIG. 3.

An A/D converter circuit 111 performs A/D conversion on an input signal and outputs an image to a rearrangement buffer 112.

The rearrangement buffer 112 performs rearrangement of frames in accordance with the GOP (Group of Pictures) structure of compressed image information, and outputs images in certain units, such as macroblocks. The image output from the rearrangement buffer 112 is supplied to an adder circuit 113, a mode determination circuit 123, a motion prediction/compensation circuit 125, and an intra-prediction circuit 126.

The adder circuit 113 obtains the difference between the image supplied from the rearrangement buffer 112 and a prediction image that is generated by the motion prediction/compensation circuit 125 or the intra-prediction circuit 126 and that is supplied via a switch 127, and outputs the residual to an orthogonal transformation circuit 114. As the prediction image is more similar to an original image and as the residual obtained here is smaller, the amount of code assigned to the residual is smaller, and thus the encoding efficiency is high.

The orthogonal transformation circuit 114 performs orthogonal transformation, such as discrete cosine transformation or Karhunen-Loeve transformation, on the residual supplied from the adder circuit 113, and outputs a transformation coefficient obtained by performing the orthogonal transformation to a quantization circuit 115.

The quantization circuit 115 quantizes the transformation coefficient supplied from the orthogonal transformation circuit 114 in accordance with the control performed by a rate control circuit 118, and outputs the quantized transformation coefficient. The transformation coefficient quantized by the quantization circuit 115 is supplied to a lossless encoding circuit 116 and a dequantization circuit 119.

The lossless encoding circuit 116 compresses the transformation coefficient supplied from the quantization circuit 115 by performing lossless encoding, such as variable-length encoding or arithmetic encoding, and outputs the information to a storage buffer 117.

Also, the lossless encoding circuit 116 sets the value of an identification flag in accordance with the information supplied from the mode determination circuit 123, and describes the identification flag in the header of the image. On the basis of the identification flag described by the lossless encoding circuit 116, a prediction mode is determined in the decoding device 1 as described above.

The lossless encoding circuit 116 also describes the information supplied from the motion prediction/compensation circuit 125 or the intra-prediction circuit 126 in the header of the image. Motion vectors and so fourth detected when inter-prediction is performed are supplied from the motion prediction/compensation circuit 125, and the information about an applied intra-prediction mode is supplied from the intra-prediction circuit 126.

The storage buffer 117 temporarily stores the information supplied from the lossless encoding circuit 116, and outputs it as compressed image information at certain timing. The storage buffer 117 outputs the information about the amount of generated code to a rate control circuit 118.

The rate control circuit 118 calculates a quantization scale on the basis of the amount of code output from the storage buffer 117, and controls the quantization circuit 115 so that quantization is performed with the calculated quantization scale.

The dequantization circuit 119 performs dequantization on the transformation coefficient quantized by the quantization circuit 115, and outputs the transformation coefficient to an inverse orthogonal transformation circuit 120.

The inverse orthogonal transformation circuit 120 performs inverse orthogonal transformation on the transformation coefficient supplied from the dequantization circuit 119, and outputs an obtained image to a deblocking filter 121.

The deblocking filter 121 removes block noise that appears in the locally decoded image, and outputs the image from which block noise has been removed to a frame memory 122.

The frame memory 122 stores the image supplied from the deblocking filter 121. The image stored in the frame memory 122 is read by the mode determination circuit 123 as necessary.

The mode determination circuit 123 determines whether intra-coding is to be performed or inter-coding is to be performed on the basis of the image stored in the frame memory 122 and the original image supplied from the rearrangement buffer 112. Also, if the mode determination circuit 123 determines to perform inter-coding, the mode determination circuit 123 determines any mode among the unidirectional prediction mode, the bidirectional prediction mode, and the filtering prediction mode. The mode determination circuit 123 outputs the information showing a determination result as mode information to the lossless encoding circuit 116.

If the mode determination circuit 123 determines to perform inter-coding, the mode determination circuit 123 outputs a frame that is stored in the frame memory 122 and that is obtained through local decoding to the motion prediction/compensation circuit 125 via a switch 124.

Also, if the mode determination circuit 123 determines to perform intra-coding, the mode determination circuit 123 outputs a frame that is stored in the frame memory 122 and that is obtained through local decoding to the intra-prediction circuit 126.

The switch 124 connects to a terminal $a_{11}$ when inter-coding is performed, and connects to a terminal $b_{11}$ when intra-coding is performed. The switching of the switch 124 is controlled by a control circuit 131, for example.

The motion prediction/compensation circuit 125 detects motion vectors on the basis of an original image supplied from the rearrangement buffer 112 and reference frames read from the frame memory 122, and outputs the detected motion vectors to the lossless encoding circuit 116. Also, the motion prediction/compensation circuit 125 performs motion compensation using the detected motion vectors and the reference frames to generate a prediction image, and outputs the generated prediction image to the adder circuit 113 via the switch 127.

The intra-prediction circuit 126 performs intra-prediction on the basis of an original image supplied from the rearrangement buffer 112 and reference frames that are locally decoded and that are stored in the frame memory 122, so as to generate a prediction image. The intra-prediction circuit 126 outputs the generated prediction image to the adder circuit 113 via the switch 127, and outputs intra-prediction mode information to the lossless encoding circuit 116.

The switch 127 connects to a terminal $a_{12}$ or a terminal $b_{12}$, and outputs a prediction image generated by the motion prediction/compensation circuit 125 or the intra-prediction circuit 126 to the adder circuit 113.

The control circuit 131 switches the connection of the switches 124 and 127 in accordance with the mode determined by the mode determination circuit 123 and controls the entire operation of the encoding device 101.

Figure 12:
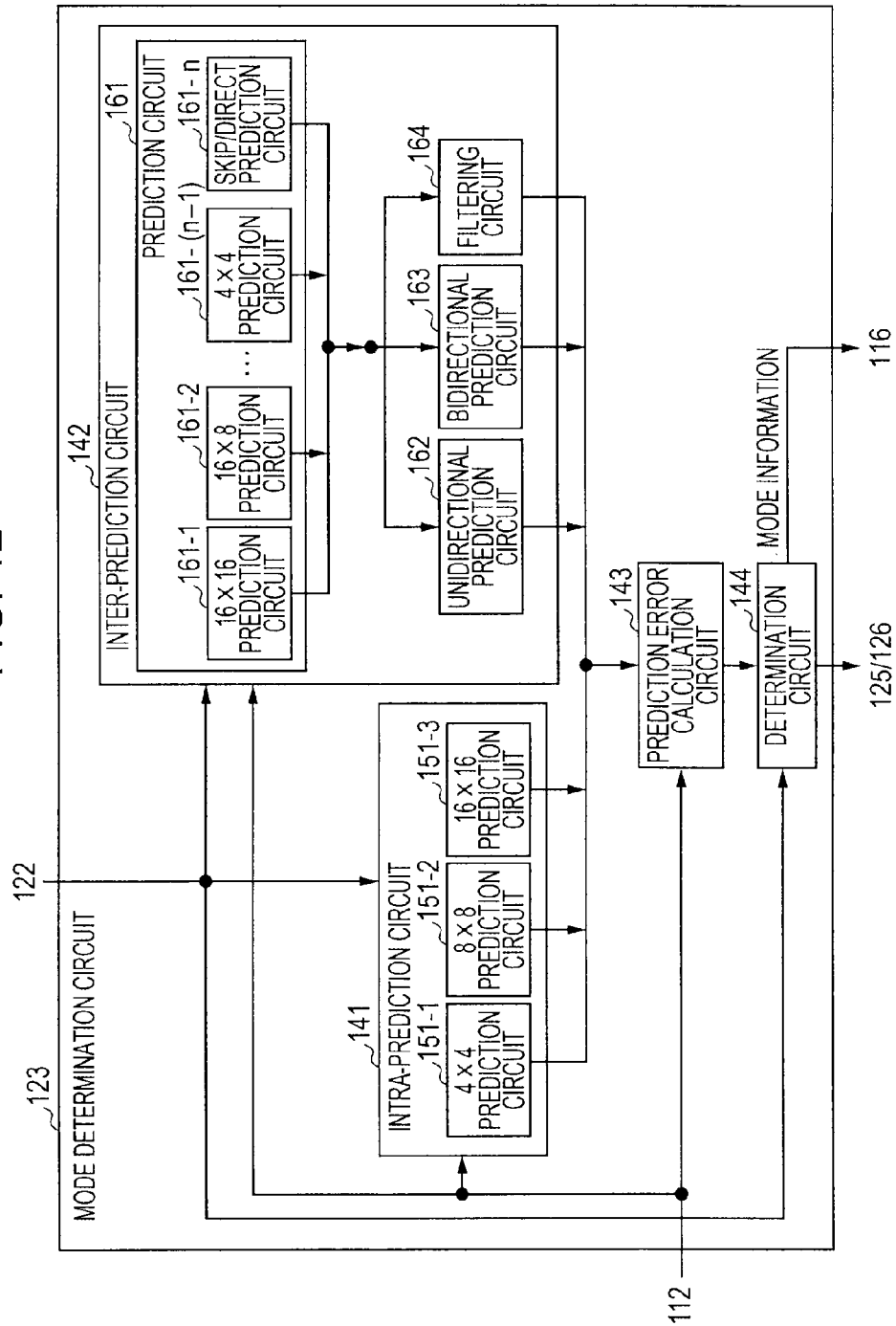
FIG. 12 is a block diagram illustrating a configuration example of the mode determination circuit in FIG. 11.

FIG. 12 is a block diagram illustrating a configuration example of the mode determination circuit 12 in FIG. 11.

As illustrated in FIG. 12, the mode determination circuit 123 is constituted by an intra-prediction circuit 141, an inter-prediction circuit 142, a prediction error calculation circuit 143, and a determination circuit 144. In the mode determination circuit 123, intra-prediction and inter-prediction are performed on blocks having sizes different from each other, and the prediction mode to be used for prediction is determined on the basis of the result. As for inter-prediction, a process is performed in the individual prediction modes of unidirectional prediction mode, bidirectional prediction mode, and filtering prediction mode. The original image supplied from the rearrangement buffer 112 is input to the intra-prediction circuit 141, the inter-prediction circuit 142, and the prediction error calculation circuit 143.

The intra-prediction circuit 141 performs intra-prediction in units of blocks of sizes different from each other on the basis of the original image and an image read from the frame memory 122, and outputs a generated prediction image to the prediction error calculation circuit 143. In a 4×4 prediction circuit 151-1, intra-prediction is performed in units of blocks of 4×4 pixels. In an 8×8 prediction circuit 151-2, intra-prediction is performed in units of blocks of 8×8 pixels. In a 16×16 prediction circuit 151-3, intra-prediction is performed in units of blocks of 16×16 pixels.

A prediction circuit 161 of the inter-prediction circuit 142 detects motion vectors in units of blocks of sizes different from each other on the basis of the original image and reference frames read from the frame memory 122. Also, the prediction circuit 161 performs motion compensation on the basis of the detected motion vectors, and outputs motion compensation images used for generating a prediction image.

In a 16×16 prediction circuit 161-1, a process is performed on images in units of blocks of 16×16 pixels. In a 16×8 prediction circuit 161-2, a process is performed on images in units of blocks of 16×8 pixels. Also, in a 4×4 prediction circuit 161-($n$−1), a process is performed on images in units of blocks of 4×4 pixels. In a skip/direct prediction circuit 161-$n$, motion vectors are detected in a skip prediction mode or direct prediction mode, and motion compensation is performed using the detected motion vectors.

Motion compensation images extracted from a plurality of reference frames arranged in one direction with respect to the current frame are supplied from the respective circuits of the prediction circuit 161 to a unidirectional prediction circuit 162. Also, motion compensation images extracted from a plurality of reference frames arranged in two directions with respect to the current frame are supplied from the respective circuits of the prediction circuit 161 to a bidirectional prediction circuit 163.

In a case where filtering prediction is performed using motion compensation images extracted from a plurality of reference frames arranged in one direction, as described above, the motion compensation images extracted from the reference frames arranged in one direction are supplied from the respective circuits of the prediction circuit 161 to a filtering circuit 164. In a case where filtering prediction is performed using motion compensation images extracted from a plurality of reference frames arranged in two directions, the motion compensation images extracted from the reference frames arranged in two directions are supplied from the respective circuits of the prediction circuit 161 to the filtering circuit 164.

The unidirectional prediction circuit 162 performs unidirectional prediction using motion compensation images of sizes different from each other supplied from the respective circuits of the prediction circuit 161, thereby generating a prediction image, and outputs the generated prediction image to the prediction error calculation circuit 143. For example, the unidirectional prediction circuit 162 generates a prediction image by regarding the pixel values of any of a plurality of motion compensation images of 16×16 pixels supplied from the prediction circuit 161-1 as the pixel values of the prediction image.

The bidirectional prediction circuit 163 performs bidirectional prediction using motion compensation images of sizes different from each other supplied from the respective circuits of the prediction circuit 161, thereby generating a prediction image, and outputs the generated prediction image to the prediction error calculation circuit 143. For example, the bidirectional prediction circuit 163 generates a prediction image by regarding the average values of the pixel values of a plurality of motion compensation images of 16×16 pixels supplied from the prediction circuit 161-1 as the pixel values of the prediction image.

The filtering circuit 164 performs filtering prediction using motion compensation images of sizes different from each other supplied from the respective circuits of the prediction circuit 161, thereby generating a prediction image, and outputs the generated prediction image to the prediction error calculation circuit 143. The filtering circuit 164 corresponds to the filtering circuit 45 of the decoding device 1 and has the same configuration as the configuration illustrated in FIG. 8.

For example, in the case of generating a prediction image using the motion compensation images $MC_0$ and $MC_1$ of 16×16 pixels supplied from the prediction circuit 161-1, the filtering circuit 164 obtains the difference between the motion compensation images $MC_0$ and $MC_1$, and performs low-pass filtering on the obtained difference image. Also, the filtering circuit 164 performs high-pass filtering on the output of the low-pass filtering, and adds the image of the output thereof in which the gain has been adjusted and the image of the output of the low-pass filtering in which the gain has been adjusted. The filtering circuit 164 adds the image as an addition result representing a high-frequency component to the motion compensation image $MC_0$, thereby generating a prediction image, and outputs the generated prediction image to the prediction error calculation circuit 143.

The prediction error calculation circuit 143 obtains the differences between the original image and the respective prediction images supplied from the respective circuits of the intra-prediction circuit 141, and outputs a residual signal representing the obtained differences to the determination circuit 144. Also, the prediction error calculation circuit 143 obtains the differences between the original image and the respective prediction images supplied from the unidirectional prediction circuit 162, the bidirectional prediction circuit 163, and the filtering circuit 164 of the inter-prediction circuit 142, and outputs a residual signal representing the obtained differences to the determination circuit 144.

The determination circuit 144 measures the strength of the residual signals supplied from the prediction error calculation circuit 143, and determines the prediction method used for generating a prediction image having a small difference from the original image to be the prediction method for generating a prediction image to be used for encoding. The determination circuit 144 outputs the information showing the determination result, which is mode information, to the lossless encoding circuit 116. The mode information includes information showing the block size to be used as the unit of a process, etc.

Also, if the determination circuit 144 determines to generate a prediction image using inter-prediction (determines to perform inter-coding), the determination circuit 144 outputs reference frames read from the frame memory 122 to the motion prediction/compensation circuit 125 together with the mode information. If the determination circuit 144 determines to generate a prediction image using intra-prediction (determines to perform intra-coding), the determination circuit 144 outputs an image that is read from the frame memory 122 and that is to be used for intra-prediction to the intra-prediction circuit 126 together with the mode information.

Figure 13:
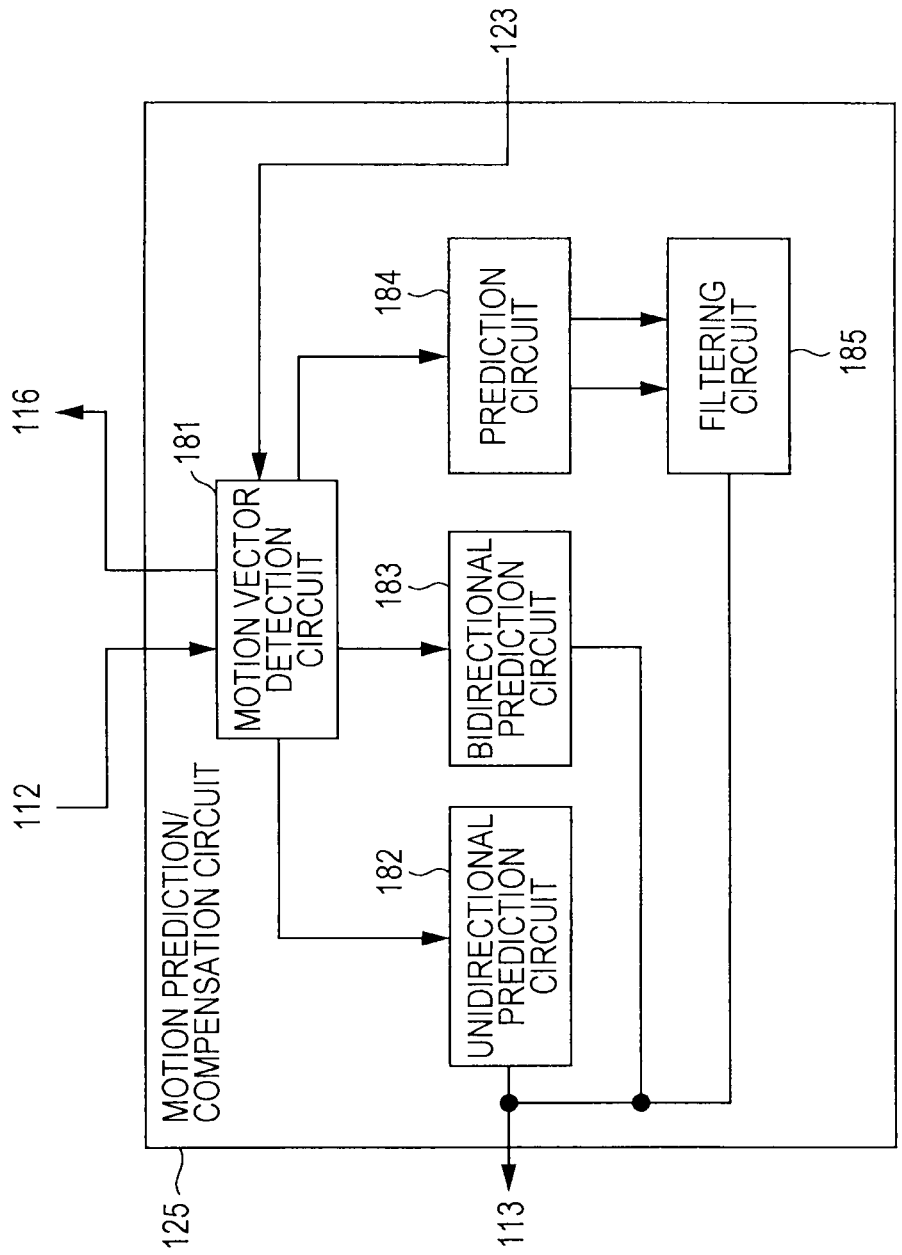
FIG. 13 is a block diagram illustrating a configuration example of the motion prediction/compensation circuit in FIG. 11.

FIG. 13 is a block diagram illustrating a configuration example of the motion prediction/compensation circuit 125 in FIG. 11.

As illustrated in FIG. 13, the motion prediction/compensation circuit 125 is constituted by a motion vector detection circuit 181, a unidirectional prediction circuit 182, a bidirectional prediction circuit 183, a prediction circuit 184, and a filtering circuit 185. The motion prediction/compensation circuit 125 has a configuration similar to that of the motion prediction/compensation circuit 21 illustrated in FIG. 5 except that the motion vector detection circuit 181 is provided instead of the prediction mode determination circuit 41.

The motion vector detection circuit 181 detects motion vectors by performing block matching or the like on the basis of an original image supplied from the rearrangement buffer 112 and reference frames supplied from the mode determination circuit 123. The motion vector detection circuit 181 refers to the mode information supplied from the mode determination circuit 123, and outputs the motion vectors together with the reference frames to any of the unidirectional prediction circuit 182, the bidirectional prediction circuit 183, and the prediction circuit 184.

The motion vector detection circuit 181 outputs the motion vectors together with the reference frames to the unidirectional prediction circuit 182 if unidirectional prediction is selected, and outputs those pieces of information to the bidirectional prediction circuit 183 if bidirectional prediction is selected to be performed. The motion vector detection circuit 181 outputs the motion vectors together with the reference frames to the prediction circuit 184 if filtering prediction is selected to be performed.

Like the unidirectional prediction circuit 42 in FIG. 5, the unidirectional prediction circuit 182 generates a prediction image by performing unidirectional prediction. The unidirectional prediction circuit 182 outputs the generated prediction image to the adder circuit 113.

Like the bidirectional prediction circuit 43 in FIG. 5, the bidirectional prediction circuit 183 generates a prediction image by performing bidirectional prediction. The bidirectional prediction circuit 183 outputs the generated prediction image to the adder circuit 113.

Like the prediction circuit 44 in FIG. 5, the prediction circuit 184 extracts motion compensation images from a plurality of (e.g., two) reference frames, and outputs the extracted plurality of motion compensation images to the filtering circuit 185.

Like the filtering circuit 45 in FIG. 5, the filtering circuit 185 generates a prediction image by performing filtering prediction. The filtering circuit 185 outputs the generated prediction image to the adder circuit 113. Note that the filtering circuit 185 has a configuration similar to the configuration of the filtering circuit 45 illustrated in FIG. 8. Hereinafter, a description will be given by appropriately citing the configuration of the filtering circuit 45 illustrated in FIG. 8 as the configuration of the filtering circuit 185.

The prediction image generated through filtering prediction includes a large amount of high-frequency component compared to the prediction image generated through unidirectional prediction or bidirectional prediction, and is an image having a small difference from an original image. Thus, the amount of code assigned to a residual is small, and thus it is possible to increase the encoding efficiency.

Also, filtering prediction can be performed if the number of reference frames is at least two, and thus such an increase in encoding efficiency can be realized without complicating a process. For example, a residual from an original image can be decreased and the encoding efficiency can be increased by generating a highly precise prediction image with a large number of reference frames used in inter-prediction and by using it. In this case, however, the process is complicated because the number of reference frames is large.

Note that, when a prediction method is to be selected, a weight may be added to the strength of a residual signal in accordance with the amount of code in view of the amount of code of information, such as motion vectors required for prediction and an encoding mode, so that an optimum prediction method is selected. Accordingly, the encoding efficiency can be further improved. Also, in order to simplify an encoding process, a prediction method may be adaptively selected using a feature quantity in time and space directions of an input original image.

Next, a process performed by the encoding device 101 having the foregoing configuration will be described.

Figure 14:
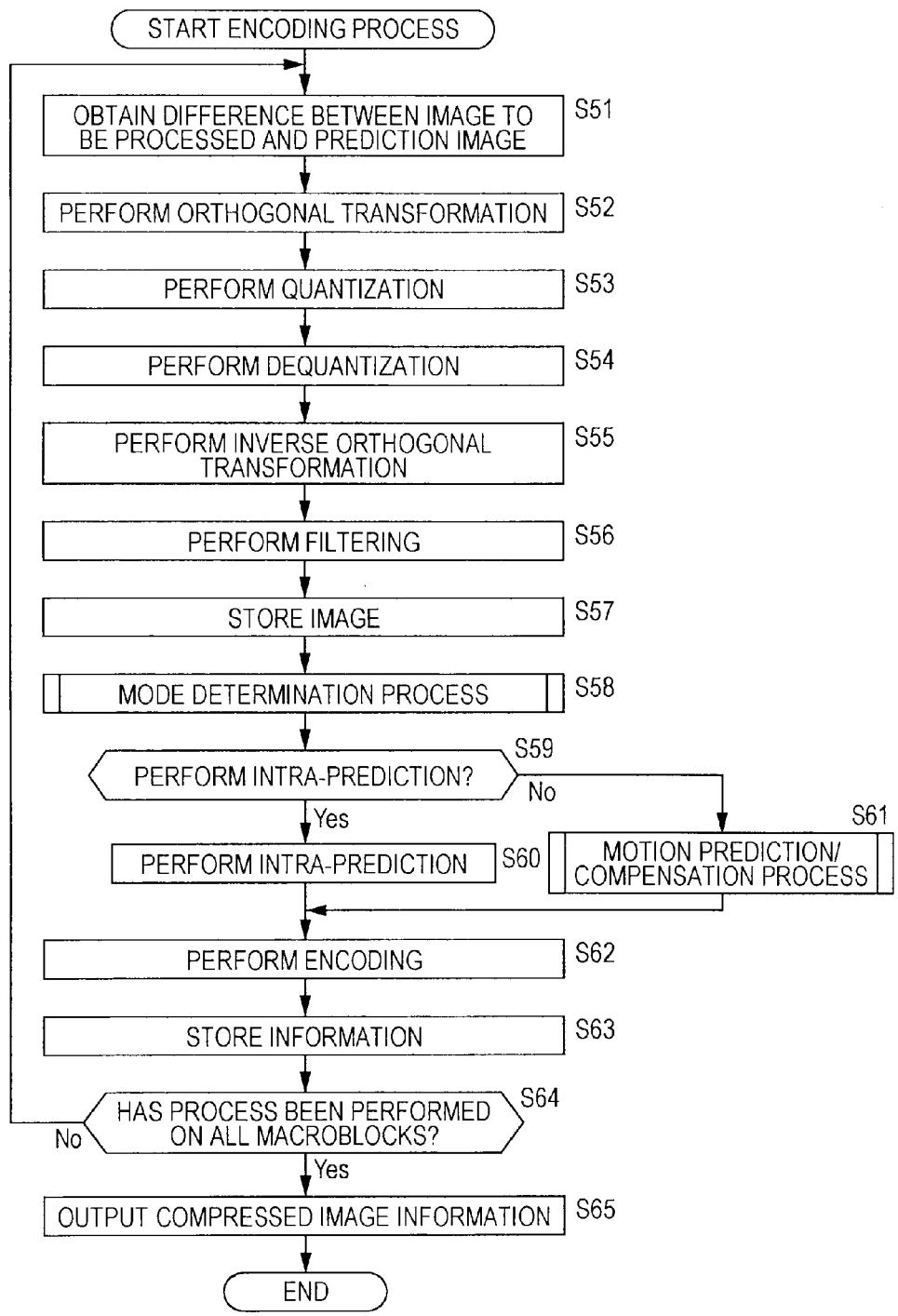
FIG. 14 is a flowchart for explaining an encoding process performed by the encoding device.

An encoding process performed by the encoding device 101 will be described with reference to the flowchart in FIG. 14. This process is started when an image in a certain unit, such as a macroblock, is output from the rearrangement buffer 112.

In step S51, the adder circuit 113 obtains the difference between an image supplied from the rearrangement buffer 112 and a prediction image generated by the motion prediction/compensation circuit 125 or the intra-prediction circuit 126, and outputs the residual to the orthogonal transformation circuit 114.

In step S52, the orthogonal transformation circuit 114 performs orthogonal transformation on the residual supplied from the adder circuit 113, and outputs a transformation coefficient to the quantization circuit 115.

In step S53, the quantization circuit 115 quantizes the transformation coefficient supplied from the orthogonal transformation circuit 114, and outputs the quantized transformation coefficient.

In step S54, the dequantization circuit 119 performs dequantization on the transformation coefficient quantized by the quantization circuit 115, and outputs the transformation coefficient to the inverse orthogonal transformation circuit 120.

In step S55, the inverse orthogonal transformation circuit 120 performs inverse orthogonal transformation on the transformation coefficient supplied from the dequantization circuit 119, and outputs an obtained image to the deblocking filter 121.

In step S56, the deblocking filter 121 performs filtering to remove block noise, and outputs the image from which block noise has been removed to the frame memory 122.

In step S57, the frame memory 122 stores the image supplied from the deblocking filter 121.

In step S58, a mode determination process is performed by the mode determination circuit 123. The prediction mode to be used for generating a prediction image is determined through the mode determination process. The mode determination process will be described below with reference to the flowchart in FIG. 15.

In step S59, the control circuit 131 judges whether intra-prediction is to be performed or not on the basis of the determination made by the mode determination circuit 123.

If it is judged in step S59 that intra-prediction is to be performed, the intra-prediction circuit 126 performs intra-prediction in step S60, and outputs a prediction image to the adder circuit 113.

On the other hand, if it is judged in step S59 that intra-prediction is not to be performed, that is, inter-prediction is to be performed, a motion prediction/compensation process is performed by the motion prediction/compensation circuit 125 in step S61, and a prediction image is output to the adder circuit 113. The motion prediction/compensation process will be described below with reference to the flowchart in FIG. 16.

In step S62, the lossless encoding circuit 116 compresses the transformation coefficient supplied from the quantization circuit 115, and outputs it to the storage buffer 117. Also, the lossless encoding circuit 116 describes an identification flag in the header of the image in accordance with the information supplied from the mode determination circuit 123, and describes a motion vector supplied from the motion prediction/compensation circuit 125 in the header of the image.

In step S63, the storage buffer 117 temporarily stores the information supplied from the lossless encoding circuit 116.

In step S64, the control circuit 131 judges whether the foregoing process has been performed on the macroblocks in one entire frame or not. If it is judged that the process has not been performed on the macroblocks in one entire frame, the process is repeated on another macroblock from step S51.

On the other hand, if it is judged in step S64 that the process has been performed on the macroblocks in one entire frame, the storage buffer 117 outputs compressed image information in accordance with the control performed by the control circuit 131 in step S65. The foregoing process is performed on individual frames.

Figure 15:
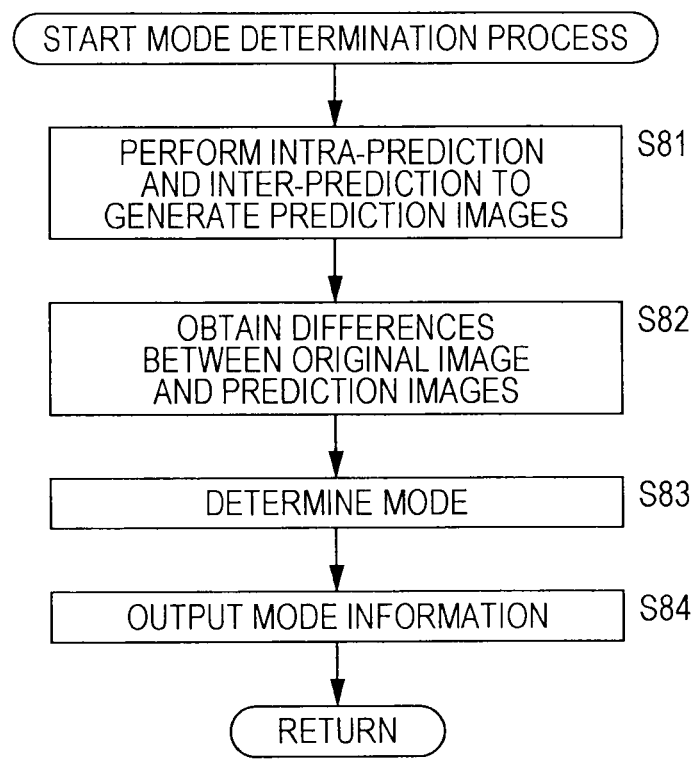
FIG. 15 is a flowchart for explaining a mode determination process performed in step S58 in FIG. 14.

Next, the mode determination process that is performed in step S58 in FIG. 14 will be described with reference to the flowchart in FIG. 15.

In step S81, the intra-prediction circuit 141 and the inter-prediction circuit 142 perform intra-prediction and inter-prediction, respectively, on blocks having sizes different from each other, thereby generating prediction images. The generated prediction images are supplied to the prediction error calculation circuit 143.

In step S82, the prediction error calculation circuit 143 obtains the differences between the original image and the respective prediction images supplied from the respective circuits of the intra-prediction circuit 141 and from the uni-directional prediction circuit 162, the bidirectional prediction circuit 163, and the filtering circuit 164 of the inter-prediction circuit 142. The prediction error calculation circuit 143 outputs a residual signal to the determination circuit 144.

In step S83, the determination circuit 144 determines the prediction method for generating a prediction image that is to be supplied to the adder circuit 113 on the basis of the strength of the residual signal supplied from the prediction error calculation circuit 143.

In step S84, the determination circuit 144 outputs mode information, which is information about the determined prediction method, to the lossless encoding circuit 116. After that, the process returns to step S58 in FIG. 14, and the subsequent process is performed.

Figure 16:
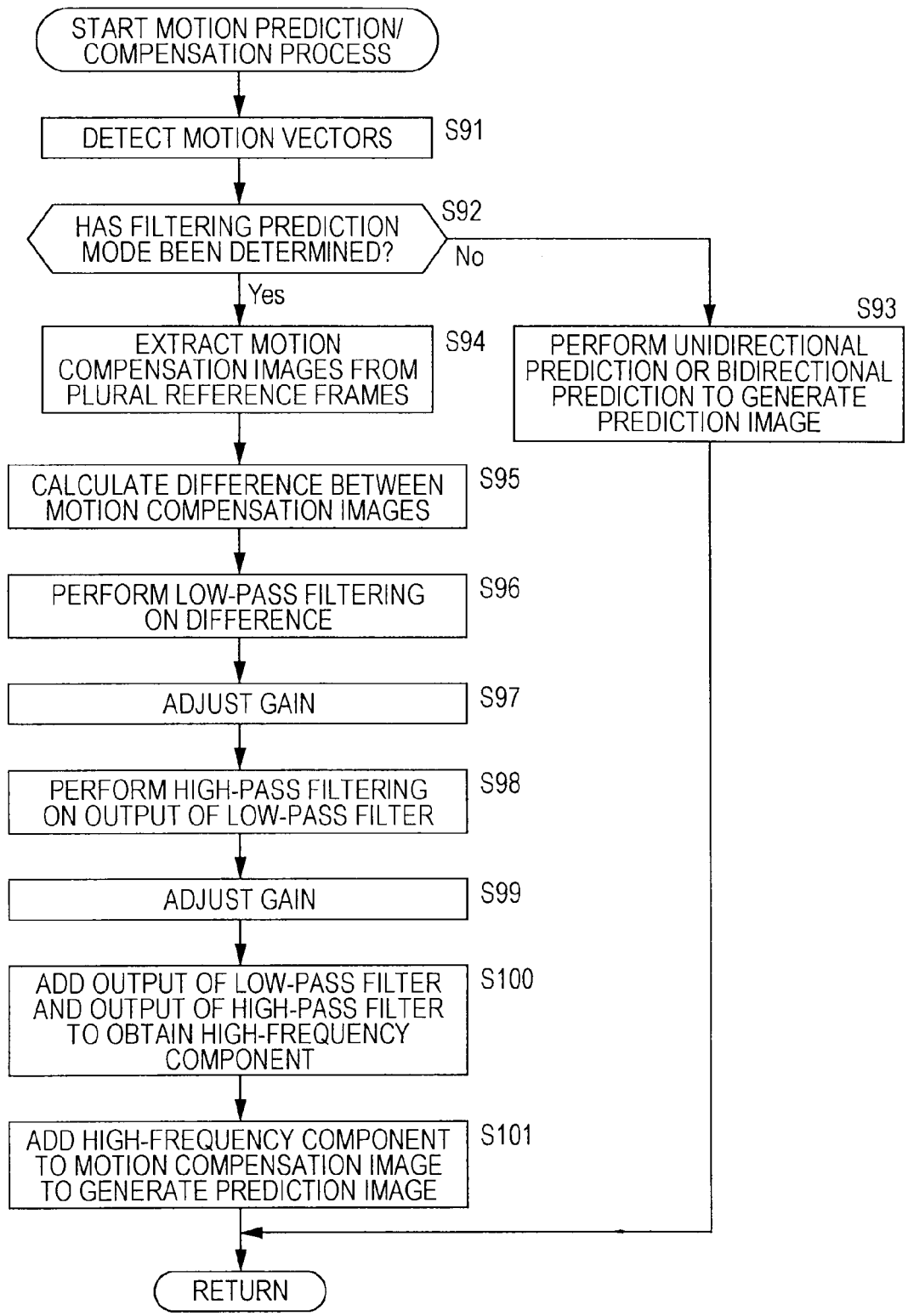
FIG. 16 is a flowchart for explaining a motion prediction/compensation process performed in step S61 in FIG. 14.

Next, the motion prediction/compensation process that is performed in step S61 in FIG. 14 will be described with reference to the flowchart in FIG. 16.

In step S91, the motion vector detection circuit 181 detects motion vectors on the basis of an original image and reference frames.

In step S92, the motion vector detection circuit 181 judges whether the mode determination circuit 123 has determined that the process is to be performed in the filtering prediction mode or not.

If it is judged in step S92 that performing the process in the filtering prediction mode has not been determined, unidirectional prediction or bidirectional prediction is performed in step S93, and a prediction image is generated.

That is, if performing the process in the unidirectional prediction mode has been determined, motion vectors are supplied from the motion vector detecting circuit 181 to the unidirectional prediction circuit 182, and unidirectional prediction is performed in the unidirectional prediction circuit 182. Also, if performing the process in the bidirectional prediction mode has been determined, motion vectors are supplied from the motion vector detecting circuit 181 to the bidirectional prediction circuit 183, and bidirectional prediction is performed in the bidirectional prediction circuit 183. After the prediction image has been output to the adder circuit 113, the process returns to step S61 in FIG. 14, and the subsequent process is performed.

On the other hand, if it is judged in step S92 that performing the process in the filtering prediction mode has been determined, the prediction circuit 184 extracts motion compensation images from a plurality of reference frames and outputs them to the filtering circuit 185 in step S94. Motion vectors are supplied from the motion vector detection circuit 181 to the prediction circuit 184, and motion compensation images are extracted using them.

In step S95, the difference calculation circuit 51 (FIG. 8) of the filtering circuit 185 calculates the difference between the motion compensation image $MC_0$ and the motion compensation image $MC_1$, and outputs a difference image to the low-pass filter circuit 52.

In step S96, the low-pass filter circuit 52 of the filtering circuit 185 performs low-pass filtering on the difference image supplied from the difference calculation circuit 51, and outputs an obtained image to the gain adjustment circuit 53 and the high-pass filter circuit 54.

In step S97, the gain adjustment circuit 53 of the filtering circuit 185 adjusts the gain of the difference image supplied from the low-pass filter circuit 52, and outputs the image in which the gain has been adjusted to the adder circuit 56.

In step S98, the high-pass filter circuit 54 of the filtering circuit 185 performs high-pass filtering on the difference image supplied from the low-pass filter circuit 52, and outputs an obtained image to the gain adjustment circuit 55.

In step S99, the gain adjustment circuit 55 of the filtering circuit 185 adjusts the gain of the image supplied from the high-pass filter circuit 54, and outputs the image in which the gain has been adjusted to the adder circuit 56.

In step S100, the adder circuit 56 of the filtering circuit 185 adds the image supplied from the gain adjustment circuit 53 and the image supplied from the gain adjustment circuit 55 to obtain a high-frequency component. The obtained high-frequency component is supplied from the adder circuit 56 to the adder circuit 57.

In step S101, the adder circuit 57 of the filtering circuit 185 adds the image supplied from the adder circuit 56 (high-frequency component) to the motion compensation image $MC_0$, and outputs an obtained image as a prediction image to the adder circuit 113. After that, the process returns to step S61 in FIG. 14, and the subsequent process is performed.

In this way, encoding is performed using a prediction image generated through filtering prediction, so that the encoding efficiency can be increased.

In the description given above, the filtering circuits 45 and 185 have the configuration illustrated in FIG. 8, but this configuration can be changed as necessary.

Figure 17:
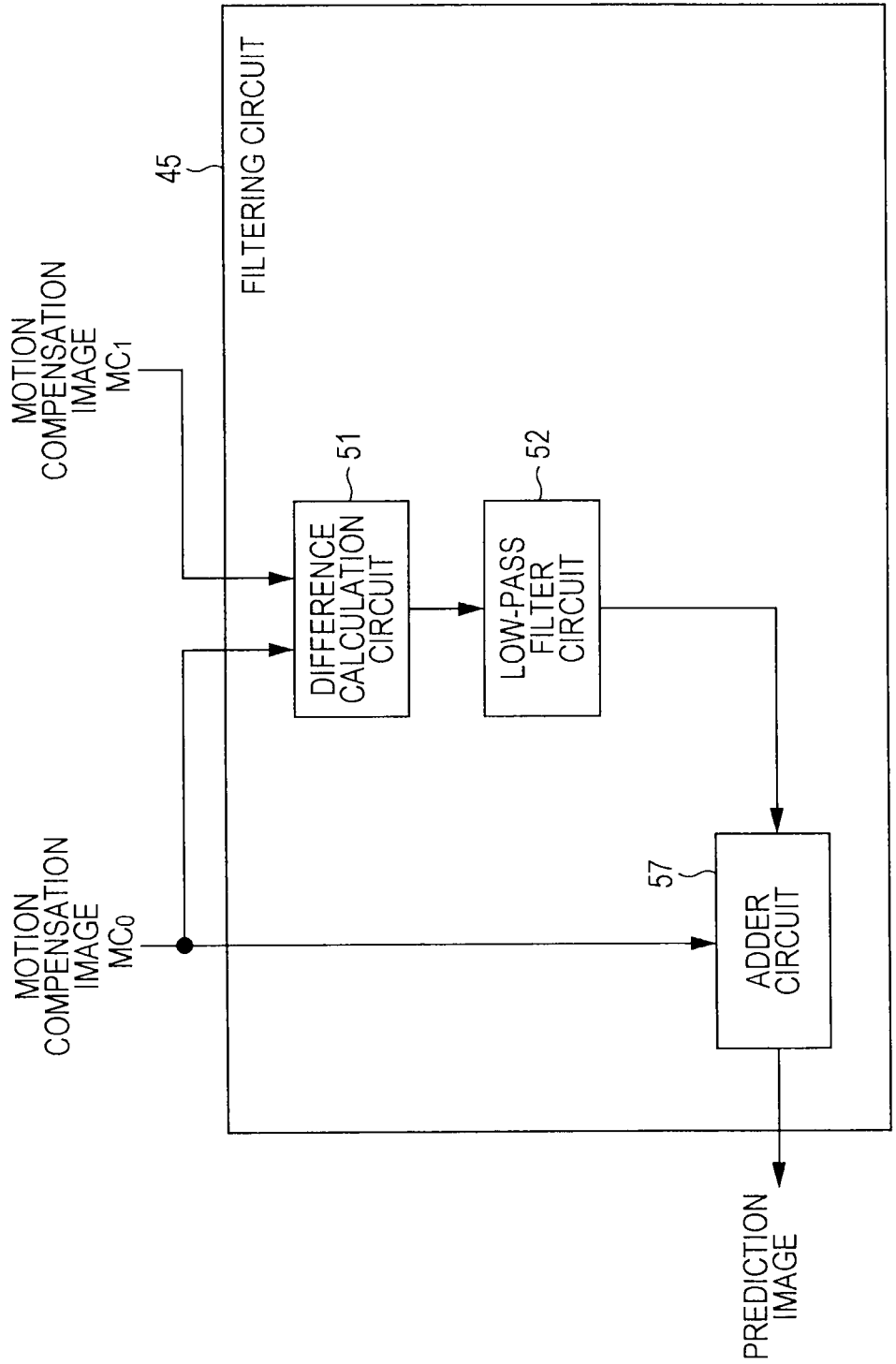
FIG. 17 is a block diagram illustrating another configuration example of the filtering circuit.

FIG. 17 is a block diagram illustrating another configuration example of the filtering circuit 45. The configurations corresponding to the configurations illustrated in FIG. 8 are denoted by the same reference numerals. A redundant description will be appropriately omitted.

The difference calculation circuit 51 in FIG. 17 calculates the difference between the motion compensation image $MC_0$ and the motion compensation image $MC_1$, and outputs a difference image to the low-pass filter circuit 52.

The low-pass filter circuit 52 performs low-pass filtering on the difference image supplied from the difference calculation circuit 51, and outputs an obtained image to the adder circuit 57.

The adder circuit 57 adds the image supplied from the low-pass filter circuit 52 to the motion compensation image $MC_0$, and outputs an obtained image as a prediction image.

By using the configuration illustrated in FIG. 17, the amount of process can be decreased compared to the case of using the configuration in FIG. 8, and a high-speed operation can be realized.

Figure 18:
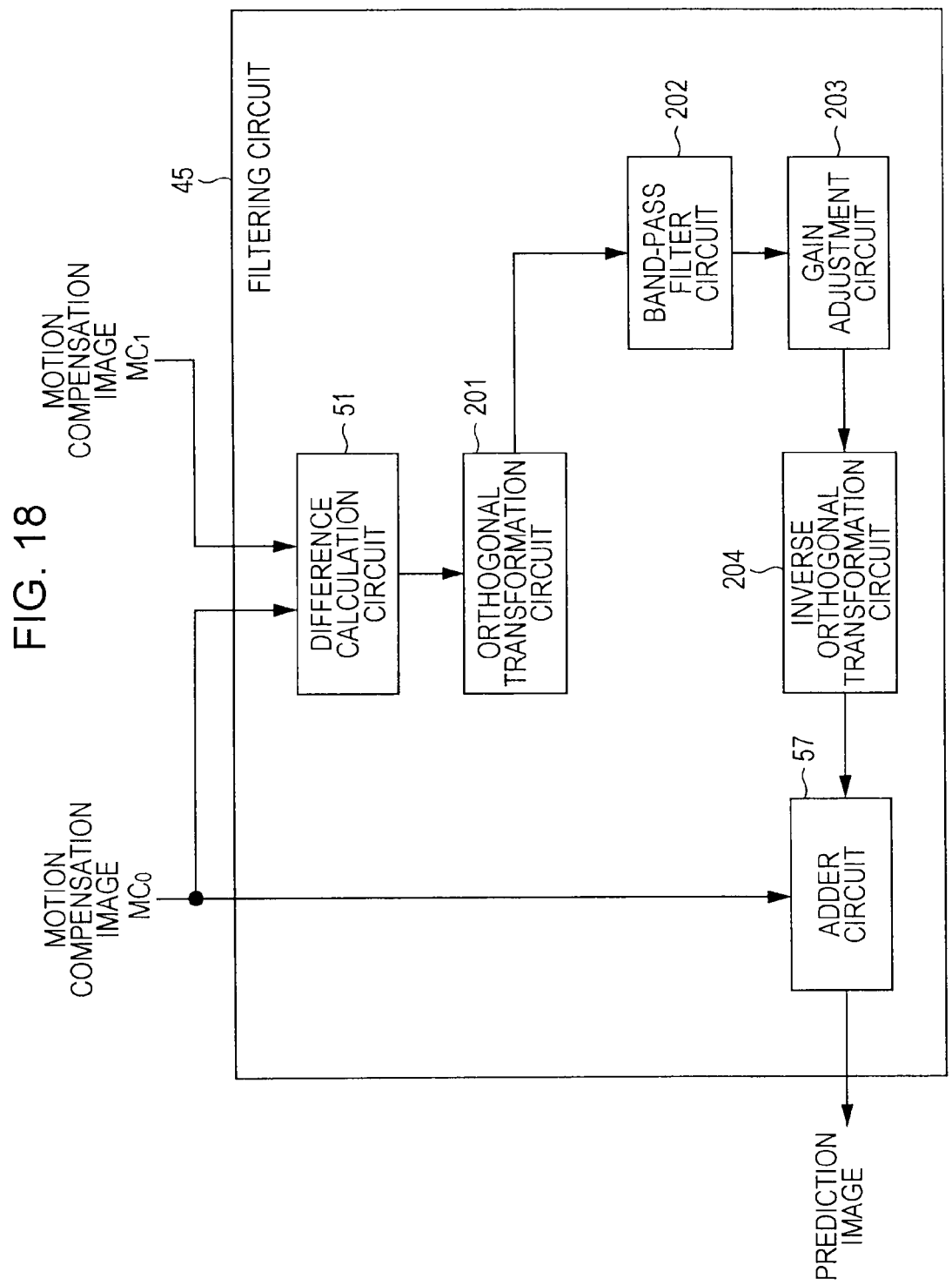
FIG. 18 is a block diagram illustrating still another configuration example of the filtering circuit.

FIG. 18 is a block diagram illustrating still another configuration example of the filtering circuit 45. The configurations corresponding to the configurations illustrated in FIG. 8 are denoted by the same reference numerals. A redundant description will be appropriately omitted.

In the filtering circuit 45 in FIG. 18, filtering is performed on a signal in a frequency domain, not on a signal in a time domain. Both the filtering circuits 45 illustrated in FIG. 8 and FIG. 17 perform filtering on a signal in a time domain.

The difference calculation circuit 51 in FIG. 18 calculates the difference between the motion compensation image $MC_0$ and the motion compensation image $MC_1$, and outputs a difference image to an orthogonal transformation circuit 201.

The orthogonal transformation circuit 201 performs orthogonal transformation represented by DCT (Discrete Cosine Transform), Hadamard transformation, and KLT (Karhunen Loeve Transformation) on the difference image, and outputs a signal after orthogonal transformation to a band-pass filter circuit 202. The orthogonal transformation is performed, and filtering is performed on a signal in a frequency domain, whereby a highly precise filtering process can be performed more flexibly compared to the case of performing filtering on a signal in a time domain.

When DCT is used as orthogonal transformation, an output DF after orthogonal transformation is expressed by the following equation (10). In equation (10), DCT(X) represents that a two-dimensional DCT process is performed on signal X.

[Math. 10]

$$DF = DCT(D) \qquad (10)$$

The band-pass filter circuit 202 performs filtering on the output of the orthogonal transformation circuit 201, and outputs a signal in a certain band.

A gain adjustment circuit 203 adjusts the gain of the output of the band-pass filter circuit 202 by multiplying it by $\alpha$, and also adjusts a frequency component. An output XF of the gain adjustment circuit 203 is expressed by the following equation (11). In equation (11), BPF(X) represents that a band-pass filter process is performed on signal X.

[Math. 11]

$$XF = \alpha \cdot BPF(DF) \qquad (11)$$

An inverse orthogonal transformation circuit 204 performs inverse orthogonal transformation in a method corresponding to the orthogonal transformation performed by the orthogonal transformation circuit 201, so as to transform the signal in a frequency domain supplied from the gain adjustment circuit 203 into a signal in a time domain. For example, when DCT is used as orthogonal transformation in the orthogonal transformation circuit 201, IDCT is performed in the inverse orthogonal transformation circuit 204. An output X of the inverse orthogonal transformation circuit 204 is expressed by the following equation (12). In equation (12), IDCT(X) represents that a two-dimensional IDCT process is performed on signal X.

[Math. 12]

$$X = IDCT(XF) \qquad (12)$$

The adder circuit 57 adds the signal X supplied from the inverse orthogonal transformation circuit 204 to the motion compensation image $MC_0$ in a time domain, and outputs an obtained image as a prediction image. The prediction image $S(i, j)$, which is the final output of the adder circuit 57, is expressed by the following equation (13).

[Math. 13]

$$S(i,j) = MC_0(i,j) + X(i,j) \qquad (13)$$

In this way, highly precise prediction image can be generated also by performing filtering on a signal in a frequency domain.

Also, in the description given above, filtering prediction is performed using two reference frames, but two or more frames may be used as reference frames.

Figure 19:
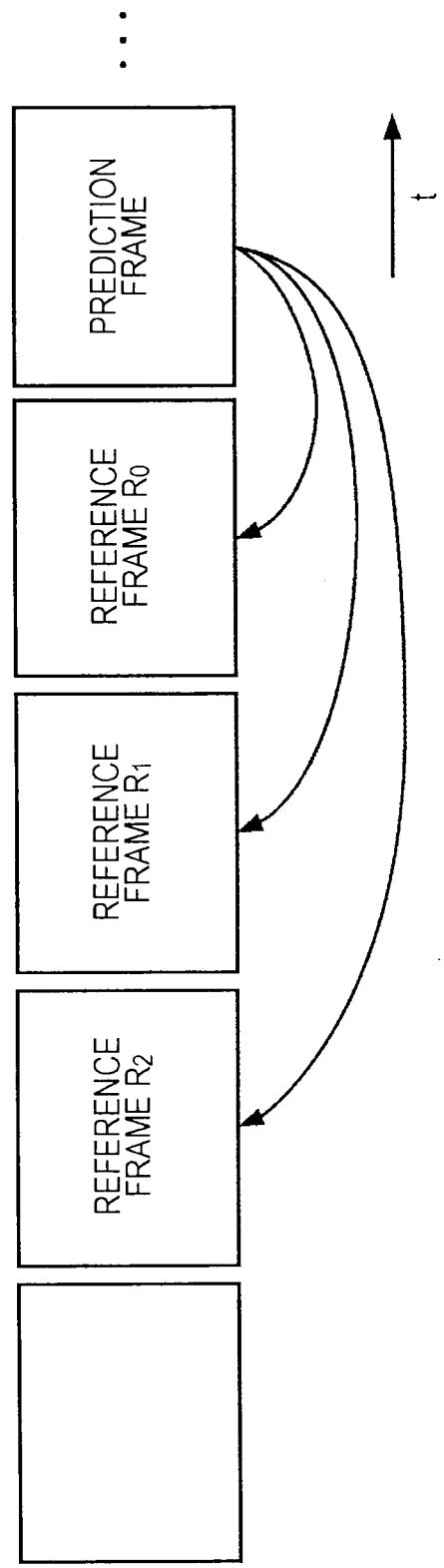
FIG. 19 is a diagram illustrating an example of the case of using three reference frames.

FIG. 19 is a diagram illustrating an example of the case of using three reference frames.

In the example in FIG. 19, with the time of a prediction frame serving as a basis, three frames that are temporally one unit of time before, two units of time before, and three units of time before are regarded as reference frames. The frame that is closer to and one unit of time before the prediction frame is regarded as a reference frame $R_0$, the frame that is one unit of time before the reference frame $R_0$ is regarded as a reference frame $R_1$, and the frame that is one unit of time before the reference frame $R_1$ is regarded as a reference frame $R_2$.

Figure 20:
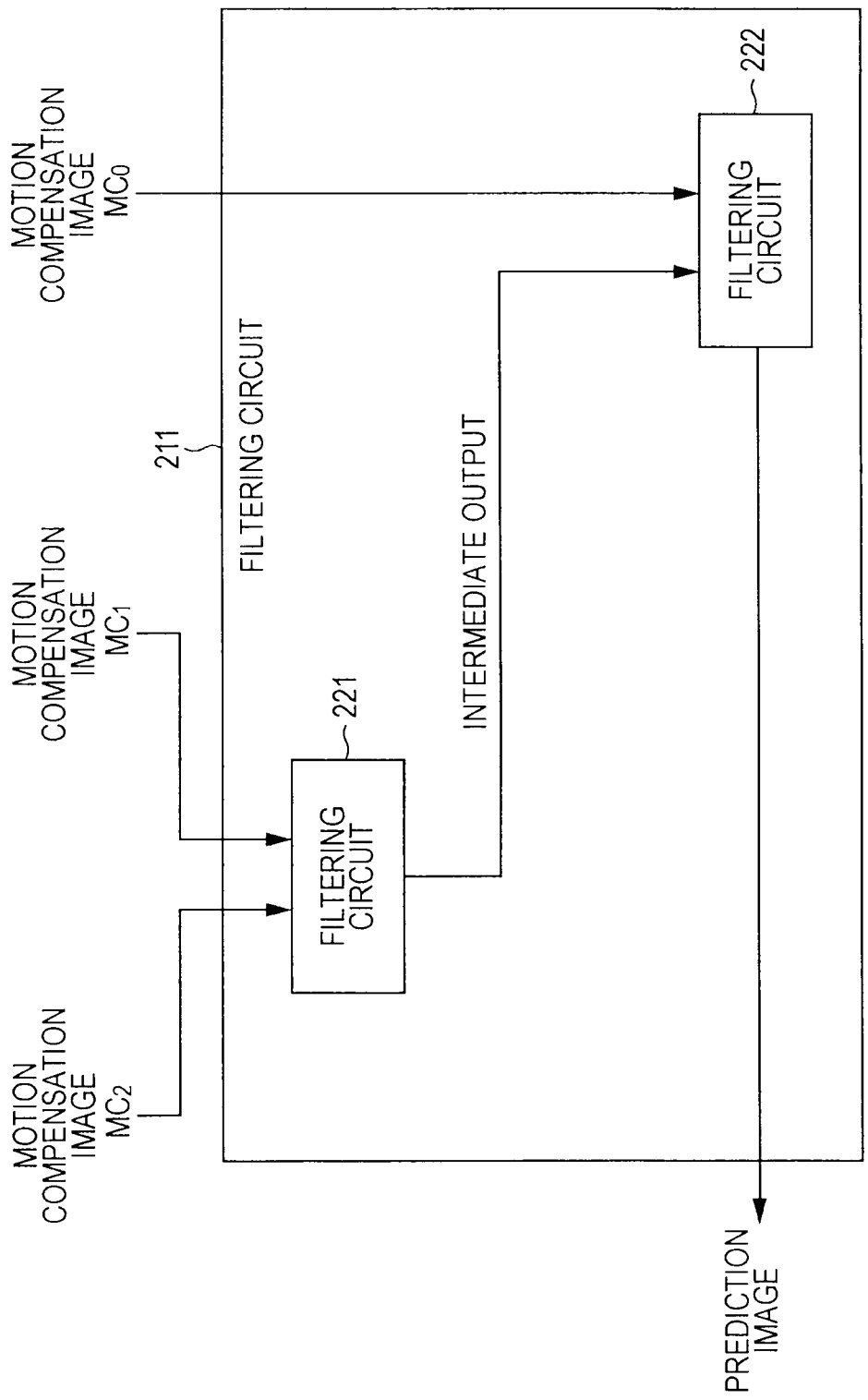
FIG. 20 is a block diagram illustrating a configuration example of a filtering circuit in the case of using three reference frames.

FIG. 20 is a block diagram illustrating a configuration example of a filtering circuit in the case of using three reference frames.

As illustrated in FIG. 20, the filtering circuit 211 is constituted by a filtering circuit 221 and a filtering circuit 222. Each of the filtering circuit 221 and the filtering circuit 222 has the configuration illustrated in FIG. 8, FIG. 17, or FIG. 18. That is, the filtering circuit 211 is configured to operate as a circuit of three inputs and one output by cascading the filtering circuit 45 that is used for two inputs and one output.

Here, a description will be given by regarding the motion compensation image extracted from the reference frame $R_0$ as a motion compensation image $MC_0$, the motion compensation image extracted from the reference frame $R_1$ as a motion compensation image $MC_1$, and the motion compensation image extracted from the reference frame $R_2$ as a motion compensation image $MC_2$. The motion compensation images $MC_1$ and $MC_2$ are input to the filtering circuit 221, and the motion compensation image $MC_0$ is input to the filtering circuit 222.

The filtering circuit 221 performs filtering by regarding the motion compensation images $MC_1$ and $MC_2$ as the motion compensation images $MC_0$ and $MC_1$ in FIG. 8 etc., respectively, and outputs an intermediate output X, which is a result of the filtering, to the filtering circuit 222.

The filtering circuit 222 performs filtering by regarding the intermediate output X and the motion compensation image $MC_0$ as the motion compensation images $MC_0$ and $MC_1$ in FIG. 8 etc., respectively, and outputs a result of the filtering as a prediction image.

It is also possible that the filtering circuit 211 that handles such three reference frames is provided in the decoding device 1 in FIG. 3 or the encoding device 101 in FIG. 11 instead of the filtering circuit 45.

Additionally, it is not necessary that the filtering circuit 221 and the filtering circuit 222 have the same configuration, and the individual configurations may be different from each other, for example, one has the configuration illustrated in FIG. 8 and the other has the configuration illustrated in FIG. 17. Also, it is possible to vary the parameter used for a filter in view of the input/output characteristics before and after filtering.

Filtering may be performed by the filtering circuit 211 on the motion compensation images extracted from three reference frames arranged in two time directions, not on the motion compensation images extracted from reference frames arranged in one time direction.

Note that, in the case of using frames before and after the time of the prediction frame as reference frames, including the case described above with reference to FIG. 7, a parameter such as a tap coefficient used for filtering may be dynamically changed in accordance with the time direction or distance of the reference frames.

The transmission of compressed image information from the encoding device 101 to the decoding device 1 is performed via various types of media, such as a recording medium including an optical disc, a magnetic disk, and a flash memory, satellite broadcasting, cable TV, the Internet, and a mobile phone network.

Now, motion compensation in filtering prediction will be described. Hereinafter, a description will be given of the configuration and operation of the prediction circuit 44 of the decoding device 1 that outputs motion compensation images to the filtering circuit 45. The description is also applied to the prediction circuit 161 in FIG. 12 and the prediction circuit 184 in FIG. 13 that output motion compensation images to the filtering circuit.

Motion compensation for decoding an image that is encoded in accordance with the H.264 standard is performed not in units of macroblocks of 16×16 pixels, but in units of blocks obtained by further dividing the macroblocks. That is, motion compensation is performed by focusing attention on individual blocks obtained by dividing the macroblock to be decoded and by regarding the pixel values of the respective pixels of a corresponding block in a reference frame as the pixel values of the respective pixels of a target block on the basis of a motion vector. Also, in the above-described filtering prediction, a filtering process using an FIR filter is performed by regarding a motion compensation image that is obtained by performing such motion compensation as an input image.

At this time, since the size of a block used as a unit of a filtering process is small, the influence thereof cannot be ignored. For example, in order to generate pixels near the end of a prediction image that is to be generated through a filtering process, it is necessary to interpolate pixels of a motion compensation image, which is an input image, in accordance with the number of taps of the FIR filter.

Figure 21:
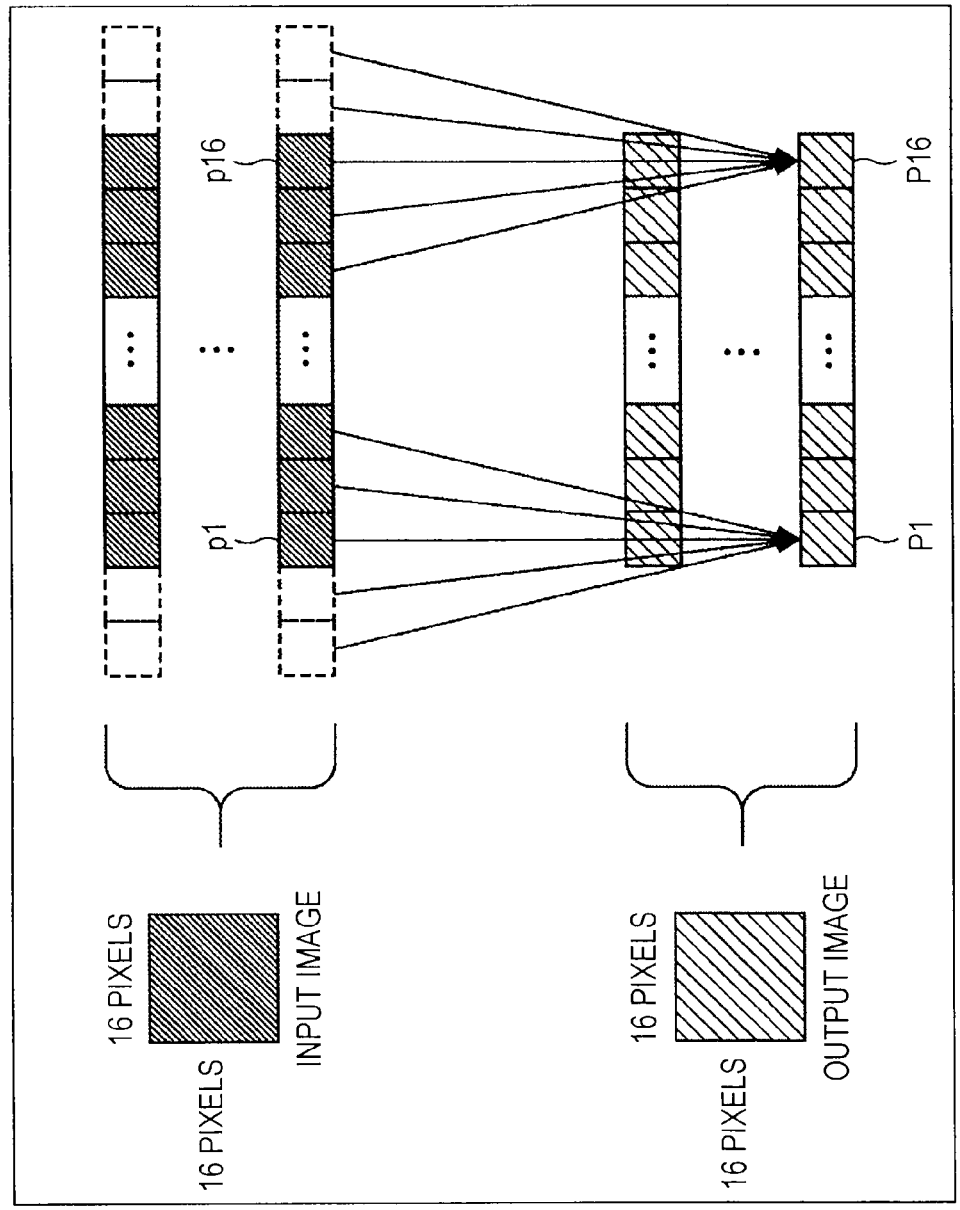
FIG. 21 is a diagram illustrating an example of interpolation of pixels.

FIG. 21 is a diagram illustrating an example of interpolation of pixels.

The input image of 16×16 pixels illustrated in an upper stage of FIG. 21 is a motion compensation image constituted by collecting individual blocks that are obtained through motion compensation. The output image of 16×16 pixels illustrated in a lower stage is a prediction image made up of pixels that obtained by performing a filtering process using an FIR filter on the motion compensation image in the upper stage. Here, it is assumed that the number of taps of the FIR filter is five. In order to generate a certain pixel of the prediction image, five pixels of the motion compensation image are necessary.

For example, in the case of generating a pixel P1 at the lower left end of the prediction image, five pixels arranged in the horizontal direction are necessary, with a pixel p1 at the lower left end, which is the corresponding pixel of the motion compensation image, being the center. However, there is no pixel on the left side of the pixel p1, as illustrated with a broken line. Also, in the case of generating a pixel P16 at the lower right end of the prediction image, five pixels arranged in the horizontal direction are necessary, with a pixel p16 at the lower right end, which is the corresponding pixel of the motion compensation image, being the center. However, there is no pixel on the right side of the pixel p16, as illustrated with a broken line.

Therefore, a filtering process may be performed after interpolating lacking pixels by copying the pixels p1 and p16 or performing interpolation with the pixels at symmetric positions with a boundary being the center. However, the values of these pixels are different from the true values of the pixels indicated by the broken lines, so that the precision of the pixel values of the prediction image degrades. It is necessary to use the true pixel values in order to avoid such degradation, but only an area of the same size as a block size is obtained from a reference frame in existing motion compensation, and thus such an interpolation process is necessary.

Then, in the prediction circuit 44, motion compensation is performed to generate macroblocks having a shape with a margin of the number of pixels corresponding to the number of taps of the FIR filter.

Figure 22:
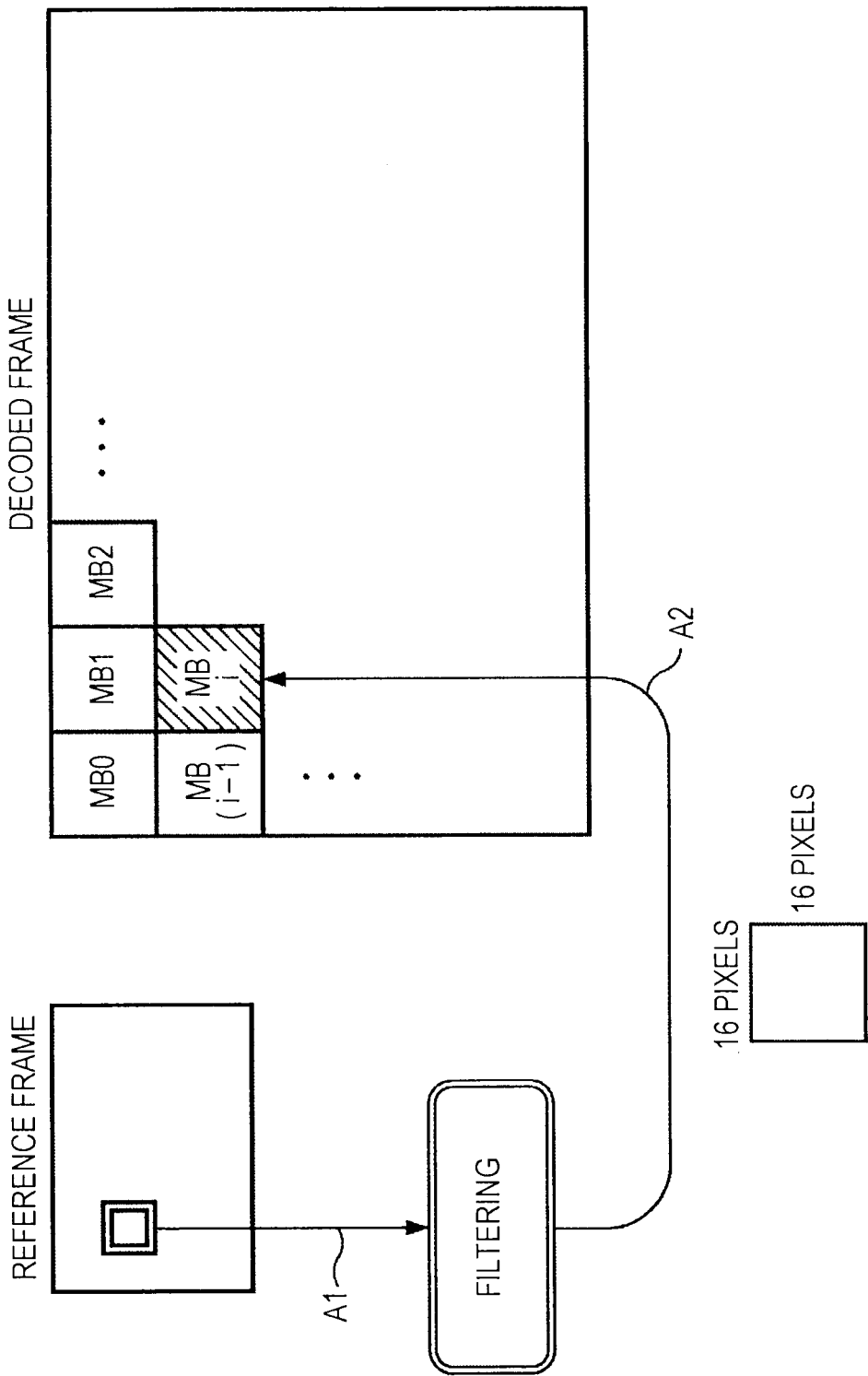
FIG. 22 is a diagram illustrating a concept of a process using a motion compensation image added with a margin area.

FIG. 22 is a diagram illustrating a concept of a process using a motion compensation image added with a margin area.

As indicated by an arrow A1 in FIG. 22, an image in which a margin area is added to an image of a macroblock of 16×16 pixels is extracted as a motion compensation image from a reference frame, and is regarded as an input image of a filtering process.

Figure 23:
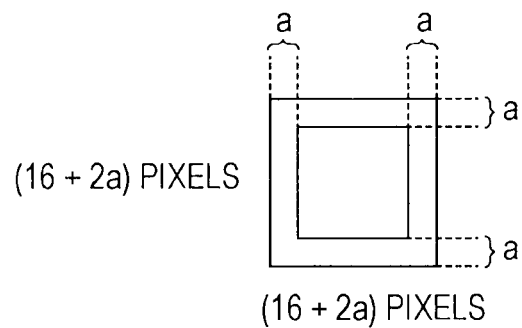
FIG. 23 is a diagram illustrating an example of a motion compensation image.

FIG. 23 is a diagram illustrating an example of a motion compensation image.

As illustrated in FIG. 23, an image of (16+2a)×(16+2a) pixels, obtained by adding a kind of band having a width of "a" pixels around an image of 16×16 pixels to expand the image, is extracted as a motion compensation image from a reference frame. "a" is a value that is determined in accordance with the number of taps of the FIR filter.

A filtering process is performed using such a motion compensation image as an input image, and a prediction image of 16×16 pixels is output as an output image of the filtering process, as indicated by an arrow A2 in FIG. 22. The prediction image is added to an output image of the inverse orthogonal transformation circuit 14 in the adder circuit 15 in FIG. 3, and an image as an addition result is used as a macroblock constituting a decoded frame.

In this way, in the motion compensation in the prediction circuit 44, the fact that a reference frame is a temporally past or future frame close to a target frame and that the entire frame can be used for motion compensation is used.

By using a motion compensation image with a margin area corresponding to the number of taps of the FIR filter for a filtering process, the process can be performed using the actual pixel values and the precision of the pixel values of a prediction image can be increased even in the case of generating pixels at the end of the prediction image. That is, it is not necessary to interpolate pixels in order to perform a filtering process.

Since the precision of the pixel values of the prediction image can be increased, the precision of a decoded frame can be eventually increased in the decoding device 1, and a residual from an original image can be reduced and the encoding efficiency can be increased in the encoding device 101.

Figure 24:
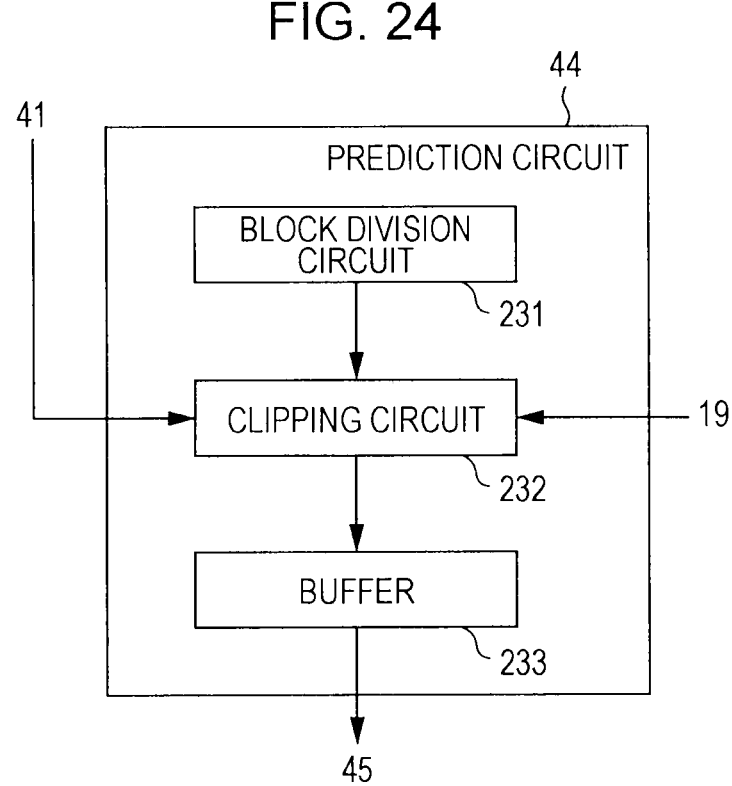
FIG. 24 is a block diagram illustrating a configuration example of the prediction circuit in FIG. 5.

FIG. 24 is a block diagram illustrating a configuration example of the prediction circuit 44.

As illustrated in FIG. 24, the prediction circuit 44 is constituted by a block division circuit 231, a clipping circuit 232, and a buffer 233. A motion vector supplied from the prediction mode determination circuit 41 in FIG. 5 is input to the clipping circuit 232.

The block division circuit 231 divides a macroblock that is to be decoded and outputs information about the areas of the respective blocks to the clipping circuit 232.

The clipping circuit 232 focuses attention on the individual blocks constituting the macroblock that is to be decoded, and specifies the block in a reference frame corresponding to a target block on the basis of a motion vector supplied from the prediction mode determination circuit 41. The block in the reference frame is a block having the same size as the target block. Hereinafter, a block in a reference frame corresponding to a target block, which is determined on the basis of a motion vector, will be referred to as a reference block as necessary.

Also, the clipping circuit 232 judges whether the specified reference block is in contact with the periphery of the macroblock including the reference block. If the clipping circuit 232 judges that the reference block is not in contact with the periphery of the macroblock, the clipping circuit 232 reads the information about the reference block from the frame memory 19, and outputs it as the pixel values of the pixels of the target block to the buffer 233.

If the clipping circuit 232 judges that the reference block is in contact with the periphery of the macroblock, the clipping circuit 232 reads, from the frame memory 19, the information about the reference block and the information about a margin area, which is a band area in contact with the reference block, outside the macroblock including the reference block, and outputs them to the buffer 233.

After attention has been focused on all the blocks thereby obtaining the information about the motion compensation image illustrated in FIG. 23, in which a margin area is added to the macroblock that is to be decoded, the buffer 233 outputs it to the filtering circuit 45. A plurality of motion compensation images are used in filtering prediction, and the individual motion compensation images are generated by the prediction circuit 44 in a similar manner.

Figure 25:
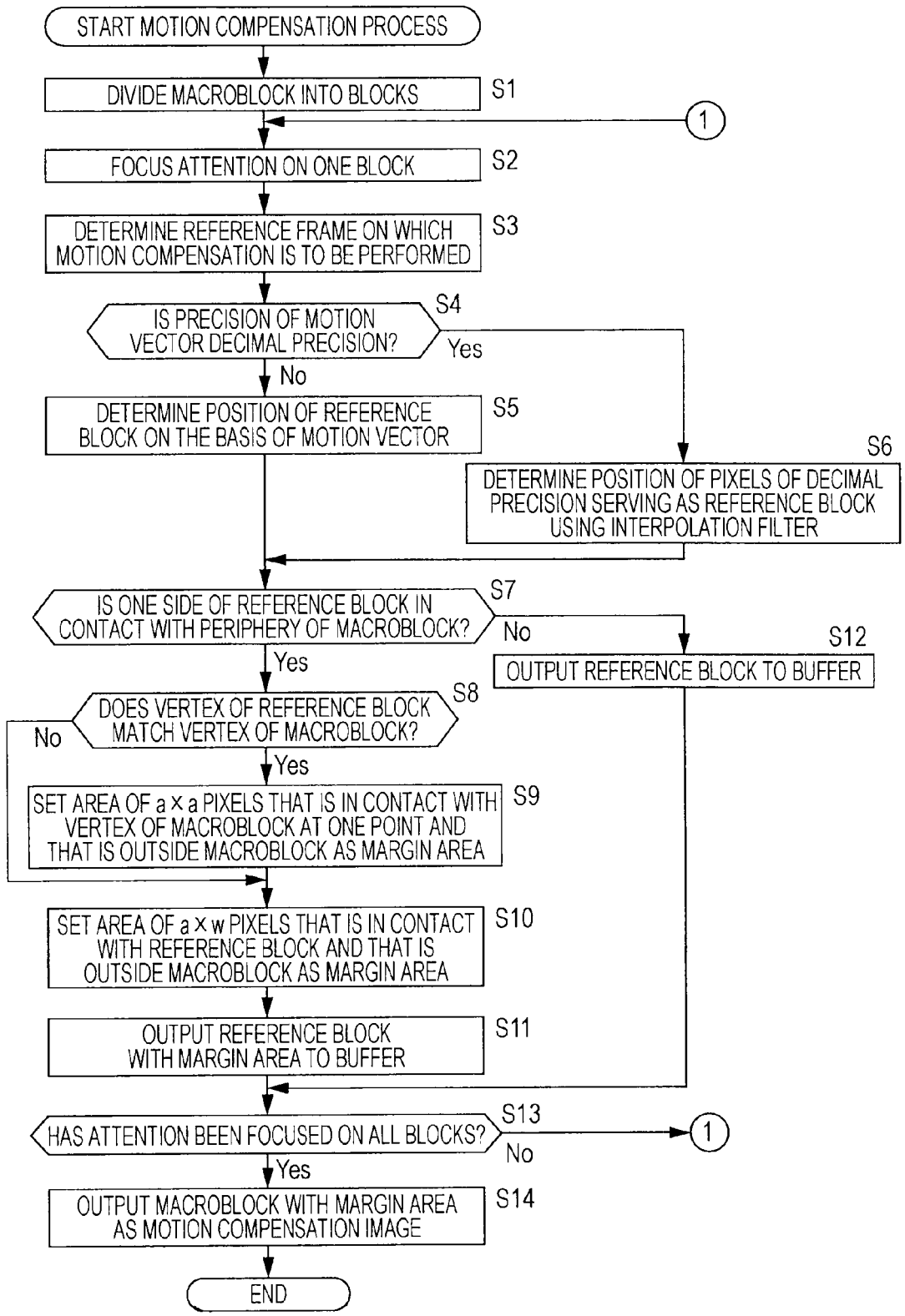
FIG. 25 is a flowchart for explaining a motion compensation process of the prediction circuit.

Now, a motion compensation process performed by the prediction circuit 44 will be described with reference to the flowchart in FIG. 25. The process illustrated in FIG. 25 is performed to generate the individual motion compensation images.

In step S1, the block division circuit 231 divides a macroblock that is to be decoded, and outputs the information about the areas of the respective blocks to the clipping circuit 232.

Figure 26:
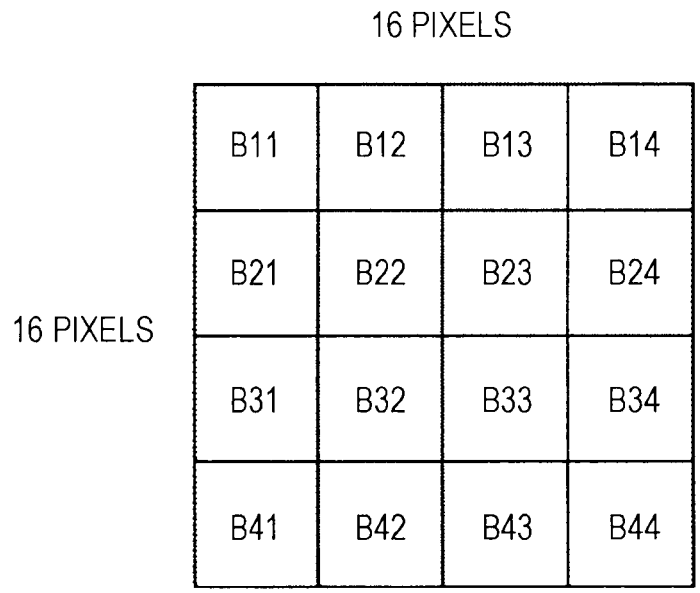
FIG. 26 is a diagram illustrating an example of dividing a macroblock that is to be decoded.

FIG. 26 is a diagram illustrating an example of division of the macroblock that is to be decoded.

In the example in FIG. 26, the macroblock of 16×16 pixels is divided into blocks B11 through B44.

In step S2, the clipping circuit 232 focuses attention on one block.

In step S3, the clipping circuit 232 determines a reference frame.

In step S4, the clipping circuit 232 judges whether the precision of a motion vector supplied from the prediction mode determination circuit 41 is decimal precision or not.

If it is judged in step S4 that the precision is not decimal precision, the clipping circuit 232 specifies the position of the reference block corresponding to the target block on the basis of the motion vector of integer precision in step S5.

On the other hand, if it is judged in step S4 that the precision is decimal precision, the clipping circuit 232 performs interpolation of pixels using an interpolation filter specified by a standard, and specifies the reference block at the position indicated by the motion vector of decimal precision in step S6.

After specifying the reference block, the clipping circuit 232 judges whether one side of the reference block is in contact with the periphery of the macroblock including the reference block or not in step S7.

Here, the judgment is performed on the basis of the conditions of the following equations (14) through (17). If at least any of the conditions is satisfied, it is judged that one side of the reference block is in contact with the periphery of the macroblock. If no condition is satisfied, it is judged that one side of the reference block is not in contact with the periphery of the macroblock. (bk_pos_x, bk_pos_y) represents the position of the upper left vertex of the reference block, and (bk_width, bk_height) represents the width and height of the reference block. (MB_pos_x, MB_pos_y) represents the position of the upper left vertex of the macroblock including the reference block.

[Math. 14]

$$MB\_pos\_x = bk\_pos\_x \quad (14)$$

[Math. 15]

$$MB\_pos\_y = bk\_pos\_y \quad (15)$$

[Math. 16]

$$MB\_pos\_x + 16 = bk\_pos\_x + bk\_width \quad (16)$$

[Math. 17]

$$MB\_pos\_y + 16 = bk\_pos\_y + bk\_height \quad (17)$$

Figure 27:
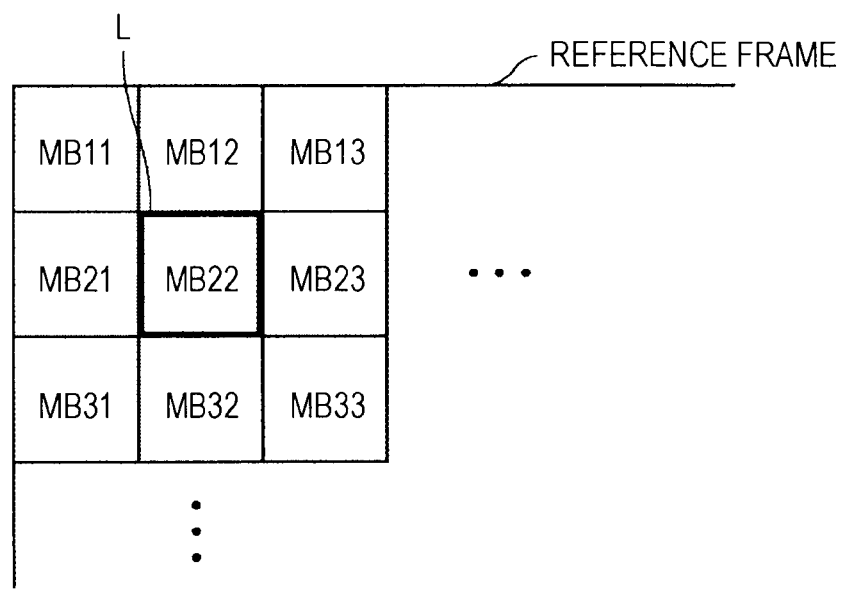
FIG. 27 is a diagram illustrating an example of a reference frame.

FIG. 27 is a diagram illustrating an example of a reference frame.

In the example in FIG. 27, nine macroblocks of macroblocks MB11 through MB33 are illustrated. Here, a description will be given of a case where the reference blocks corresponding to the individual blocks obtained by dividing the macroblock that is to be decoded are the individual blocks constituting the macroblock MB22 indicated by being surrounded by a bold line L.

Figure 28:
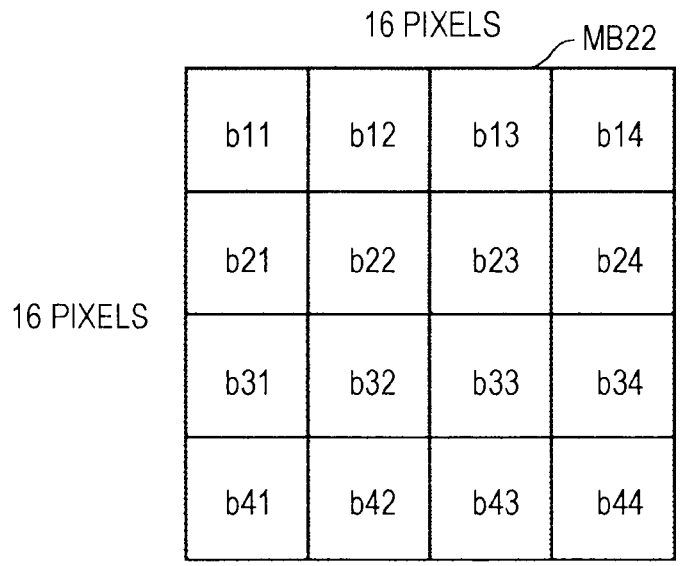
FIG. 28 is a diagram illustrating an example of blocks constituting a macroblock in FIG. 27.

FIG. 28 is a diagram illustrating an example of the blocks constituting the macroblock MB22 in FIG. 27. Blocks b11 through b44 in FIG. 28 serve as reference blocks of the blocks B11 through B44 in FIG. 26 constituting the macroblock that is to be decoded, respectively.

For example, when attention is focused on the block B11 in FIG. 26, the block b11 in FIG. 28 serving as the reference block of the block B11 satisfies the conditions of equations (14) and (15), and is judged to be in contact with the periphery of the macroblock MB22.

When attention is focused on the blocks B12 and B13 in FIG. 26, the blocks b12 and b13 in FIG. 28 serving as the reference blocks of these blocks satisfy the condition of equation (15), and are judged to be in contact with the periphery of the macroblock MB22.

When attention is focused on the block B14 in FIG. 26, the block b14 in FIG. 28 serving as the reference block of the block B14 satisfies the conditions of equations (15) and (16), and is judged to be in contact with the periphery of the macroblock MB22.

When attention is focused on the blocks B21 and B31 in FIG. 26, the blocks b21 and b31 in FIG. 28 serving as the reference blocks of these blocks satisfy the condition of equation (14), and are judged to be in contact with the periphery of the macroblock MB22.

When attention is focused on the blocks B24 and B34 in FIG. 26, the blocks b24 and b34 in FIG. 28 serving as the reference blocks of these blocks satisfy the condition of equation (16), and are judged to be in contact with the periphery of the macroblock MB22.

When attention is focused on the block B41 in FIG. 26, the block b41 in FIG. 28 serving as the reference block of the block B41 satisfies the conditions of equations (14) and (17), and is judged to be in contact with the periphery of the macroblock MB22.

When attention is focused on the blocks B42 and B43 in FIG. 26, the blocks b42 and b43 in FIG. 28 serving as the reference blocks of these blocks satisfy the condition of equation (17), and are judged to be in contact with the periphery of the macroblock MB22.

When attention is focused on the block B44 in FIG. 26, the block b44 in FIG. 28 serving as the reference block of the block B44 satisfies the conditions of equations (16) and (17), and is judged to be in contact with the periphery of the macroblock MB22.

When attention is focused on the blocks B22, B23, B32, and B33 in FIG. 26, the blocks b22, b23, b32, and b33 in FIG. 28 serving as the reference blocks of these blocks do not satisfy any condition, and are judged not to be in contact with the periphery of the macroblock MB22.

Referring back to FIG. 25, if it is judged in step S7 that one side of the reference block is in contact with the periphery of the macroblock, the clipping circuit 232 judges in step S8 whether a vertex of the reference block matches a vertex of the macroblock including the reference block or not. Whether a vertex of the reference block matches a vertex of the macroblock or not can be judged on the basis of a condition satisfied by the reference block.

The conditions in a case where a vertex of the reference block matches a vertex of the macroblock are expressed by the following equations (18) through (19). If any of the conditions is satisfied, it is judged that a vertex of the reference block matches a vertex of the macroblock.

[Math. 18]

$$MB\_pos\_x = bk\_pos\_x$$

and $$MB\_pos\_y = bk\_pos\_y \quad (18)$$

[Math. 19]

$$MB\_pos\_x = bk\_pos\_x$$

and $$MB\_pos\_y + 16 = bk\_pos\_y + bk\_\text{height} \quad (19)$$

[Math. 20]

$$MB\_pos\_x + 16 = bk\_pos\_x + bk\_\text{width}$$

and $$MB\_pos\_y = bk\_pos\_y \quad (20)$$

[Math. 21]

$$MB\_pos\_x + 16 = bk\_pos\_x + bk\_\text{width}$$

and $$MB\_pos\_y + 16 = bk\_pos\_y + bk\_\text{height} \quad (21)$$

For example, the block b11 in FIG. 28, which is the reference block in a case where attention is focused on the block B11 in FIG. 26, satisfies the condition of the above equation (18) (equations (14) and (15)), and it is judged that a vertex of the reference block matches a vertex of the macroblock.

The block b14 in FIG. 28, which is the reference block in a case where attention is focused on the block B14 in FIG. 26, satisfies the condition of the above equation (20) (equations (15) and (16)), and it is judged that a vertex of the reference block matches a vertex of the macroblock.

The block b41 in FIG. 28, which is the reference block in a case where attention is focused on the block B41 in FIG. 26, satisfies the condition of the above equation (19) (equations (14) and (17)), and it is judged that a vertex of the reference block matches a vertex of the macroblock.

The block b44 in FIG. 28, which is the reference block in a case where attention is focused on the block B44 in FIG. 26, satisfies the condition of the above equation (21) (equations (16) and (17)), and it is judged that a vertex of the reference block matches a vertex of the macroblock.

The reference block in a case where attention is focused on any of the other blocks in FIG. 26 does not satisfy any of the conditions of equations (18) through (21), and it is judged that a vertex of the reference block does not match a vertex of the macroblock.

If it is judged in step S8 that a vertex of the reference block matches a vertex of the macroblock, the clipping circuit 232 sets an area of a×a pixels that is in contact with the matched vertex of the macroblock at one point and that is outside the macroblock as a margin area in step S9.

On the other hand, if it is judged in step S8 that a vertex of the reference block does not match a vertex of the macroblock, or if a margin area is set in step S9, the process proceeds to step S10.

In step S10, the clipping circuit 232 sets an area of a×w pixels that is in contact with the reference block and that is outside the macroblock including the reference block as a margin area. "w" is the length of the side of the reference block that is in contact with the periphery of the macroblock. When the reference blocks are set in the manner illustrated in FIG. 28, w=4.

In step S11, the clipping circuit 232 reads the information about the reference block added with a margin area from the frame memory 19, and outputs it to the buffer 233.

On the other hand, if it is judged in step S7 that one side of the reference block is not in contact with the periphery of the macroblock, the clipping circuit 232 reads the information about the reference block from the frame memory 19 and outputs it to the buffer 233 in step S12.

In step S13, the clipping circuit 232 judges whether attention has been focused on all the blocks or not. If it is judged that attention has not been focused on all the blocks, the process returns to step S2, where attention is focused on another block and a similar process is repeated.

If it is judged in step S13 that attention has been focused on all the blocks, the buffer 233 outputs the macroblock with a margin area, serving as a motion compensation image, to the filtering circuit 45 in step S14, and ends the process.

Specific examples of a margin area will be described.

Figure 29:
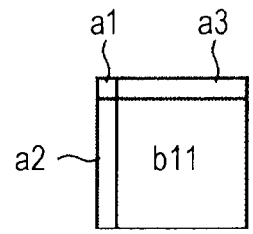
FIG. 29 is a diagram illustrating an example of a margin area.

For example, when attention is focused on the block B11 in FIG. 26, a vertex of the block b11 serving as a reference block matches a vertex of the macroblock MB22, and thus the area a1 in FIG. 29, which is an area of a×a pixels that is in contact with the matched vertex at one point, is set as a margin area. Also, the areas a2 and a3 in FIG. 29, which are areas of a×w pixels that are in contact with the block b11 and that are outside the macroblock MB22, are set as margin areas. The block b11 serving as a reference block and the margin areas a1, a2, and a3 set in this manner are clipped from the reference frame and are stored in the buffer 233 as the information about the block B11 serving as a target block.

The area a1 is an area made up of pixels of the macroblock MB11 (FIG. 27) outside the macroblock MB22. The area a2 is an area made up of pixels of the macroblock MB21, and the area a3 is an area made up of pixels of the macroblock MB12.

Figure 30:
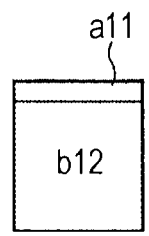
FIG. 30 is a diagram illustrating an example of a margin area.

When attention is focused on the block B12 in FIG. 26, the area a11 in FIG. 30, which is an area of a×w pixels that is in contact with the block b12 serving as a reference block and that is outside the macroblock MB22, is set as a margin area. The block b12 serving as a reference block and the margin area a11 set in this manner are clipped from the reference frame and are stored in the buffer 233 as the information about the block B12 serving as a target block. The area a11 is an area made up of pixels of the macroblock MB12 outside the macroblock MB22.

Figure 31:
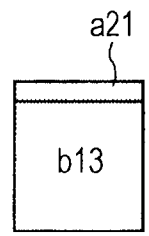
FIG. 31 is a diagram illustrating an example of a margin area.

Likewise, when attention is focused on the block B13 in FIG. 26, the area a21 in FIG. 31, which is an area of a×w pixels that is in contact with the block b13 serving as a reference block and that is outside the macroblock MB22, is set as a margin area. The block b13 serving as a reference block and the margin area a21 set in this manner are clipped from the reference frame and are stored in the buffer 233 as the information about the block B13 serving as a target block. The area a21 is an area made up of pixels of the macroblock MB12 outside the macroblock MB22.

Figure 32:
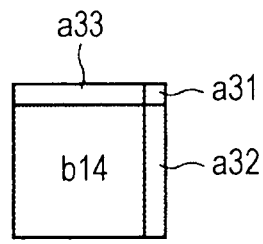
FIG. 32 is a diagram illustrating an example of a margin area.

When attention is focused on the block B14 in FIG. 26, a vertex of the block b14 serving as a reference block matches a vertex of the macroblock MB22, and thus the area a31 in FIG. 32, which is an area of a×a pixels that is in contact with the matched vertex at one point, is set as a margin area. Also, in this case, the areas a32 and a33 in FIG. 32, which are areas of a×w pixels that are in contact with the block b14 and that are outside the macroblock MB22, are set as margin areas. The block b14 serving as a reference block and the margin areas a32 and a33 set in this manner are clipped from the reference frame and are stored in the buffer 233 as the information about the block B14 serving as a target block.

The area a31 is an area made up of pixels of the macroblock MB13 outside the macroblock MB22. The area a32 is an area made up of pixels of the macroblock MB23, and the area a33 is an area made up of pixels of the macroblock MB12.

Figure 33:
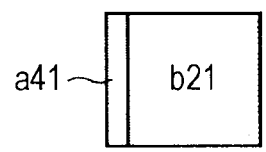
FIG. 33 is a diagram illustrating an example of a margin area.

When attention is focused on the block B21 in FIG. 26, the area a41 in FIG. 33, which is an area of a×w pixels that is in contact with the block b21 serving as a reference block and that is outside the macroblock MB22, is set as a margin area. The block b21 serving as a reference block and the margin area a41 set in this manner are clipped from the reference frame and are stored in the buffer 233 as the information about the block B21 serving as a target block. The area a41 is an area made up of pixels of the macroblock MB21 outside the macroblock MB22.

Figure 34:
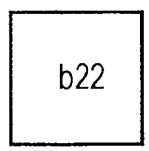
FIG. 34 is a diagram illustrating an example of a margin area.

When attention is focused on the block B22 in FIG. 26, the block b22 serving as a reference block is a block the sides of which are not in contact with the periphery of the macroblock MB22, and thus no margin area is set as illustrated in FIG. 34. The block b22 is clipped from the reference frame and is stored in the buffer 233 as the information about the block B22 serving as a target block.

Figure 35:
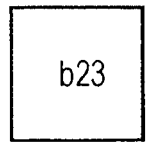
FIG. 35 is a diagram illustrating an example of a margin area.

Likewise, when attention is focused on the block B23 in FIG. 26, the block b23 serving as a reference block is a block the sides of which are not in contact with the periphery of the macroblock MB22, and thus no margin area is set as illustrated in FIG. 35. The block b23 is clipped from the reference frame and is stored in the buffer 233 as the information about the block B23 serving as a target block.

Figure 36:
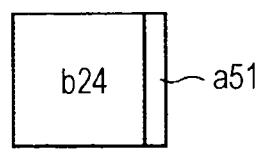
FIG. 36 is a diagram illustrating an example of a margin area.

When attention is focused on the block B24 in FIG. 26, the area a51 in FIG. 36, which is an area of a×w pixels that is in contact with the block b24 serving as a reference block and that is outside the macroblock MB22, is set as a margin area. The block b24 serving as a reference block and the margin area a51 set in this manner are clipped from the reference frame and are stored in the buffer 233 as the information about the block B24 serving as a target block. The area a51 is an area made up of pixels of the macroblock MB23 outside the macroblock MB22.

Likewise, when attention is focused on the blocks B31 through 44 in FIG. 26, a margin area is appropriately set and is stored in the buffer 233 together with the information about the reference block.

Figure 37:
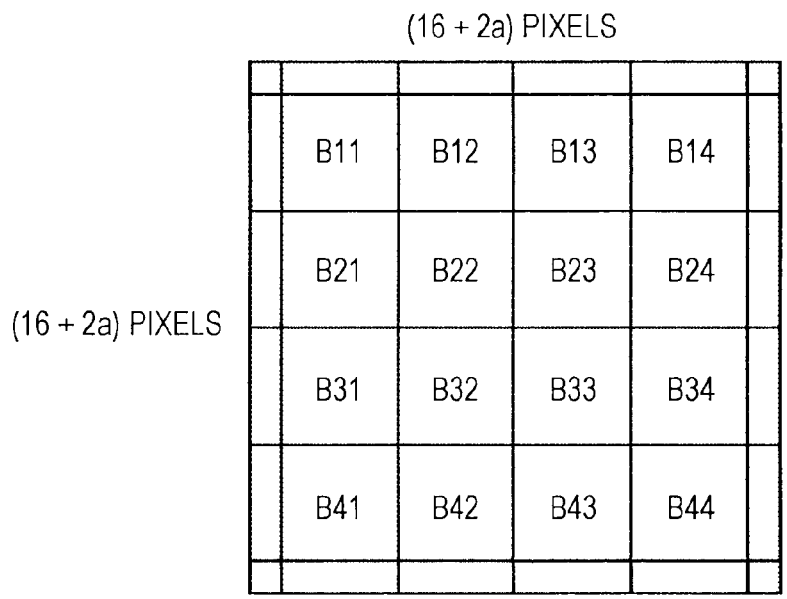
FIG. 37 is a diagram illustrating an example of a motion compensation image.

FIG. 37 is a diagram illustrating an example of a motion compensation image output from the prediction circuit 44.

In the foregoing manner, the motion compensation image illustrated in FIG. 37 is generated from the information about the reference blocks and the information about the margin areas read from the frame memory 19. The motion compensation image in FIG. 37 is an image of (16+2a)×(16+2a) pixels.

In the filtering circuit 45, calculation of a difference, filtering using an FIR filter, adjustment of gain, addition, etc., are performed on a plurality of motion compensation images generated in this manner, whereby a prediction image is generated.

Figure 38:
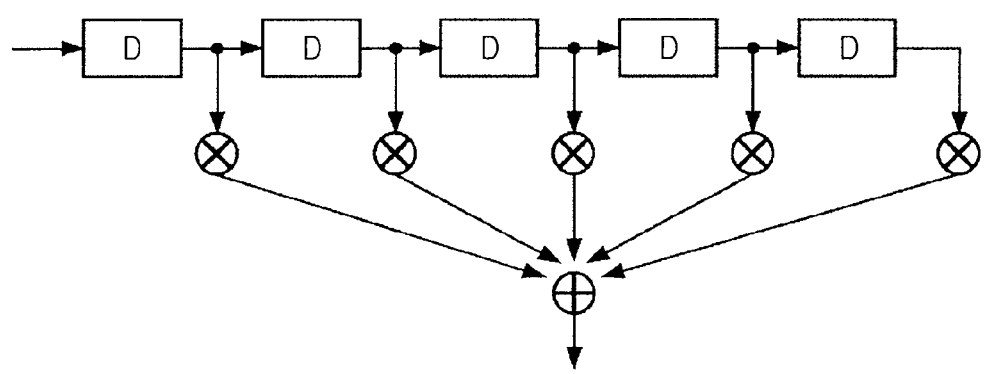
FIG. 38 is a diagram illustrating an example of an FIR filter.

FIG. 38 is a diagram illustrating an example of the FIR filter provided in the low-pass filter circuit 52 and the high-pass filter circuit 54 of the filtering circuit 45.

For example, in a case where the FIR filter illustrated in FIG. 38, in which the number of taps is five, is provided, two is set as the value of "a", and the motion compensation image input to the filtering circuit 45 is an image of 20×20 pixels, obtained by extending the individual four sides of the macroblock of 16×16 pixels by two pixels.

The width of band "a" (pixels) is determined by the following equation (22), when it is assumed that the number of taps of the FIR filter is T. Floor(x) is a function for calculating the maximum integer value that is equal to or smaller than x.

[Math. 22]

$$a \geq \text{floor}(T/2) \tag{22}$$

In this way, the width "a" is small when the number of taps T is small, and the width "a" is large when the number of taps T is large. Note that, when a two-dimensional filtering process is performed, an FIR filter with five taps for inputting five pixels arranged in the horizontal direction and outputting one pixel, and an FIR filter with five taps for inputting five pixels arranged in the vertical direction and outputting one pixel are provided in the low-pass filter circuit 52 and the like.

Figure 39:
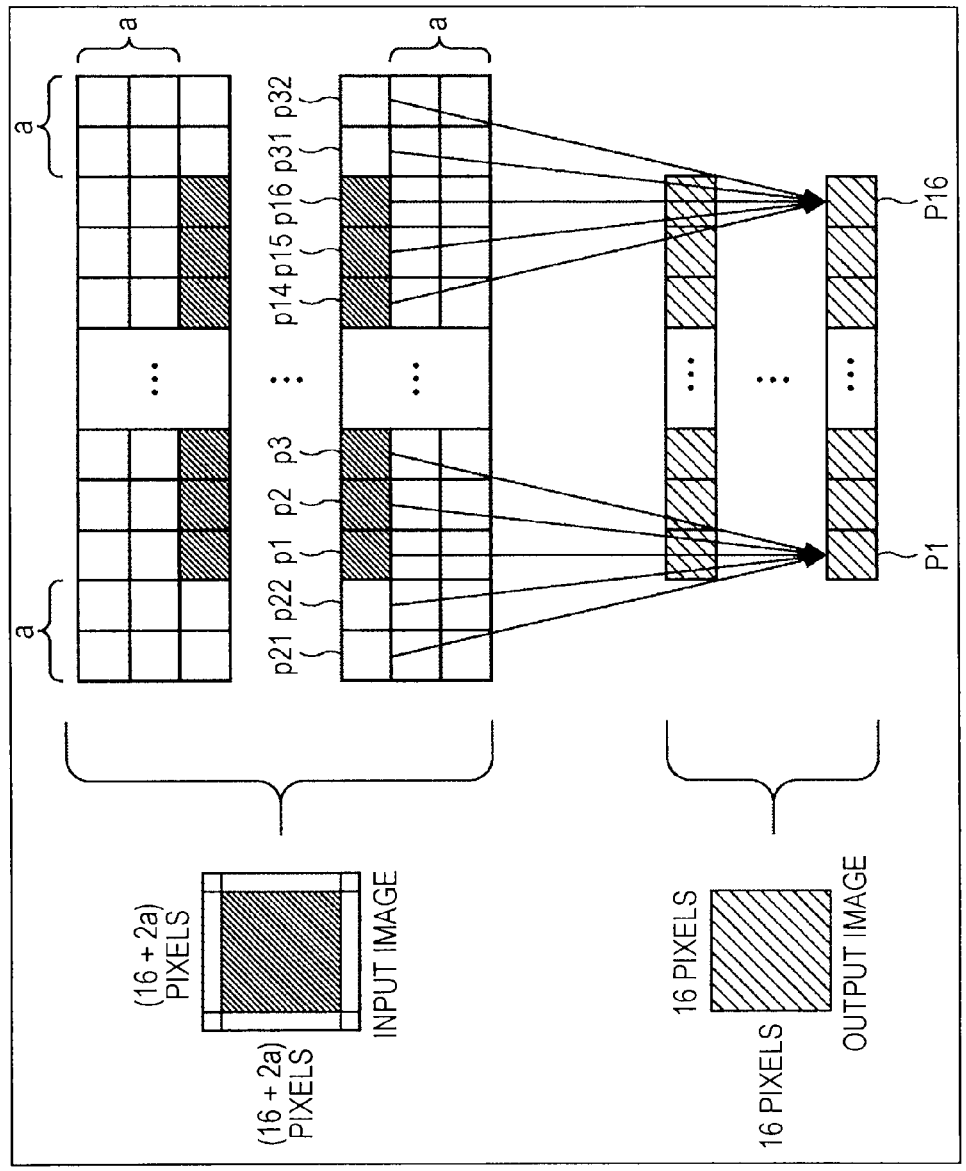
FIG. 39 is a diagram illustrating an example of a filtering process.

FIG. 39 is a diagram illustrating an example of a filtering process performed on a motion compensation image with a margin area.

The input image of (16+2a)×(16+2a) pixels illustrated in the upper stage of FIG. 39 is a motion compensation image that is generated through the foregoing motion compensation performed by the prediction circuit 44. The output image of 16×16 pixels illustrated in the lower stage is a prediction image made up of pixels that are obtained through a filtering process performed on the motion compensation image in the upper stage using an FIR filter.

For example, in the case of generating a pixel P1 at the lower left end of the prediction image, it is possible to obtain the pixel value of the pixel P1 by inputting five pixels arranged in the horizontal direction with a pixel p1, which is the corresponding pixel of the motion compensation image, being the center, that is, pixels p21, p22, p1, p2, and p3, to the FIR filter. The pixels p21 and p22 are pixels in a margin area.

Also, in the case of generating a pixel P16 at the lower right end of the prediction pixel, it is possible to obtain the pixel value of the pixel P16 by inputting five pixels arranged in the horizontal direction with a pixel p16, which is the corresponding pixel of the motion compensation image, being the center, that is, pixels p14, p15, p16, p31, and p32, to the FIR filter. The pixels p31 and p32 are pixels in a margin area.

Accordingly, the filtering process can be performed using actual pixel values, so that the precision of the pixel values of the prediction image can be increased. Since a two-dimensional image has a high correlation in space directions, it is considered that the pixel values inside a macroblock have a high correlation with the pixel values outside the macroblock. Therefore, the pixel values of the prediction image are highly reliable compared to the case of performing a filtering process by performing interpolation with pixels in a macroblock.

In general, it is characteristically advantageous that the number of taps of an FIR filter is larger. However, when the number of taps is large, the possibility that the pixel values outside a block are used increases, and the range in which the pixel values of an output image are affected widens.

Specifically, in the case of performing a filtering process in units of macroblocks, when an FIR filter with three taps is used as the LPF expressed by equation (4), about 25% of the pixels of an entire frame are affected due to lack of the pixels of an input image. Also, when an FIR filter with five taps is used, about 50% of the pixels of an entire frame are affected. When an FIR filter with seven taps is used, about 73% of the pixels of an entire frame are affected.

With the use of the foregoing motion compensation image as an input image of a filtering process, the filtering process can be performed using an FIR filter with a large number of taps.

In the description given above, in the case of generating a certain pixel of a prediction image, pixels arranged in the horizontal direction, with the corresponding pixel of a motion compensation image being the center, are input to an FIR filter, but the input pixels are not limited to pixels arranged in the horizontal direction or pixels arranged in the vertical direction. For example, it is also possible to input the corresponding pixel of the motion compensation image and the pixels above, below, on the right of, and on the left of the pixel, or to input the corresponding pixel of the motion compensation image and the pixels on the upper right of, upper left of, lower right of, and lower left of the pixel.

Figure 40:
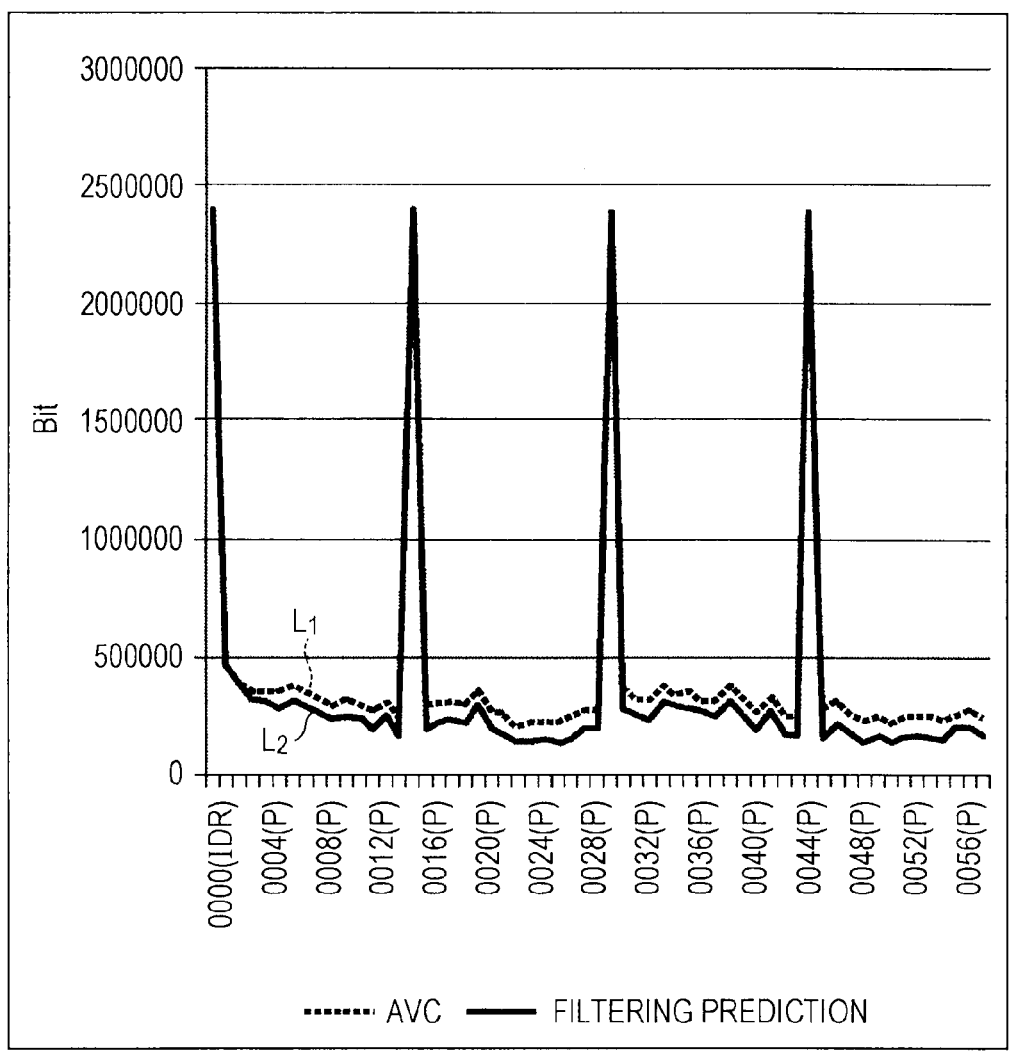
FIG. 40 is a diagram illustrating a result obtained by performing encoding using a prediction image generated by the filtering circuit in FIG. 8.
Figure 41:
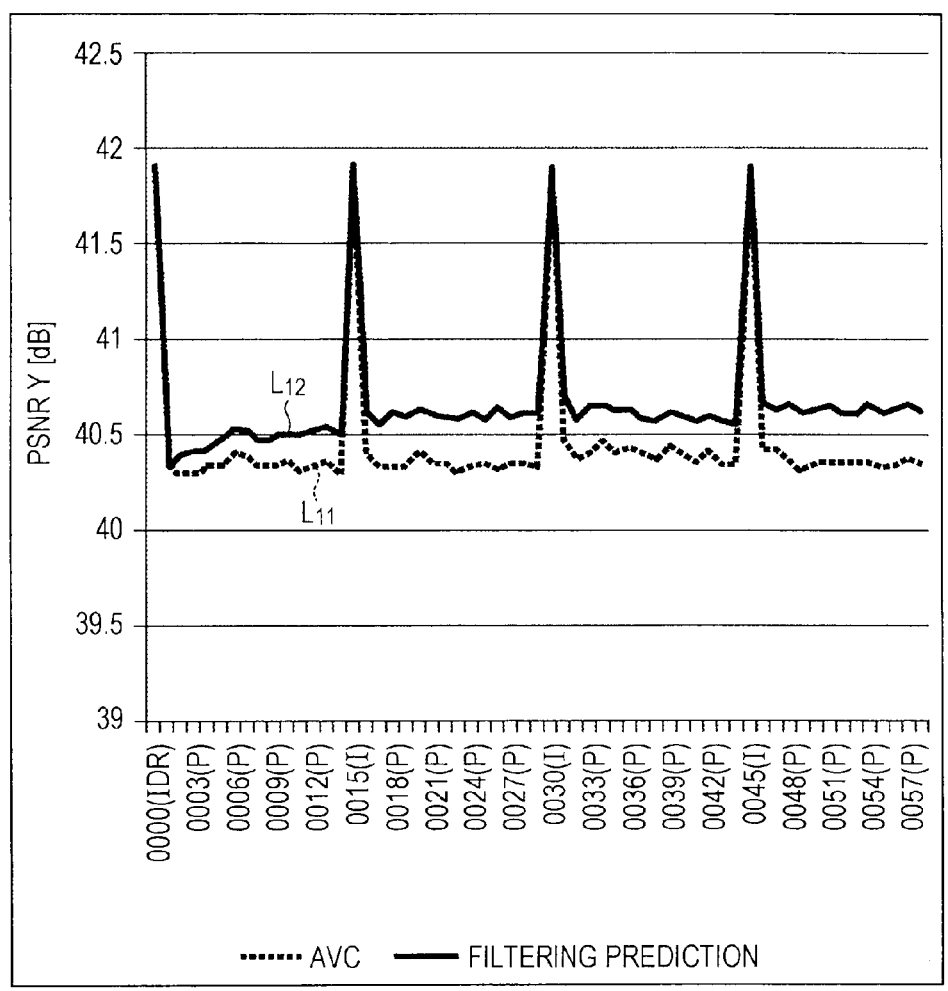
FIG. 41 is a diagram illustrating another result obtained by performing encoding using a prediction image generated by the filtering circuit in FIG. 8.

FIG. 40 and FIG. 41 are diagrams illustrating a result obtained by performing encoding using a prediction image that is generated by the filtering circuit 45 in FIG. 8.

The graph in FIG. 40 illustrates the amount of encoded data that is generated.

The horizontal axis indicates the frame number. For example, "1" on the horizontal axis represents the first picture of a moving image to be processed, and "2" represents the second picture. The vertical axis indicates the amount of code of individual pictures, and the unit is bit. As the value is smaller, the compression rate for compressing the frame is higher.

A line $L_1$ represents the amount of code in a case where encoding is performed using conventional AVC, and a line $L_2$ represents the amount of code in a case where encoding is performed using filtering prediction. In this example, an intra-picture of one frame is inserted every fifteen frames, and the fourteen frames other than the intra-picture is regarded as P pictures.

As illustrated in FIG. 40, the intra-picture is the same in a case where AVC is employed and in a case where an encoding method using filtering prediction is employed, and thus the value of the amount of generated code is the same. In addition, in an encoding method using filtering prediction, two reference frames are necessary, and thus the amount of code of the second P picture, in which only the first intra-picture can be used as a reference frame, has the same value as that of the amount of code in the case of employing AVC. As for the amount of code of the other P pictures, the values in the encoding method using filtering prediction represented by the line $L_2$ are smaller than the values represented by the line $L_1$.

The reason why the amount of generated code can be suppressed by employing the encoding method using filtering prediction is that the precision of a prediction image is high and that the encoded data of a residual can be reduced compared to the case of employing AVC.

The graph in FIG. 41 illustrates the image quality of encoded data.

The horizontal axis in FIG. 41 indicates the frame number, like the horizontal axis in FIG. 40. The vertical axis indicates the PSNR value. The PSNR value is an objective index in which the similarity to an original image is higher (the image quality is higher) as the value thereof is larger, and the unit is [dB].

A line $L_{11}$ represents the PSNR value in a case where encoding is performed using conventional AVC, and a line $L_{12}$ represents the PSNR value in a case where encoding is performed using filtering prediction. For the same reason as in the case of FIG. 40, the PSNR values of the intra-picture and the second P picture are the same in the case of employing AVC and in the case of performing encoding using filtering prediction.

On the other hand, as for the other P pictures, the PSNR value in the case of employing the encoding method using filtering prediction, represented by the line $L_{12}$, is larger than the PSNR value in the case of employing AVC, represented by the line $L_{11}$.

The reason why the PSNR value, that is, the image quality, can be increased by employing the encoding method using filtering prediction is that the precision of a prediction image can be increased.

The above-descried series of processes can be executed by hardware and can be executed by software. In the case of executing the series of processes by software, the program constituting the software is installed through a program recording medium to a computer incorporated into dedicated hardware, a general-purpose personal computer capable of executing various types of functions by being installed with various types of programs, or the like.

Figure 42:
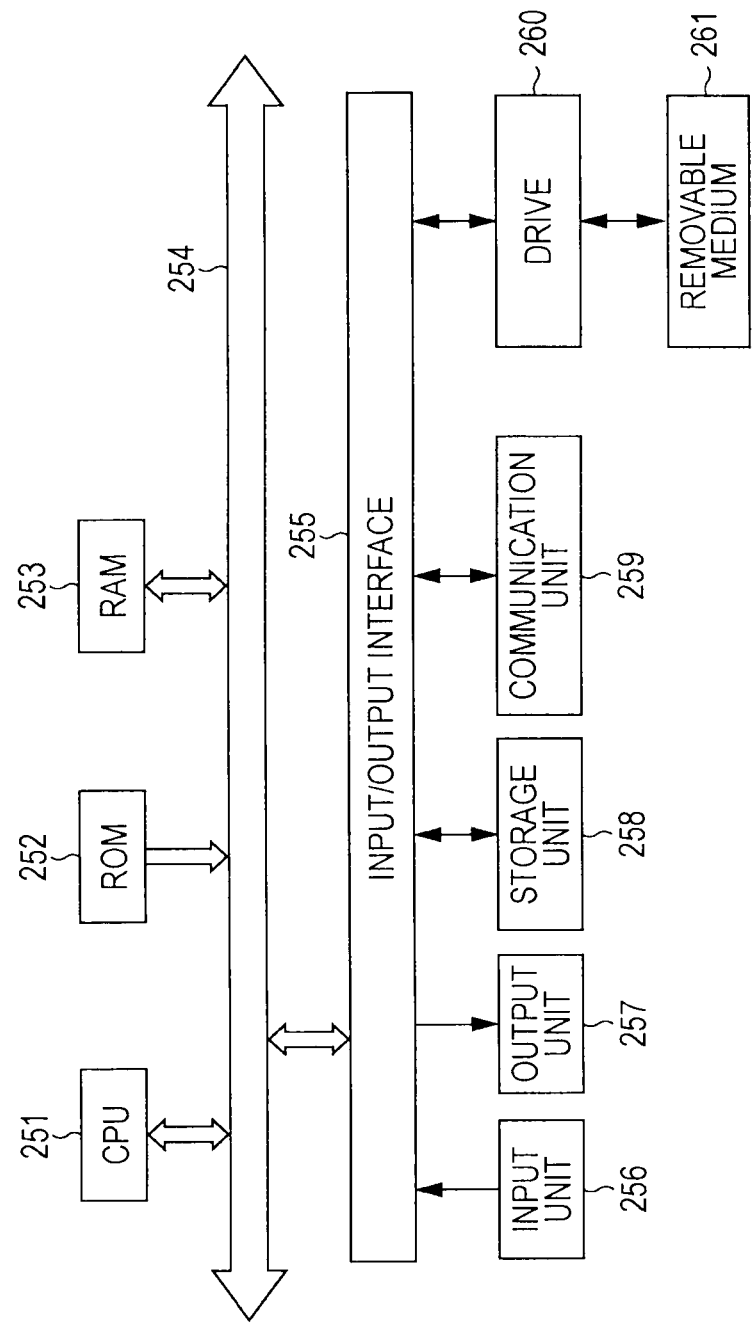
FIG. 42 is a block diagram illustrating a configuration example of a personal computer.

FIG. 42 is a block diagram illustrating a hardware configuration example of a computer that executes the above-described series of processes in accordance with a program.

A CPU (Central Processing Unit) 251, a ROM (Read Only Memory) 252, and a RAM (Random Access Memory) 253 are mutually connected via a bus 254.

An input/output interface 255 is further connected to the bus 254. An input unit 256 made up of a keyboard, a mouse, a microphone, etc., an output unit 257 made up of a display, a speaker, etc., a storage unit 258 made up of a hard disk, a nonvolatile memory, etc., a communication unit 259 made up of a network interface, etc., and a drive 260 that drives a removable medium 261, such as an optical disc or a semiconductor memory, are connected to the input/output interface 255.

In the computer having the foregoing configuration, the CPU 251 loads a program stored in the storage unit 258 to the RAM 253 via the input/output interface 255 and the bus 254 and executes it, for example, thereby performing the above-described series of processes.

The program executed by the CPU 251 is provided while being recorded on the removable medium 261, for example, or via a wired or wireless transmission medium, such as a local area network, the Internet, or digital broadcasting, and is installed in the storage unit 258.

In addition, the program executed by the computer may be a program in which processes are performed in time series in accordance with the order described in this description, or may be a program in which processes are performed in parallel or at necessary timing, such as when a call is performed.

The embodiment of the present invention is not limited to the above-described embodiment, and various changes are available without deviating from the scope of the present invention.

For example, the above-described decoding device 1 and the encoding device 101 can be applied to arbitrary electronic apparatuses. Hereinafter, the examples thereof will be described.

Figure 43:
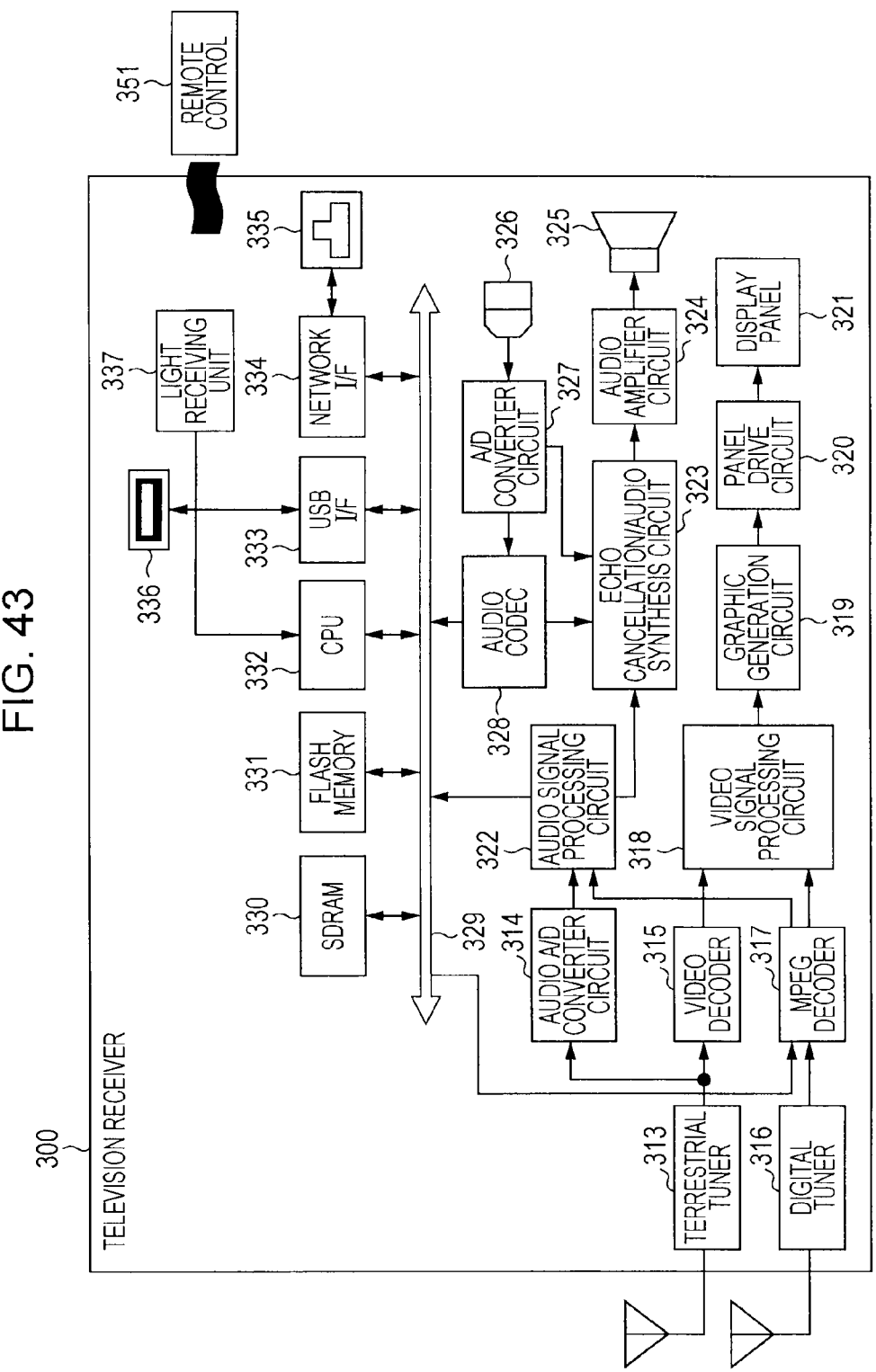
FIG. 43 is a block diagram illustrating a main configuration example of a television receiver to which the present invention is applied.

FIG. 43 is a block diagram illustrating a main configuration example of a television receiver that uses the decoding device to which the present invention is applied.

The television receiver 300 illustrated in FIG. 43 has a terrestrial tuner 313, a video decoder 315, a video signal processing circuit 318, a graphic generation circuit 319, a panel drive circuit 320, and a display panel 321.

The terrestrial tuner 313 receives a broadcast wave signal of analog terrestrial broadcasting via an antenna, demodulates it, obtains a video signal, and supplies it to the video decoder 315. The video decoder 315 performs a decoding process on the video signal supplied from the terrestrial tuner 313, and supplies an obtained digital component signal to the video signal processing circuit 318.

The video signal processing circuit 318 performs a certain process, such as denoising, on the video data supplied from the video decoder 315, and supplies the obtained video data to the graphic generation circuit 319.

The graphic generation circuit 319 generates video data of a program that is to be displayed on the display panel 321, image data based on a process based on an application supplied via a network, and the like, and supplies the generated video data and image data to the panel drive circuit 320. Also, the graphic generation circuit 319 performs a process of generating video data (graphic) for displaying a screen that is to be used by a user for selecting an item, superimposing it on video data of a program, and supplying the video data obtained thereby to the panel drive circuit 320 as necessary.

The panel drive circuit 320 drives the display panel 321 on the basis of the data supplied from the graphic generation circuit 319, and causes the display panel 321 to display video of a program and the above-described various types of screens.

The display panel 321 is made up of an LCD (liquid Crystal Display) or the like, and displays video of a program or the like in accordance with the control performed by the panel drive circuit 320.

Also, the television receiver 300 has an audio A/D (Analog/Digital) converter circuit 314, an audio signal processing circuit 322, an echo cancellation/audio synthesis circuit 323, an audio amplifier circuit 324, and a speaker 325.

The terrestrial tuner 313 demodulates a received broadcast wave signal, thereby obtaining not only a video signal but also an audio signal. The terrestrial tuner 313 supplies the obtained audio signal to the audio A/D converter circuit 314.

The audio A/D converter circuit 314 performs an A/D conversion process on the audio signal supplied from the terrestrial tuner 313, and supplies an obtained digital audio signal to the audio signal processing circuit 322.

The audio signal processing circuit 322 performs a certain process, such as denoising, on the audio data supplied from the audio A/D converter circuit 314, and supplies obtained audio data to the echo cancellation/audio synthesis circuit 323.

The echo cancellation/audio synthesis circuit 323 supplies the audio data supplied from the audio signal processing circuit 322 to the audio amplifier circuit 324.

The audio amplifier circuit 324 performs a D/A conversion process and an amplification process on the audio data supplied from the echo cancellation/audio synthesis circuit 323 to adjust it to a certain volume, and causes the audio to output from the speaker 325.

Furthermore, the television receiver 300 has a digital tuner 316 and an MPEG decoder 317.

The digital tuner 316 receives a broadcast wave signal of digital broadcasting (digital terrestrial broadcasting, BS (Broadcasting Satellite)/CS (Communications Satellite) digital broadcasting) via an antenna, demodulates it, obtains an MPEG-TS (Moving Picture Experts Group-Transport Stream), and supplies it to the MPEG decoder 317.

The MPEG decoder 317 cancels scramble set on the MPEG-TS supplied from the digital tuner 316, and extracts a stream including the data of a program that is to be played back (to be viewed/listened to). The MPEG decoder 317 decodes the audio packets constituting the extracted stream and supplies obtained audio data to the audio signal processing circuit 322, and also decodes the video packets constituting the stream and supplies obtained video data to the video signal processing circuit 318. Also, the MPEG decoder 317 supplies EPG (Electronic Program Guide) data extracted from the MPEG-TS to a CPU 332 via a path that is not illustrated.

The television receiver 300 uses the above-described decoding device 1 as the MPEG decoder 317 that decodes video packets in this manner. Thus, the MPEG decoder 317 performs decoding using a prediction image generated through filtering prediction, as in the case of the decoding device 1, and thus a high-resolution decoded image can be obtained by efficiently using a time correlation of images.

The video data supplied from the MPEG decoder 317 is subjected to a certain process in the video signal processing circuit 318, as in the case of the video data supplied from the video decoder 315, video data or the like generated in the graphic generation circuit 319 is appropriately superimposed thereon, the video data is supplied to the display panel 321 via the panel drive circuit 320, and the image thereof is displayed.

The audio data supplied from the MPEG decoder 317 is subjected to a certain process in the audio signal processing circuit 322, as in the case of the audio data supplied from the audio A/D converter circuit 314, is supplied to the audio amplifier circuit 324 via the echo cancellation/audio synthesis circuit 323, and is subjected to a D/A conversion process and an amplification process. As a result, audio that is adjusted to a certain volume is output from the speaker 325.

Also, the television receiver 300 has a microphone 326 and an A/D converter circuit 327.

The A/D converter circuit 327 receives a signal of audio of a user captured by the microphone 326 that is provided in the television receiver 300 for audio conversation, performs an A/D conversion process on the received audio signal, and supplies obtained digital audio data to the echo cancellation/audio synthesis circuit 323.

In a case where the data of audio of a user (user A) of the television receiver 300 is supplied from the A/D converter circuit 327, the echo cancellation/audio synthesis circuit 323 performs echo cancellation on the audio data of the user A, and causes the data of audio that is obtained through synthesis with other audio data to be output from the speaker 325 via the audio amplifier circuit 324.

Furthermore, the television receiver 300 has an audio codec 328, an internal bus 329, an SDRAM (Synchronous Dynamic Random Access Memory) 330, a flash memory 331, the CPU 332, a USB (Universal Serial Bus) I/F 333, and a network I/F 334.

The A/D converter circuit 327 receives a signal of audio of a user captured by the microphone 326 that is provided in the television receiver 300 for audio conversation, performs an A/D conversion process on the received audio signal, and supplies obtained digital audio data to the audio codec 328.

The audio codec 328 converts the audio data supplied from the A/D converter circuit 327 into data of a certain format for transmitting it via a network, and supplies it to the network I/F 334 via the internal bus 329.

The network I/F 334 is connected to the network via a cable attached to a network terminal 335. The network I/F 334 transmits audio data supplied from the audio codec 328 to another apparatus connected to the network, for example. Also, the network I/F 334 receives, via the network terminal 335, audio data transmitted from another apparatus connected via the network, for example, and supplies it to the audio codec 328 via the internal bus 329.

The audio codec 328 converts the audio data supplied from the network I/F 334 into data of a certain format, and supplies it to the echo cancellation/audio synthesis circuit 323.

The echo cancellation/audio synthesis circuit 323 performs echo cancellation on the audio data supplied from the audio codec 328, and causes audio data obtained through synthesis with other audio data to be output from the speaker 325 via the audio amplifier circuit 324.

The SDRAM 330 stores various types of data necessary for the CPU 332 to perform a process.

The flash memory 331 stores a program executed by the CPU 332. The program stored in the flash memory 331 is read by the CPU 332 at certain timing, for example, at the start of the television receiver 300. The flash memory 331 also stores EPG data obtained via digital broadcasting and data obtained from a certain server via a network.

For example, the flash memory 331 stores an MPEG-TS including content data obtained from a certain server via a network under the control performed by the CPU 332. The flash memory 331 supplies the MPEG-TS to the MPEG decoder 317 via the internal bus 329 under the control performed by the CPU 332, for example.

The MPEG decoder 317 processes the MPEG-TS, as in the case of the MPEG-TS supplied from the digital tuner 316. In this way, the television receiver 300 is capable of receiving content data of video, audio, or the like via a network, decoding it using the MPEG decoder 317, and causing the video to be displayed or the audio to be output.

Also, the television receiver 300 has a light receiving unit 337 for receiving an infrared signal transmitted from a remote control 351.

The light receiving unit 337 receives an infrared ray from the remote control 351, and outputs a control code representing the content of a user operation obtained through demodulation to the CPU 332.

The CPU 332 executes a program stored in the flash memory 331, and controls the entire operation of the television receiver 300 in accordance with a control code or the like supplied from the light receiving unit 337. The CPU 332 is connected to the individual units of the television receiver 300 via paths that are not illustrated.

The USB I/F 333 performs transmission/reception of data to/from an external apparatus of the television receiver 300, the apparatus being connected via a USB cable attached to a USB terminal 336. The network I/F 334 connects to a network via a cable attached to the network terminal 335, and performs transmission/reception of data other than audio data to/from various types of apparatuses connected to the network.

The television receiver 300 uses the decoding device 1 as the MPEG decoder 317, thereby being capable of generating a highly precise prediction image without increasing a processing load. As a result, the television receiver 300 is capable of obtaining a higher resolution decoded image from a broadcast wave signal received via the antenna or content data obtained via the network and displaying it.

Figure 44:
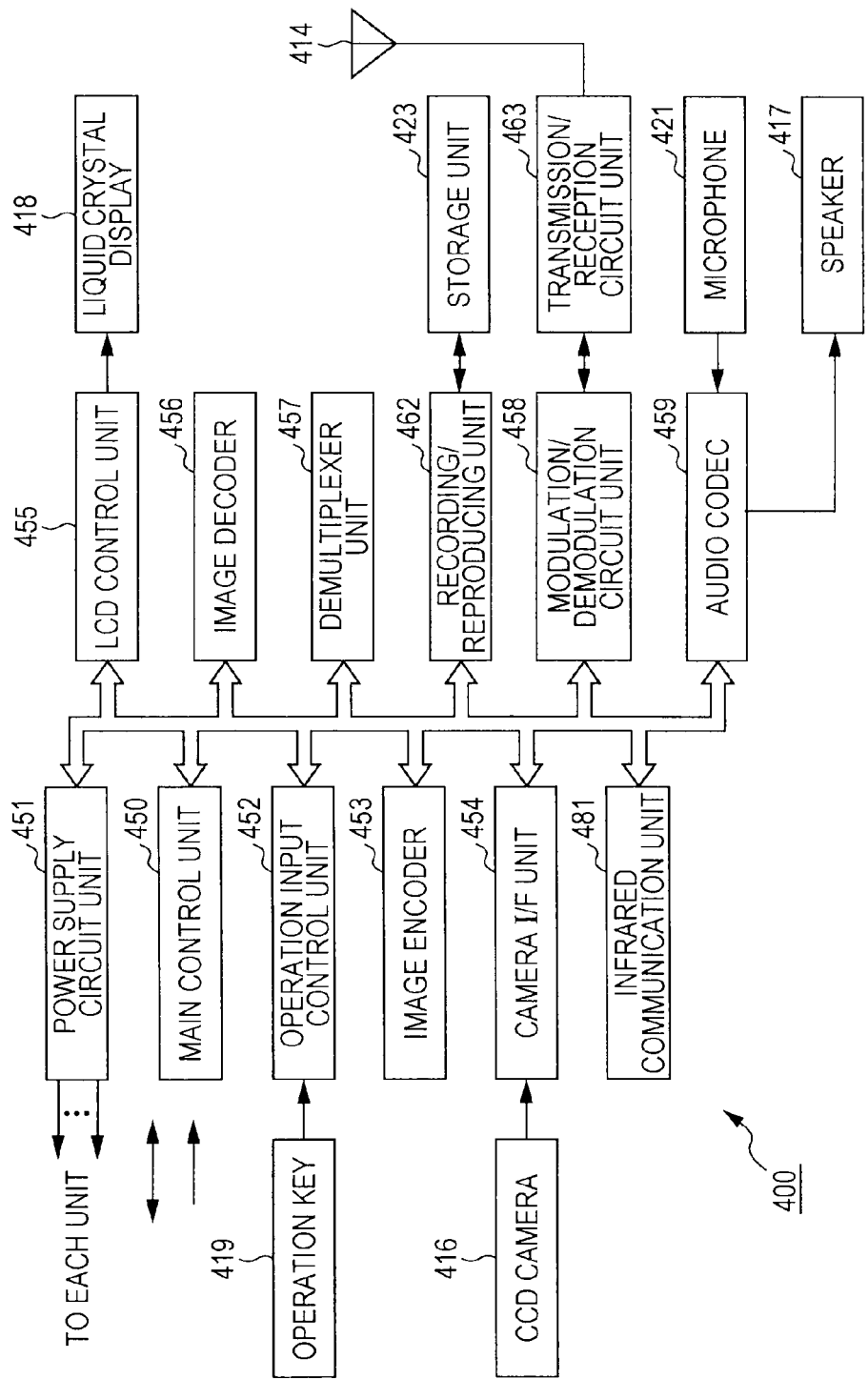
FIG. 44 is a block diagram illustrating a main configuration example of a mobile phone apparatus to which the present invention is applied.

FIG. 44 is a block diagram illustrating a main configuration example of a mobile phone apparatus that uses the decoding device and encoding device to which the present invention is applied.

The mobile phone apparatus 400 illustrated in FIG. 44 has a main control unit 450 configured to collectively control the individual units, a power supply circuit unit 451, an operation input control unit 452, an image encoder 453, a camera I/F unit 454, an LCD control unit 455, an image decoder 456, a demultiplexer unit 457, a recording/reproducing unit 462, a modulation/demodulation circuit unit 458, and an audio codec 459. These are mutually connected via a bus 460.

Also, the mobile phone apparatus 400 has an operation key 419, a CCD (Charge Coupled Devices) camera 416, a liquid crystal display 418, a storage unit 423, a transmission/reception circuit unit 463, an antenna 414, a microphone 421, and a speaker 417.

When a call ends or a power key is turned on through a user operation, the power supply circuit unit 451 supplies power from a battery pack to the individual units, thereby bringing the mobile phone apparatus 400 into an operable state.

The mobile phone apparatus 400 performs various types of operations, such as transmission/reception of an audio signal, transmission/reception of an electronic mail or image data, image capturing, or data recording, in various types of modes, such as an audio call mode or a data communication mode, on the basis of the control performed by the main control unit 450 including a CPU, a ROM, a RAM, etc.

For example, in the audio call mode, the mobile phone apparatus 400 converts an audio signal collected by the microphone 421 into digital audio data using the audio codec 459, performs a spectrum spread process thereon using the modulation/demodulation circuit unit 458, and performs a digital-to-analog conversion process and a frequency conversion process using the transmission/reception circuit unit 463. The mobile phone apparatus 400 transmits a signal to be transmitted obtained though the conversion processes to a base station that is not illustrated via the antenna 414. The signal to be transmitted (audio signal) transmitted to the base station is supplied to a mobile phone apparatus of the other end of a call via a public phone line network.

Also, for example, in the audio call mode, the mobile phone apparatus 400 amplifies a reception signal received by the antenna 414 using the transmission/reception circuit unit 463, further performs a frequency conversion process and an analog-to-digital conversion process, performs a spectrum inverse spread process using the modulation/demodulation circuit unit 458, and converts it into an analog audio signal using the audio codec 459. The mobile phone apparatus 400 outputs the analog audio signal obtained through the conversion from the speaker 417.

Furthermore, for example, in the case of transmitting an electronic mail in the data communication mode, the mobile phone apparatus 400 accepts, in the operation input control unit 452, the text data of the electronic mail input through an operation of the operation key 419. The mobile phone apparatus 400 processes the text data in the main control unit 450, and causes it to be displayed as an image on the liquid crystal display 418 via the LCD control unit 455.

Also, the mobile phone apparatus 400 generates, in the main control unit 450, electronic mail data on the basis of the text data or a user instruction accepted by the operation input control unit 452. The mobile phone apparatus 400 performs a spectrum spread process on the electronic mail data using the modulation/demodulation circuit unit 458, and performs a digital-to-analog conversion process and a frequency conversion process using the transmission/reception circuit unit 463. The mobile phone apparatus 400 transmits a signal to be transmitted obtained through the conversion processes to a base station that is not illustrated via the antenna 414. The signal to be transmitted (electronic mail) transmitted to the base station is supplied to a certain destination via a network and a mail server or the like.

Also, for example, in the case of receiving an electronic mail in the data communication mode, the mobile phone apparatus 400 receives a signal transmitted from the base station via the antenna 414 using the transmission/reception circuit unit 463, amplifies it, and further performs a frequency conversion process and an analog-to-digital conversion process. The mobile phone apparatus 400 performs a spectrum inverse spread process on the received signal using the modulation/demodulation circuit unit 458 to restore original electronic mail data. The mobile phone apparatus 400 displays the restored electronic mail data on the liquid crystal display 418 via the LCD control unit 455.

Additionally, the mobile phone apparatus 400 is capable of causing the received electronic mail data to be recorded (stored) in the storage unit 423 via the recording/reproducing unit 462.

The storage unit 423 is an arbitrary rewritable storage medium. The storage unit 423 may be a semiconductor memory, such as a RAM or a built-in flash memory, a hard disk, or a removable medium, such as a magnetic disk, a magneto-optical disc, an optical disc, a USB memory, or a memory card. Of course, other types of media may be used.

Furthermore, for example, in the case of transmitting image data in the data communication mode, the mobile phone apparatus 400 generates image data through capturing using the CCD camera 416. The CCD camera 416 has optical devices, such as a lens and a diaphragm, and a CCD serving as a photoelectric conversion element, captures an image of a subject, converts the intensity of received light into an electric signal, and generates image data of the image of the subject. The image data is compressed and encoded by the image encoder 453 via the camera I/F unit 454 using a certain encoding method, such as MPEG2 or MPEG4, so as to be converted into encoded image data.

The mobile phone apparatus 400 uses the above-described encoding device 101 as the image encoder 453 that performs such a process. Thus, as in the case of the encoding device 101, the image encoder 453 performs encoding using a prediction image that is generated through filtering prediction, includes a large amount of high-frequency component, and has a small difference from an original image, and thus the amount of code assigned to a residual can be reduced and the encoding efficiency can be increased.

In addition, at the same time, the mobile phone apparatus 400 performs, in the audio codec 459, analog-to-digital conversion on audio collected by the microphone 421 during image capturing using the CCD camera 416, and furthermore encodes it.

The mobile phone apparatus 400 multiplexes, in the demultiplexer unit 457, the encoded image data supplied from the image encoder 453 and the digital audio data supplied from the audio codec 459 in a certain method. The mobile phone apparatus 400 performs a spectrum spread process on the multiplexed data obtained as a result using the modulation/demodulation circuit unit 458, and performs a digital-to-analog conversion process and a frequency conversion process using the transmission/reception circuit unit 463. The mobile phone apparatus 400 transmits a signal to be transmitted obtained through the conversion processes to a base station that is not illustrated via the antenna 414. The signal to be transmitted (image data) transmitted to the base station is supplied to the other end of communication via a network or the like.

Note that, in the case of not transmitting image data, the mobile phone apparatus 400 can cause the image data generated by the CCD camera 416 to be displayed on the liquid crystal display 418 via the LCD control unit 455, not via the image encoder 453.

Also, for example, in the case of receiving data of a moving image file that is linked to a simple web page or the like in the data communication mode, the mobile phone apparatus 400 receives a signal transmitted from a base station via the antenna 414 using the transmission/reception circuit unit 463, amplifies it, and further performs a frequency conversion process and an analog-to-digital conversion process. The mobile phone apparatus 400 performs a spectrum inverse spread process on the received signal to restore original multiplexed data using the modulation/demodulation circuit unit 458. The mobile phone apparatus 400 separates the multiplexed data into encoded image data and audio data using the demultiplexer unit 457.

The mobile phone apparatus 400 decodes, in the image decoder 456, encoded image data using a decoding method corresponding to a certain encoding method, such as MPEG2 or MPEG4, thereby generating reproduced moving image data, and causes it to be displayed on the liquid crystal display 418 via the LCD control unit 455. Accordingly, for example, the moving image data included in the moving image file linked to the simple web page is displayed on the liquid crystal display 418.

The mobile phone apparatus 400 uses the above-described decoding device 1 as the image decoder 456 for performing such a process. Thus, as in the case of the decoding device 1, the image decoder 456 performs decoding using a prediction image that is generated through filtering prediction, and thus a high-resolution decoded image can be obtained using a time correlation of images more efficiently.

At this time, at the same time, the mobile phone apparatus 400 converts digital audio data into an analog audio signal using the audio codec 459, and causes it to be output from the speaker 417. Accordingly, for example, audio data included the moving image file linked to the simple web page is reproduced.

Note that, as in the case of an electronic mail, the mobile phone apparatus 400 can also cause the received data linked to the simple web page or the like to be recorded (stored) in the storage unit 423 via the recording/reproducing unit 462.

Also, the mobile phone apparatus 400 can analyze a two-dimensional code obtained by the CCD camera 416 through image capturing and obtain information recorded in the two-dimensional code using the main control unit 450.

Furthermore, the mobile phone apparatus 400 can communicate with an external apparatus through an infrared ray using the infrared communication unit 481.

By using the encoding device 101 as the image encoder 453, the mobile phone apparatus 400 can increase the encoding efficiency of encoded data, generated by encoding image data that is generated in the CCD camera 416, for example, without complicating the process. As a result, the mobile phone apparatus 400 can provide encoded data (image data) of high encoding efficiency to another apparatus.

Also, by using the decoding device 1 as the image decoder 456, the mobile phone apparatus 400 can generate a highly precise prediction image without increasing a processing load. As a result, for example, the mobile phone apparatus 400 can obtain a higher-resolution decoded image from a moving image file linked to a simple web page and display it.

Note that, although a description has been given above that the mobile phone apparatus 400 uses the CCD camera 416, an image sensor using a CMOS (Complementary Metal Oxide Semiconductor) (CMOS image sensor) may be used instead of the CCD camera 416. In this case, too, the mobile phone apparatus 400 can capture an image of a subject and generate image data of the image of the subject, as in the case of using the CCD camera 416.

Also, although a description has been given above of the mobile phone apparatus 400, the decoding device 1 and the encoding device 101 can be applied to any apparatus having an image capturing function and a communication function similar to those of the mobile phone apparatus 400, such as a PDA (Personal Digital Assistants), a smart phone, a UMPC (Ultra Mobile Personal Computer), a net book, or a notebook personal computer, as in the case of the mobile phone apparatus 400.

Figure 45:
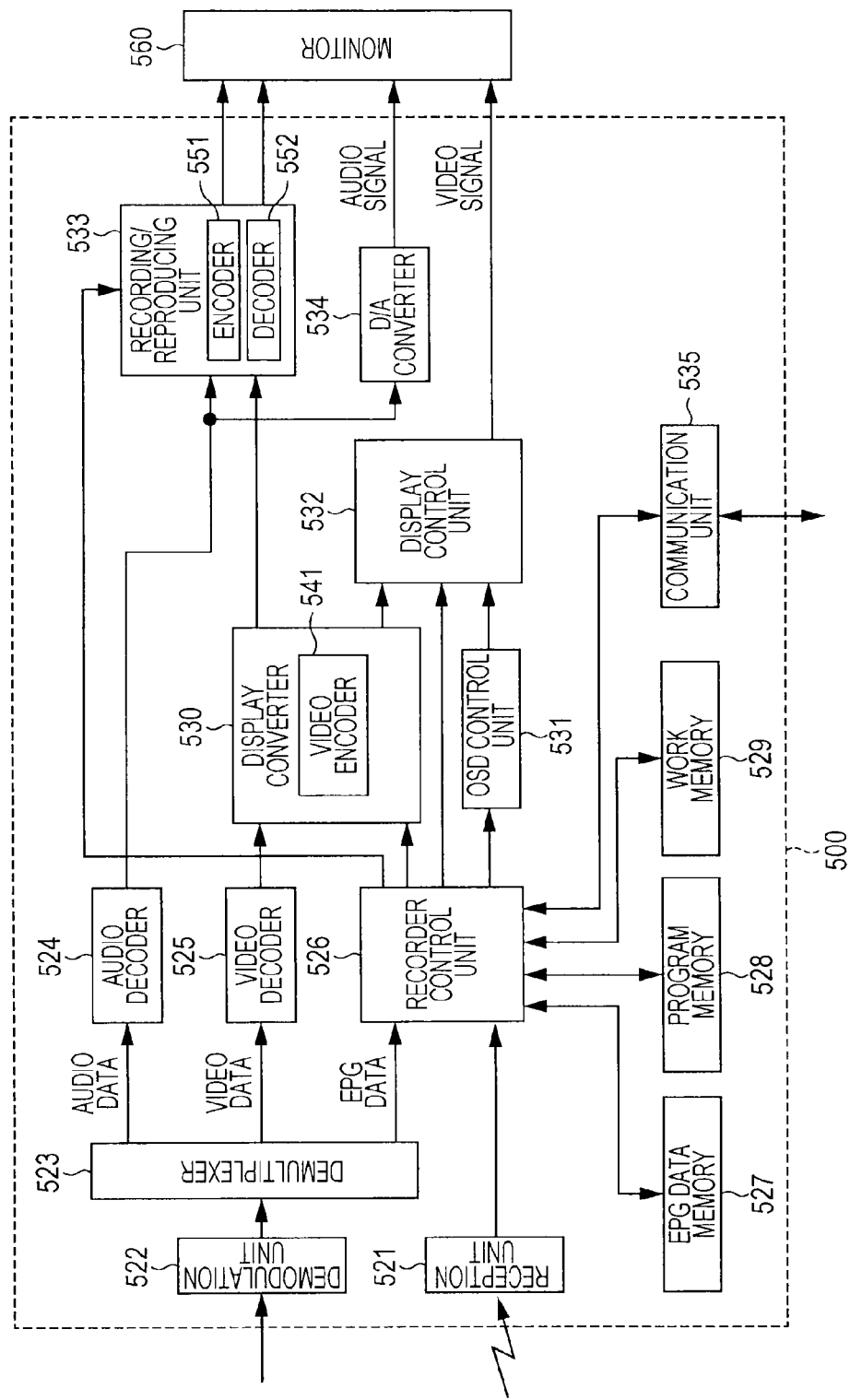
FIG. 45 is a block diagram illustrating a main configuration example of a hard disk recorder to which the present invention is applied.

FIG. 45 is a block diagram illustrating a main configuration example of a hard disk recorder that uses the decoding device and the encoding device to which the present invention is applied.

The hard disk recorder (HDD recorder) 500 illustrated in FIG. 45 is an apparatus that stores audio data and video data of a broadcast program included in a broadcast wave signal (television signal) that is transmitted from a satellite, an antenna on the ground, or the like and that is received by a tuner in hard disk included therein and that provides the stored data to a user at timing corresponding to an instruction provided from the user.

The hard disk recorder 500 can extract audio data and video data from a broadcast wave signal, appropriately decode them, and cause them to be stored in the hard disk included therein, for example. Also, the hard disk recorder 500 can obtain audio data and video data from another apparatus via a network, appropriately decode them, and cause them to be stored in the hard disk included therein, for example.

Furthermore, the hard disk recorder 500 can decode audio data and video data recorded on the hard disk included therein, supply them to a monitor 560, causes the image thereof to be displayed on the screen of the monitor 560, and causes the audio thereof to be output from the speaker of the monitor 560, for example. Also, the hard disk recorder 500 can decode audio data and video data extracted from a broadcast wave signal obtained via a tuner or audio data and video data obtained from another apparatus via a network, supply them to the monitor 560, cause the image thereof to be displayed on the screen of the monitor 560, and cause the audio thereof to be output from the speaker of the monitor 560, for example.

Of course, another operation can be performed.

As illustrated in FIG. 45, the hard disk recorder 500 has a reception unit 521, a demodulation unit 522, a demultiplexer 523, an audio decoder 524, a video decoder 525, and a recorder control unit 526. The hard disk recorder 500 further has an EPG data memory 527, a program memory 528, a work memory 529, a display converter 530, an OSD (On Screen Display) control unit 531, a display control unit 532, a recording/reproducing unit 533, a D/A converter 534, and a communication unit 535.

Also, the display converter 530 has a video encoder 541. The recording/reproducing unit 533 has an encoder 551 and a decoder 552.

The reception unit 521 receives an infrared signal from a remote control (not illustrated), converts it into an electric signal, and outputs it to the recorder control unit 526. The recorder control unit 526 is constituted by a microprocessor or the like, for example, and executes various types of processes in accordance with a program stored in the program memory 528. At this time, the recorder control unit 526 uses the work memory 529 as necessary.

The communication unit 535 is connected to a network, and performs a communication process with another apparatus via the network. For example, the communication unit 535 is controlled by the recorder control unit 526, communicates with a tuner (not illustrated), and outputs a channel select control signal mainly to the tuner.

The demodulation unit 522 demodulates the signal supplied from the tuner and outputs it to the demultiplexer 523. The demultiplexer 523 separates the data supplied from the demodulation unit 522 into audio data, video data, and EPG data, and outputs them to the audio decoder 524, the video decoder 525, and the recorder control unit 526, respectively.

The audio decoder 524 decodes the input audio data in an MPEG method, for example, and outputs it to the recording/reproducing unit 533. The video decoder 525 decodes the input video data in an MPEG method, for example, and outputs it to the display converter 530. The recorder control unit 526 supplies the input EPG data to the EPG data memory 527 and causes the data to be stored therein.

The display converter 530 encodes, with the video encoder 541, the video data supplied from the video decoder 525 or the recorder control unit 526 into video data of an NTSC (National Television Standards Committee) method, for example, and outputs it to the recording/reproducing unit 533. Also, the display converter 530 converts the size of the screen of the video data supplied from the video decoder 525 or the recorder control unit 526 into the size corresponding to the size of the monitor 560, converts it into video data of the NTSC method with the video encoder 541, converts it into an analog signal, and outputs it to the display control unit 532.

The display control unit 532 superimposes the OSD signal output from the OSD (On Screen Display) control unit 531 on the video signal input from the display converter 530 under the control performed by the recorder control unit 526, outputs it to the display of the monitor 560, and causes it to be displayed.

Also, the monitor 560 is supplied with the audio data that is output from the audio decoder 524 and that has been converted into an analog signal by the D/A converter 534. The monitor 560 outputs this audio signal from the speaker included therein.

The recording/reproducing unit 533 has a hard disk as a storage medium for having video data, audio data, and the like recorded thereon.

The recording/reproducing unit 533 encodes, with the encoder 551, the audio data supplied from the audio decoder 524 using an MPEG method, for example. Also, the recording/reproducing unit 533 encodes, with the encoder 551, the video data supplied from the video encoder 541 of the display converter 530 using an MPEG method. The recording/reproducing unit 533 combines, with a multiplexer, the encoded data of the audio data and the encoded data of the video data. The recording/reproducing unit 533 performs channel coding on the composite data to amplify it, and writes the data on the hard disk via a recording head.

The recording/reproducing unit 533 reproduces the data recorded on the hard disk via a reproducing head, amplifies it, and separates it into audio data and video data using a demultiplexer. The recording/reproducing unit 533 decodes, with the decoder 552, the audio data and the video data in an MPEG method. The recording/reproducing unit 533 D/A converts the decoded audio data and outputs it to the speaker of the monitor 560. Also, the recording/reproducing unit 533 D/A converts the decoded video data and outputs it to the display of the monitor 560.

The recorder control unit 526 reads the latest EPG data from the EPG data memory 527 on the basis of a user instruction represented by an infrared signal that is supplied from the remote control and that is received via the reception unit 521, and supplies it to the OSD control unit 531. The OSD control unit 531 generates image data corresponding to the input EPG data, and outputs it to the display control unit 532. The display control unit 532 outputs the video data input from the OSD control unit 531 to the display of the monitor 560, and causes it to be displayed. Accordingly, an EPG (electronic program guide) is displayed on the display of the monitor 560.

Also, the hard disk recorder 500 can obtain various types of data, such as video data, audio data, or EPG data, supplied from another apparatus via a network, such as the Internet.

The communication unit 535 is controlled by the recorder control unit 526, obtains encoded data of video data, audio data, and EPG data transmitted from another apparatus via a network, and supplies it to the recorder control unit 526. The recorder control unit 526 supplies the obtained encoded data of video data and audio data to the recording/reproducing unit 533, and causes the hard disk to store it, for example. At this time, the recorder control unit 526 and the recording/reproducing unit 533 may perform a process, such as re-encoding, as necessary.

Also, the recorder control unit 526 decodes the obtained encoded data of video data and audio data, and supplies the obtained video data to the display converter 530. The display converter 530 processes the video data supplied from the recorder control unit 526, like the video data supplied from the video decoder 525, supplies it to the monitor 560 via the display control unit 532, and causes the image to be displayed.

Also, in accordance with this image display, the recorder control unit 526 may supply decoded audio data to the monitor 560 via the D/A converter 534 and cause the audio to be output from the speaker.

Furthermore, the recorder control unit 526 decodes the obtained encoded data of the EPG data, and supplies the decoded EPG to the EPG data memory 527.

The hard disk recorder 500 described above uses the decoding device 1 as the video decoder 525, the decoder 552, and the decoder included in the recorder control unit 526. Thus, the video decoder 525, the decoder 552, and the decoder included in the recorder control unit 526 perform decoding using a prediction image generated through filtering prediction, as in the case of the decoding device 1, and thus a high-resolution decoded image can be obtained using a time correlation of images mode efficiently.

Accordingly, the hard disk recorder 500 can generate a highly precise prediction image without increasing a processing load. As a result, the hard disk recorder 500 can obtain a higher-resolution decoded image from the encoded data of the video data received via the tuner, the encoded data of the video data read from the hard disk of the recording/reproducing unit 533, or the encoded data of the video data obtained via a network, for example, and cause it to be displayed on the monitor 560.

Also, the hard disk recorder 500 uses the encoding device 101 as the encoder 551. Thus, as in the case of the encoding device 101, the encoder 551 performs encoding using a prediction image that is generated through filtering prediction, includes a large amount of high-frequency component, and has a small difference from an original image, and thus the amount of code assigned to a residual can be reduced and the encoding efficiency can be increased.

Accordingly, the hard disk recorder 500 can increase the encoding efficiency of encoded data to be recorded on the hard disk without complicating the process, for example. As a result, the hard disk recorder 500 can use the storage area of the hard disk more efficiently.

Note that, although a description has been given above of the hard disk recorder 500 for recording video data and audio data on a hard disk, any types of recording medium may of course be used. For example, the decoding device 1 and the encoding device 101 can be applied to a recorder that applies a recording medium other than a hard disk, for example, a flash memory, an optical disc, or video tape, as in the case of the above-described hard disk recorder 500.

Figure 46:
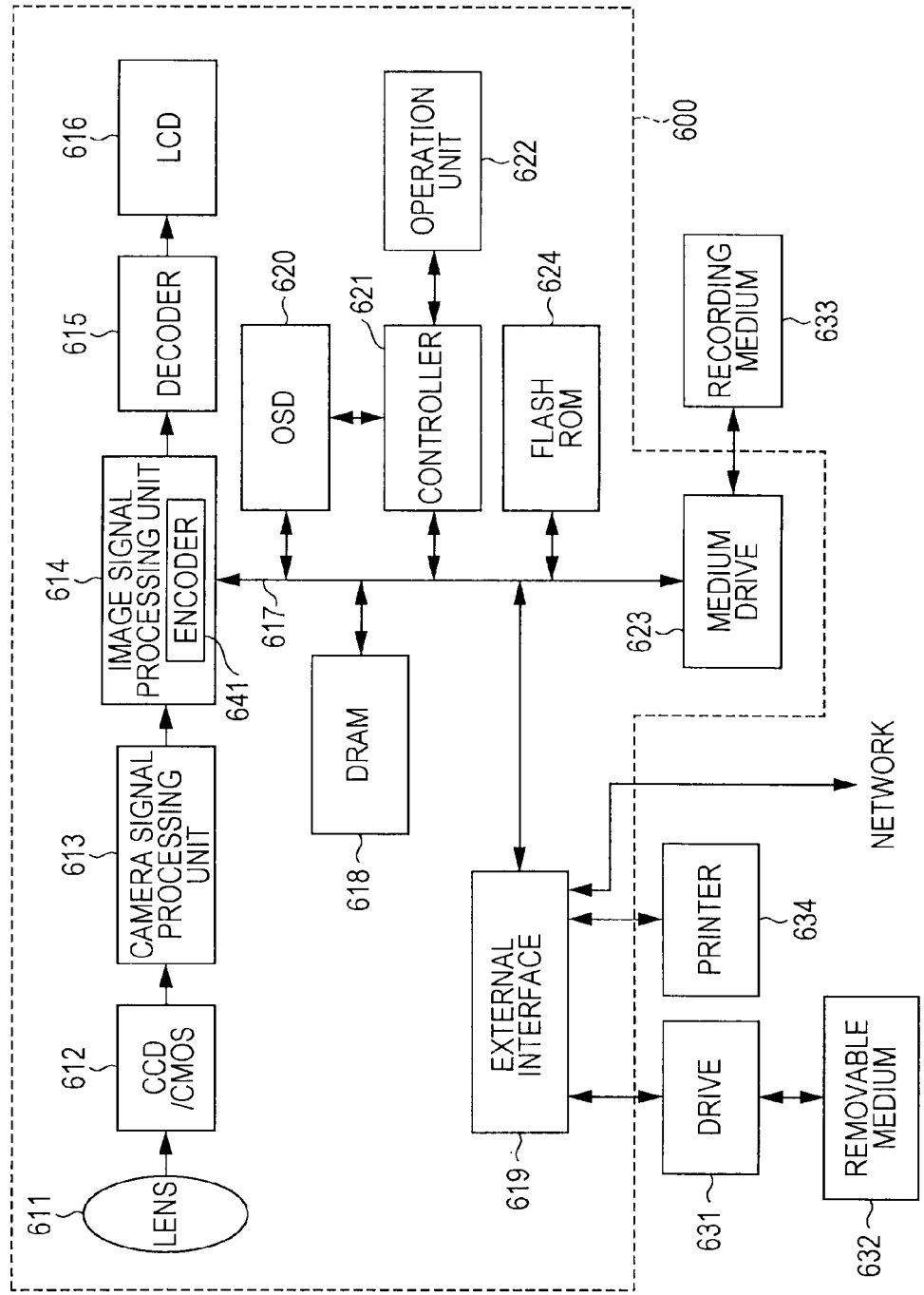
FIG. 46 is a block diagram illustrating a main configuration example of a camera to which the present invention is applied.

FIG. 46 is a block diagram illustrating a main configuration example of a camera that uses the decoding device and the encoding device to which the present invention is applied.

The camera 600 illustrated in FIG. 46 captures an image of a subject, causes an LCD 616 to display the image of the subject, and records it as image data on a recording medium 633.

A lens block 611 causes light (i.e., an image of a subject) to enter a CCD/CMOS 612. The CCD/CMOS 612 is an image sensor using a CCD or CMOS, converts the intensity of received light into an electric signal, and supplies it to a camera signal processing unit 613.

The camera signal processing unit 613 converts the electric signal supplied from the CCD/CMOS 612 into color-difference signals of Y, Cr, and Cb, and supplies them to an image signal processing unit 614. The image signal processing unit 614 performs certain image processing on an image signal supplied from the camera signal processing unit 613 and encodes, with an encoder 641, the image signal using an MPEG method, for example, under the control performed by a controller 621. The image signal processing unit 614 supplies encoded data that is generated by encoding the image signal to a decoder 615. Furthermore, the image signal processing unit 614 obtains data to be displayed generated in an on screen display (OSD) 620, and supplies it to the decoder 615.

In the foregoing process, the camera signal processing unit 613 appropriately uses a DRAM (Dynamic Random Access Memory) 618 connected via a bus 617, and causes the DRAM 618 to hold image data, encoded data obtained by encoding the image data, or the like as necessary.

The decoder 615 decodes encoded data supplied from the image signal processing unit 614, and supplies obtained image data (decoded image data) to the LCD 616. Also, the decoder 615 supplies the data to be displayed supplied from the image signal processing unit 614 to the LCD 616. The LCD 616 appropriately combines the image of the decoded image data supplied from the decoder 615 and the image of the data to be displayed, and displays the composite image.

The on screen display 620 outputs data to be displayed, such as a menu screen made up of symbols, characters, or figures, and icons, to the image signal processing unit 614 via the bus 617 under the control performed by the controller 621.

The controller 621 executes various types of processes on the basis of a signal representing the content of an instruction provided from a user using an operation unit 622, and controls the image signal processing unit 614, the DRAM 618, an external interface 619, the on screen display 620, a medium drive 623, and so fourth via the bus 617. Programs, data, and the like that are necessary for the controller 621 to execute various types of processes are stored in a flash ROM 624.

For example, the controller 621 can encode the image data stored in the DRAM 618 and decode the encoded data stored in the DRAM 618 on behalf of the image signal processing unit 614 or the decoder 615. At this time, the controller 621 may perform an encoding/decoding process in a method similar to an encoding/decoding method of the image signal processing unit 614 or the decoder 615, or may perform an encoding/decoding process in a method incompatible with the image signal processing unit 614 or the decoder 615.

Also, for example, if an instruction to start printing an image is provided from the operation unit 622, the controller 621 reads image data from the DRAM 618 and supplies it to a printer 634 connected to the external interface 619 via the bus 617 to print it.

Furthermore, for example, if an instruction to record an image is provided from the operation unit 622, the controller 621 reads encoded data from the DRAM 618 and supplies it to the recording medium 633 loaded in the medium driver 623 via the bus 617 to store it.

The recording medium 633 is an arbitrary readable and writable removable medium, such as a magnetic disk, a magneto-optical disc, an optical disc, or a semiconductor memory. Of course, the recording medium 633 may be a removable medium of any type, and may be a tape device, disc, or memory card. Of course, the recording medium 633 may be a noncontact IC card or the like.

Also, the medium drive 623 and the recording medium 633 may be integrated, and may be constituted by a non-transportable storage medium, such as a built-in hard disk drive or an SSD (Solid State Drive).

The external interface 619 is constituted by a USB input/output terminal or the like, for example, and is connected to the printer 634 in the case of printing an image. Also, a drive 631 is connected to the external interface 619 as necessary, a removable medium 632, such as a magnetic disk, an optical disc, or a magneto-optical disc, is appropriately loaded thereto, and a computer program read therefrom is installed into the flash ROM 624 as necessary.

Furthermore, the external interface 619 has a network interface connected to a certain network, such as a LAN or the Internet. The controller 621 can read encoded data from the DRAM 618 and supply it from the external interface 619 to another apparatus connected via a network, in accordance with an instruction provided from the operation unit 622, for example. Also, the controller 621 can obtain, via the external interface 619, encoded data or image data supplied from another apparatus via a network, and cause the DRAM 618 to hold it or supply it to the image signal processing unit 614.

The camera 600 described above uses the decoding device 1 as the decoder 615. Thus, as in the case of the decoding device 1, the decoder 615 performs decoding using a prediction image generated through filtering prediction, and thus a high-resolution decoded image can be obtained using a time correlation of images mode efficiently.

Accordingly, the camera 600 can generate a highly precise prediction image without increasing a processing load. As a result, the camera 600 can obtain a higher-resolution decoded image from the image data generated in the CCD/CMOS 612, the encoded data of the video data read from the DRAM 618 or the recording medium 633, or the encoded data of the video data obtained via a network, for example, and cause it to be displayed on the LCD 616.

Also, the camera 600 uses the encoding device 101 as the encoder 641. Thus, as in the case of the encoding device 101, the encoder 641 performs encoding using a prediction image that is generated through filtering prediction, includes a large amount of high-frequency component, and has a small difference from an original image, and thus the amount of code assigned to a residual can be reduced and the encoding efficiency can be increased.

Accordingly, the camera 600 can increase the encoding efficiency of encoded data to be recorded on the hard disk without complicating the process, for example. As a result, the camera 600 can use the storage area of the DRAM 618 and the recording medium 633 more efficiently.

In addition, the decoding method of the decoding device 1 may be applied to a decoding process performed by the controller 621. Likewise, the encoding method of the encoding device 101 may be applied to an encoding process performed by the controller 621.

Also, the image data captured by the camera 600 may be a moving image or a still image.

Of course, the decoding device 1 and the encoding device 101 can be applied to an apparatus or a system other than the above-described apparatuses.

REFERENCE SIGNS LIST 1 decoding device, 21 motion prediction/compensation circuit, 41 prediction mode determination circuit, 42 unidirectional prediction circuit, 43 bidirectional prediction circuit, 44 prediction circuit, 45 filtering circuit, 51 difference calculation circuit, 52 low-pass filter circuit, 53 gain adjustment circuit, 54 high-pass filter circuit, 55 gain adjustment circuit, 56 adder circuit, 57 adder circuit, 231 block division circuit, 232 clipping circuit, 233 buffer

What is claimed is:
1. An image processing device comprising:
determining means for determining, in accordance with a number of taps of a filter used for a filtering process, a number of pixels in a width direction of a band area that is positioned outside a macroblock including a reference block, which is a block of a decoded reference frame, and that is in contact with the reference block;
obtaining means for obtaining, from the reference frame, the reference block and the band area corresponding to the number of pixels determined by the determining means if the reference block, which is a block of the reference frame corresponding to a block constituting an image subjected to a filtering process, is in contact with a periphery of the macroblock including the reference block; and filtering means for performing a filtering process on an image of the reference block and the band area obtained by the obtaining means.

2. The image processing device according to claim 1, wherein the obtaining means obtains the reference block from the reference frame if the reference block is not in contact with the periphery of the macroblock including the reference block.

3. The image processing device according to claim 2, wherein the determining means determines the number of pixels that is equal to a maximum integer equal to or smaller than a value that is obtained by dividing the number of taps of the filter used for the filtering process by two to be the number of pixels in the width direction of the band area.

4. The image processing device according to claim 3, wherein the filtering means includes
first filter means for performing low-pass filtering on a difference image of a plurality of images,
second filter means for performing high-pass filtering on an image obtained through the low-pass filtering performed by the first filter means, and
adding means for adding the image obtained through the low-pass filtering performed by the first filter means and an image obtained through the high-pass filtering performed by the second filter means to any of the plurality of images, thereby generating a prediction image in units of macroblocks.

5. The image processing device according to claim 4, further comprising:
storage means for storing, as the reference frame, a decoded frame that is obtained through a decoding process performed in units of macroblocks constituting a frame,
wherein the obtaining means obtains the reference block and the band area from the reference frame stored in the storage means.

6. The image processing device according to claim 5, further comprising:
specifying means for specifying the reference block on the basis of a motion vector.

7. The image processing device according to claim 6, wherein the filter is an FIR filter.

8. An image processing method, implemented on an image processing device, comprising:
a determining step, performed by a determining unit of the image processing device, of determining, in accordance with a number of taps of a filter used for a filtering process, a number of pixels in a width direction of a band area that is positioned outside a macroblock including a reference block, which is a block of a decoded reference frame, and that is in contact with the reference block;
an obtaining step, performed by an obtaining unit of the image processing device, of obtaining, from the reference frame, the reference block and the band area corresponding to the number of pixels determined in the determining step if the reference block, which is a block of the reference frame corresponding to a block constituting an image subjected to a filtering process, is in contact with a periphery of the macroblock including the reference block; and
a filtering step, performed by a filtering unit of the image processing device, of performing a filtering process on an image of the reference block and the band area obtained in the obtaining step.

9. An image processing device comprising:
a determining unit that determines, in accordance with the number of taps of a filter used for a filtering process, the number of pixels in a width direction of a band area that is positioned outside a macroblock including a reference block, which is a block of a decoded reference frame, and that is in contact with the reference block;
an obtaining means that obtains, from the reference frame, the reference block and the band area corresponding to the number of pixels determined by the determining unit if the reference block, which is a block of the reference frame corresponding to a block constituting an image subjected to a filtering process, is in contact with a periphery of the macroblock including the reference block; and
a filtering unit that performs a filtering process on an image of the reference block and the band area obtained by the obtaining unit.

* * * * *